(12) United States Patent
MacPherson et al.

(10) Patent No.: US 8,894,098 B2
(45) Date of Patent: Nov. 25, 2014

(54) SECURITY DEVICE

(75) Inventors: Charles Douglas MacPherson, Santa Barbara, CA (US); Denis Gerard Vendette, Embrun (CA); Gilles Girouard, Osgoode (CA); A. Oliver Stone, Ottawa (CA)

(73) Assignee: Fortress Optical Features Ltd., North Vancouver, British Columbia (CA)

( * ) Notice: Subject to any disclaimer, the term of this patent is extended or adjusted under 35 U.S.C. 154(b) by 389 days.

(21) Appl. No.: 13/203,389
(22) PCT Filed: Feb. 26, 2010
(86) PCT No.: PCT/CA2010/000248
§ 371 (c)(1),
(2), (4) Date: Nov. 9, 2011
(87) PCT Pub. No.: WO2010/096914
PCT Pub. Date: Sep. 2, 2010

(65) Prior Publication Data
US 2012/0068450 A1 Mar. 22, 2012

Related U.S. Application Data

(63) Continuation of application No. 12/401,676, filed on Mar. 11, 2009.

(30) Foreign Application Priority Data

Feb. 27, 2009 (CA) .................................. 2656506

(51) Int. Cl.
*B42D 15/10* (2006.01)
*B42D 15/00* (2006.01)
(Continued)

(52) U.S. Cl.
CPC .......... *G02B 26/001* (2013.01); *B42D 15/0013* (2013.01); *G02B 5/18* (2013.01); *B42D*
(Continued)

(58) Field of Classification Search
CPC .......... B42D 15/0013; B42D 2035/24; B42D 15/10; B42D 15/00; B42D 2033/20; B42D 2035/40

USPC ............................................... 283/85, 91, 92
See application file for complete search history.

(56) References Cited

U.S. PATENT DOCUMENTS

| 4,451,521 A | 5/1984 | Kaule et al. |
| 6,036,232 A | 3/2000 | Kaule et al. |

(Continued)

FOREIGN PATENT DOCUMENTS

| CA | 2 149 550 | 5/1994 |
| CA | 2 471 357 | 7/2003 |

(Continued)

OTHER PUBLICATIONS

International Search Report from PCT/CA2010/000248 dated May 11, 2010.

(Continued)

*Primary Examiner* — Kyle Grabowski

(57) ABSTRACT

A security device for authenticating bank notes, documents and other items, comprises a luminescent material for producing luminescent radiation of first and second wavelengths. The security device includes an optically variable structure for controlling emission of luminescent radiation of at least one of the first and second wavelengths from the security device, the security device being arranged to permit, from an area of the optically variable structure, emission of luminescence of the first and second wavelengths from the security device. The optically variable structure causes the relative emissivity of the security device for luminescent radiation of the first and second wavelengths to change with a change in emission angle, so that the security device produces an angle-dependent color shift in the emitted luminescent radiation. The optically variable structure may comprise an optical interference stack that controls transmission of luminescent radiation therethrough in response to the wavelength of luminescent radiation.

10 Claims, 30 Drawing Sheets

(51) Int. Cl.
*G07D 7/12* (2006.01)
*D21H 21/48* (2006.01)
*G02B 5/28* (2006.01)
*G02B 5/20* (2006.01)
*G02B 26/00* (2006.01)
*B44F 1/10* (2006.01)
*G02B 5/18* (2006.01)
*G02B 5/32* (2006.01)

(52) U.S. Cl.
CPC *2035/28* (2013.01); *B42D 2035/20* (2013.01); *B42D 2033/20* (2013.01); *G07D 7/122* (2013.01); *B42D 2033/26* (2013.01); *D21H 21/48* (2013.01); *B42D 2035/34* (2013.01); *B42D 2031/28* (2013.01); *G02B 5/285* (2013.01); *G02B 5/32* (2013.01); *B42D 2035/22* (2013.01); *G07D 7/124* (2013.01); *B42D 2033/18* (2013.01); *B42D 2033/32* (2013.01); *B42D 2035/38* (2013.01); *B42D 2035/26* (2013.01); *G02B 5/201* (2013.01); *B42D 2035/24* (2013.01); *B42D 2035/40* (2013.01); *B44F 1/10* (2013.01); *G02B 5/1861* (2013.01)
USPC .................................. 283/92; 283/85; 283/91

(56) References Cited

U.S. PATENT DOCUMENTS

| | | | |
|---|---|---|---|
| 6,040,937 A | 3/2000 | Miles | |
| 6,055,090 A | 4/2000 | Miles | |
| 6,165,592 A | 12/2000 | Berger et al. | |
| 6,210,777 B1 | 4/2001 | Vermeulen et al. | |
| 6,506,480 B2* | 1/2003 | Liu et al. | 283/92 |
| 6,565,770 B1 | 5/2003 | Mayer et al. | |
| 6,572,784 B1 | 6/2003 | Coombs et al. | |
| 6,650,455 B2 | 11/2003 | Miles | |
| 6,666,991 B1 | 12/2003 | Atarashi et al. | |
| 6,695,905 B2 | 2/2004 | Rozumek et al. | |
| 7,040,663 B1 | 5/2006 | Plaschka et al. | |
| 8,085,434 B2* | 12/2011 | Bala et al. | 283/92 |
| 2003/0188842 A1 | 10/2003 | Ronnenberg | |
| 2005/0104364 A1 | 5/2005 | Keller et al. | |
| 2005/0240549 A1 | 10/2005 | Adamczyk et al. | |
| 2007/0080533 A1 | 4/2007 | Bleikholm et al. | |
| 2007/0211317 A1 | 9/2007 | Heim | |
| 2007/0273144 A1 | 11/2007 | Phillips et al. | |
| 2007/0273147 A1 | 11/2007 | Phillips et al. | |
| 2007/0275189 A1 | 11/2007 | Phillips et al. | |
| 2007/0281177 A1 | 12/2007 | Haubrich et al. | |
| 2008/0019003 A1 | 1/2008 | Phillips et al. | |
| 2010/0230615 A1 | 9/2010 | MacPherson et al. | |
| 2012/0080877 A1* | 4/2012 | Downing | 283/85 |

FOREIGN PATENT DOCUMENTS

| | | |
|---|---|---|
| CA | 2 544 586 | 5/2005 |
| CA | 2 589 970 | 6/2006 |
| CA | 2 609 631 | 11/2006 |
| EP | 0 680 411 B1 | 2/1998 |
| EP | 1 669 213 A1 | 6/2006 |
| EP | 1 719 636 A1 | 11/2006 |
| WO | WO 99/66513 A1 | 12/1999 |
| WO | WO 2008/043981 A1 | 4/2008 |

OTHER PUBLICATIONS

"Reflectivity of Iridescent Coextruded Multilayered Plastic Films", J.A. Radford, et al., Polymer Engineering and Science, May 1973, vol. 13, No. 3.

"Physical Optics of Iridescent Multilayered Plastic Films", T. Alfrey, Jr., et al., Polymer Engineering and Science, Nov. 1969, vol. 9, No. 6.

Electronic Imaging Science and Technology, Jan. 15-19, 2006, San Jose, California, USA, "Optical Security and Counterfeit Deterrence Techniques VI", http://electronicimaging.org/program/06/conferences/index.cfm?fuseaction=6075.

"Optical Thin-Film Security Devices", J.A. Dobrowolski, Optical Document Security, Chapter 13, pp. 289-328.

* cited by examiner

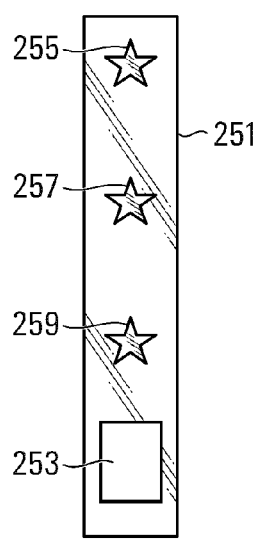
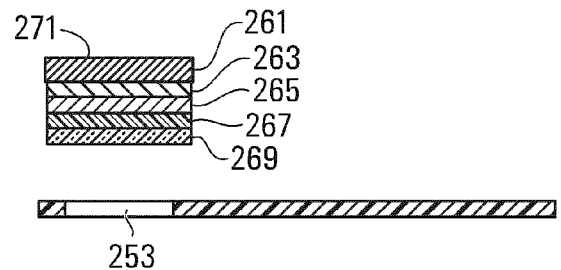
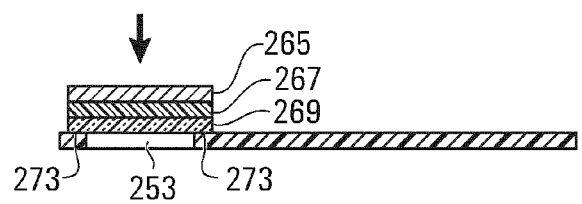
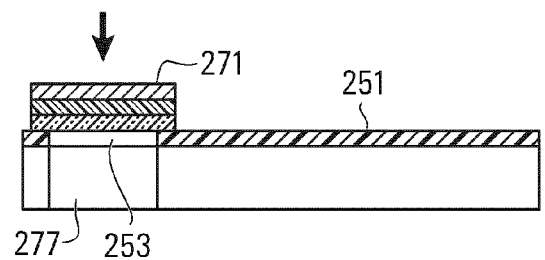
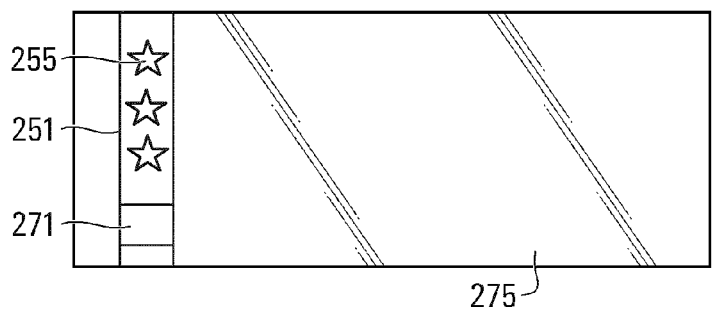
FIG. 10A
FIG. 10B
FIG. 10C
FIG. 10D
FIG. 10E

SECURITY DEVICE

CROSS-REFERENCE TO RELATED APPLICATIONS

This application is a national phase filing of International Patent Application No. PCT/CA2010/000248 filed Feb. 26, 2010 and published in English on Sep. 2, 2010 as WO 2010/096914, which claims priority to Canadian Patent Application Serial No. 2,656,506 filed on Feb. 27, 2009, and which is a continuation of U.S. patent application Ser. No. 12/401,676 filed Mar. 11, 2009. The disclosures of International Patent Application No. PCT/CA2010/000248, Canadian Patent Application Serial No. 2,656,506, and U.S. patent application Ser. No. 12/401,676 are each incorporated herein by reference in their entirety for all purposes.

FIELD OF THE INVENTION

The present invention relates to security devices and in particular to optical security devices for authenticating bank notes, financial transaction cards, documents of value or identity, branded goods and other items for protection against counterfeiting. The invention also relates to devices which include optically variable structures.

BACKGROUND OF THE INVENTION

Overt security elements including watermarks, metallic threads and optically variable devices such as holographic foils have been used for some time to authenticate documents, bank notes and other financial transaction instruments, such as credit and debit cards, for protection against copying and counterfeiting. Such security elements are overt in that their presence is visible to the naked eye. Covert security features, such as those which have luminescent properties are also used for authentication. In this case, the security feature is normally hidden under ambient light and is only revealed to the naked eye when illuminated by a special light source such as a UV lamp. Covert security features may also include features which can only be detected by a machine, such as those which emit outside the visible spectrum or are based on magnetic or electrical properties of a material.

Security features may be classified as "human unassisted", in which the security feature is visible to the naked eye and can be authenticated by a human without machine assistance, "human assisted" which is defined as one in which the authentication process is performed by a person with the assistance of a tool or device, and "machine readable" in which the security feature is both detected and its authentication processed by a machine.

One of the most common human assisted features found on bank notes is the ultra-violet (UV) fluorescent feature. This feature is typically applied as an ink, which may be visible or invisible, by offset printing and usually forms an image made up of one to three colours (red, green, blue). The image is detected by exposure of the bank note to a UV light source (typically UVA at 365 nm). This feature has provided a reasonably good level of security against most primitive and hobbyist type counterfeiting in the past. However, the availability of UV fluorescent inks in red, green and blue colours, combined with the growing popularity of the Internet and the widespread access to ink jet printers, has severely eroded the security of the feature to the point where the feature can now be considered a liability. Accordingly, there is a need for an alternative security feature which is more robust against copying and counterfeiting.

U.S. Pat. No. 6,036,232 (Kaule et al.) discloses a data carrier in which a layer of fluorescent lacquer is provided on the carrier substrate and is overlaid with an optically variable element in the form of a holographic stripe. The fluorescent layer extends beyond the area of the optical element and is unobstructed to enable both the fluorescent layer and the optical element to be detected from the same side of the document.

U.S. Pat. No. 6,165,592 (Berger et al.) discloses a document with a security attribute having a diffractive optical element, which can be detected visually, and a luminescent characteristic, which can be detected by machine. The attribute comprises a composite having a transparent layer, certain regions of the lower surface thereof being embossed with a diffraction pattern and metalized, and an adhesive layer adjacent the lower surface of the transparent layer, which is doped with a luminescent substance in regions opposite non-metalized portions of the transparent layer to allow visual access to the luminescent substance through the transparent layer. In an alternative embodiment, the luminescent substance is provided in certain regions of the transparent layer.

U.S. Pat. No. 7,040,663 (Plaschka et al.) discloses a value document which includes a security element having an optically variable material which conveys different colour effects at different viewing angles. The security element also includes a machine-readable feature substance such as a luminescent substance, which luminesces outside the visible spectral region, with narrow emission bands that can be detected by machine. The machine readable substance does not impair the visually visible optically variable effect of the optically variable material. In one example, the security feature includes a dark-coloured print formed of black, IR-transparent ink containing a luminescent substance which emits in the IR spectral region. Disposed over the printed image is an optically variable material having no or little body colour. The material may be a liquid-crystal polymer or an interference layer material such as Iriodine™. In another example, the security element consists of a magnetic layer containing carbon black components, above which is disposed a translucent optically variable layer, which additionally contains luminescent substance. The luminescent substance can be transparent in the visible spectral region and emitting in the visible spectral region under UV illumination. The security element has a number of machine testable characteristics which include magnetic properties, luminescence emission under UV illumination and electric conductivity produced by the carbon black mixture.

US 2007/0273147 (Phillips et al.) discloses various vacuum roll coated security thin film interference products with overt and/or covert patterned layers. In one example, a multi-layered optical device is formed on a PET web, in which the device includes a patterned aluminum reflective layer on the front side of the web, overlaid by an optical interference structure including a spacer layer and an absorber layer, which, together with the reflective layer, form a Fabry-Perot resonant cavity. The aluminum layer is absent in discrete areas of the substrate to form windows. Another optical structure such as a reflective layer, an optically variable layer, a magnetic layer or a fluorescent layer is formed on the backside of the web. In another example, an aluminum pattern is applied to the front side of a PET web and an anti-Stokes fluorescent layer (which fluoresces at a shorter wavelength when illuminated by longer wavelength radiation) is disposed on the backside of the web. The fluorescent layer becomes visible through windows in the patterned aluminum layer when irradiated with IR light.

EP 1669213 (Schmid et al.) discloses a security element having a coating layer and an underlying substrate containing information, in which the coating layer contains similarly oriented pigment flakes to produce a "Venetian blind" effect, whereby at a perpendicular viewing angle the underlying substrate is hidden and at an oblique viewing angle corresponding to the orientation of the flakes, the underlying substrate is visible. The underlying substrate may contain printed indicia, an iridescent or optically variable ink, a luminescent material, a diffraction grating or thin-film interference layer.

EP 1719636 (Despland et al.) discloses a black-to-colour shifting security element comprising a layer containing colour shifting pigments overlaid by an absorber layer. The absorber layer is adapted to selectively absorb wavelengths of light emitted from the pigment layer at an orthogonal angle but not to absorb wavelengths emitted from the colour shifting pigment at grazing angles. This results in an effect whereby the colour shifting pigment, when viewed at an orthogonal angle, cannot be seen, and therefore the security element appears black, but can be seen when viewed at grazing angles. The absorber layer may be part of the pigment or disposed in a separate layer above the pigment layer.

US 2005/0240549 (Adamczyk et al.) discloses a data carrier which includes a security feature comprising an embossed structure which provides an optically variable element. The embossed structure has a line pattern or line screen structure, which, in cross section has side by side ridges with peaks and troughs joined by sloping sides or flanks. A first ink coating is provided on one side of each ridge and a second ink layer is disposed on both sides of the ridges above the first ink layer. On oblique viewing from the side which includes both coatings, a viewer will perceive an almost uniform colour print in the mixed colour from both coatings. When viewed from the opposite side, the viewer is faced by flanks of the ridges with the second coating only and will therefore receive a uniformly coloured surface only in the colour of the second coating so that the perceived colour changes depending on the side from which the embossed structure is viewed. The structure can be made machine readable by adding a feature substance such as a luminescent substance, a magnetic substance or an electrically conductive substance to at least one of the inks.

U.S. Pat. No. 6,210,777 (Vermeulen et al.) discloses a security document having a transparent or translucent support containing interference pigments. The interference pigments produce an effect whereby the document has a different colour when viewed with light transmitted by the document in comparison with light reflected by the document, and also has a different colour when viewed in transmission mode from the front or rear side. In one example, a pattern containing light interference pigments on one side of the transparent support is printed over a pattern containing light reflecting pigments of complementary colour to the interference pigments, a pattern of complementary pigments mixed with coloured fluorescent or phosphorescent pigments or dyes, and patterns containing solely fluorescent or phosphorescent dyes that are white by inspection with visible light but emit coloured light when exposed to ultraviolet light.

U.S. Pat. No. 6,565,770 (Mayer et al.) and U.S. Pat. No. 6,572,784 (Coombs et al.) disclose colour shifting pigments for inks and paints in which each pigment has a core comprising a multi-layer thin film structure which, under ambient light causes a viewing angle-dependent colour shift. Each pigment also includes a luminescent material as a secondary independent feature. In Mayer et al., the luminescent material encapsulates the optically variable core structure, whereas in Coombs et al., the luminescent material is incorporated within the core either as a separate layer or in one of the core layers.

U.S. Pat. No. 6,695,905 (Rozumek et al.) describes optically variable pigments for inks and coatings for security elements in which the pigment comprises a Fabry-Perot resonance cavity which provides a viewing angle-dependent colour shift under ambient light. In addition, a luminescence centre is incorporated into the resonance cavity. The cavity's resonance condition is dependent on the angle of incidence of the excitation light, and the luminescent material within the cavity is more strongly excited under the resonance condition than a luminescent material outside the cavity. This provides a means of machine-discrimination between the luminescent optically variable pigment and simple mixtures of luminescent materials and non-luminescent optically variable pigments.

U.S. Pat. No. 6,666,991 (Atarashi et al.) discloses a fluorescent or phosphorescent powder comprising spherical base particles covered with a multi-layered film coating to produce particular colours according to the refractive index and thickness of the various materials. A luminescent material is included as part of the powder's sphere either as a coating or an internal layer, for example, a layer next to the base particle. The luminescent material provides a means of authenticating the powder composition by detecting its presence when irradiated by a suitable light source.

BRIEF SUMMARY

According to one aspect of the present invention, there is provided a device comprising: luminescent means, which when stimulated, produces luminescent radiation of first and second wavelengths, the second wavelength being different to said first wavelength, said luminescent means including a luminescent material; and an optically variable structure for controlling emission of the luminescent radiation of at least one of said first and second wavelengths from said device, the device being arranged to permit, from within an area of said optically variable structure, emission of luminescent radiation of said first wavelength from said device at a first angle of emission, and to permit, from said area, emission of luminescent radiation of said second wavelength from said device at one or both of (1) said first angle of emission and (2) a second angle of emission, different to said first angle of emission, and said optically variable structure is arranged to cause, from said area, the emissivity of said device for luminescent radiation of said first or second wavelengths to change relative to the emissivity of the device for luminescent radiation of the other of the first or second wavelengths with a change in emission angle of luminescent radiation from said device from said first emission angle to said second emission angle.

This arrangement provides a luminescent feature in which the spectral content or colour of the luminescence emitted from the device varies with the angle of emission.

Specifically, the optically variable structure causes the relative emissivity of the device for luminescent radiation of the first and second wavelengths to change with a change in emission angle of luminescent radiation from the device. The "emissivity" of the device generally refers to the ability of the device to emit radiation and more specifically refers to the power or intensity of radiation the device is capable of emitting. Thus, the higher the emissivity of the device for luminescent radiation of a particular wavelength, the higher will be the power or intensity of luminescent radiation at that particular wavelength emitted from the device. In the present arrangement, it is the relative emissivity of the device for luminescent radiation of the first and second wavelengths which changes with emission angle. Thus, the relative intensities of luminescent radiation of the first and second wavelengths changes with emission angle resulting in an angle-dependent colour shift in the luminescent emission.

The term "device" is used herein in the broadest sense of the word and includes within its meaning any structure, apparatus, article, item, element, construct, arrangement, feature or composition. The term "device" does not imply any particular form or size, and includes sheet, foil, particle, flake, pigment, any other form or arrangement.

In some embodiments, the device is a security device. In this case, the arrangement provides a further detectable characteristic which can be used to authenticate a security feature and significantly improves the robustness of luminescent security features against copying and counterfeiting.

In other embodiments, the device may be used in any other application, for example, for encryption, e.g. to encrypt messages or for printing or decorative purposes. In one example of these applications, the device may be a particle, flake, pigment or composition, and included in a paint, toner, ink, nail polish, make-up or other coating or substance.

Thus, in another aspect, there is provided a paint, toner, ink, coating, nail polish, make-up or other substance comprising particles, flakes and/or pigments, each of which comprises a device according to the present invention or an embodiment thereof.

In some embodiments, the optically variable structure is adapted to control emission of luminescent radiation from the device of only one of the first and second wavelengths from within the control area of the optically variable structure. For example, luminescent material which luminesces at one of the wavelengths may be positioned within the area of the optically variable structure so that emission of the luminescent radiation is not controlled by the structure. On the other hand, material which luminesces at the other wavelength is positioned within the area of the optically variable structure so that its luminescent emission is controlled by the structure.

In some embodiments, the optically variable structure is arranged to control emission of the luminescent radiation of both the first and second wavelengths from the device, and to permit emission of luminescent radiation of the first wavelength from the device at the first angle, and to permit emission of luminescent radiation of the second wavelength from the device at one or both of the first and second angles.

In some embodiments, the optically variable structure is adapted to reduce the emissivity of the device for luminescent radiation of the second wavelength with a change in emission angle from the second angle towards the first angle.

In some embodiments, the optically variable structure is adapted to reduce the emissivity of the device for luminescent radiation of the first wavelength with a change in emission angle from the first angle towards the second angle.

In some embodiments, the optically variable structure is adapted to change the emissivities of luminescent radiation of the first and second wavelengths in opposite directions with a change in emission angle from the first angle to the second angle (or vice versa) so that, for example, as one increases, the other decreases.

In some embodiments, at the first emission angle, the emissivity of the device for luminescent radiation of the first wavelength is greater than the emissivity of the device for luminescent radiation of the second wavelength. Thus, at the first emission angle, the intensity of the luminescent emission of the first wavelength is greater than that of the second wavelength. In some embodiments, the optically variable structure may be arranged to permit some emission of luminescent radiation of the second wavelength at the first angle or to substantially exclude luminescent radiation of the second wavelength from the luminescent emission at the first angle so that little, very little or no luminescence of the second wavelength is emitted at the first angle.

In some embodiments, at the second emission angle, the emissivity of the device for luminescent radiation of the second wavelength is greater than the emissivity of the device for luminescent radiation of the first wavelength. Thus, at the second emission angle, the intensity of luminescent emission of the second wavelength is greater than that of the first wavelength. In some embodiments, the optically variable structure may be arranged to permit some emission of luminescent radiation of the first wavelength at the second angle or to substantially exclude luminescent radiation of the first wavelength from the luminescent emission at the second angle so that little, very little or no luminescence of the first wavelength is emitted at the second angle.

In some embodiments, the optically variable structure is adapted such that luminescent radiation of one of the first and second wavelengths in the luminescent emission dominates over the other of the first and second wavelengths at the first emission angle and the other of the first and second wavelengths in the luminescent emission dominates over the one of the first and second wavelengths at the second emission angle. Advantageously, this may assist in increasing the change in spectral content of the luminescent emission with change in emission angle to facilitate detecting the change in luminescent emission.

In some embodiments, the intensity of luminescent emission of one of the first and second wavelengths may be relatively independent of emission angle. In this case, the change in relative emissivity of the device for luminescent radiation of the first and second wavelengths with emission angle is predominantly due to a change in the emissivity of the device for one of the first and second wavelengths. For example, the intensity of luminescent emission of the first wavelength at the second emission angle may be substantially the same as the intensity of luminescent emission of the first wavelength at the first emission angle. Alternatively, the intensity of luminescent emission of the second wavelength at the first emission angle may be substantially the same as the intensity of luminescent emission of the second wavelength at the second emission angle.

In some embodiments, the intensity of luminescent emission of the first and second wavelengths may be substantially the same at one of the first and second emission angles. In other embodiments, the intensity of luminescent emission of the first wavelength may be greater than that of the second wavelength at both the first and second emission angles, or the intensity of luminescent emission of the second wavelength may be greater than that of the first wavelength at both the first and second emission angles.

In some embodiments, the optically variable structure may control emission of the luminescent radiation by enabling luminescent radiation at the first wavelength or having a first group of wavelengths to be emitted at a first angle or first range of angles and to substantially exclude, block or impede emission at that angle or range of angles emission of luminescent radiation at the second wavelength or second group of wavelengths. Although in some instances, luminescence having the second wavelength or group of wavelengths may be present in the luminescence emitted at the first angle or first range of angles, the optically variable structure controls the spectral content so that luminescence at the first wavelength or group of wavelengths dominates over the luminescence at the second wavelength or group of wavelengths. Similarly, the optically variable structure may control emission of the luminescent radiation by enabling luminescent radiation at the second wavelength or having a second group of wavelengths to be emitted at a second angle or second range of angles and to substantially exclude, block or impede emission at that angle or range of angles emission of luminescent radiation at the first wavelength or first group of wavelengths. Although in some instances, luminescence having the first wavelength or group of wavelengths may be present in the luminescence emitted at the second angle or second range of angles, the optically variable structure may control the spectral content so that luminescence at the second wavelength or group of wavelengths dominates over the luminescence at the first wavelength or group of wavelengths. Essentially, the feature or device enables discrimination of the spectral content of the luminescence emission at two or more emission angles.

The term "colour" is used herein in the broad sense of the word to mean the result produced by either a single wavelength component in the electromagnetic spectrum or a combination of different wavelength components in the electromagnetic spectrum, each component having a particular intensity relative to the other component(s). The term "colour" applies to both the visible part of the electromagnetic spectrum and to parts outside the visible spectrum including infrared (IR) and ultraviolet (UV).

As used herein, the term "luminescent material" refers any material that converts at least part of incident energy into emitted radiation with a characteristic signature. For example, the luminescent material may convert incident radiation of one wavelength into emitted radiation of a different wavelength. Non-limiting examples include materials which exhibit fluorescence and/or phosphorescence.

In some embodiments, one or both of the first and second wavelengths of the luminescence emission are in the visible spectrum. Advantageously, this enables the device as a security feature to be at least partially detected and authenticated by a person. If both the first and second wavelengths are in the visible spectrum, both security attributes can be detected and authenticated by a human and will appear as a first colour or first range of colours at a first angle of emission or first range of angles of emission, and as a second, different colour or different range of colours at a second angle or second range of angles different to the first angle or first range of angles.

In some embodiments, the different colours may be selected so that they are easily distinguishable from one another to the naked eye. In one, non-limiting variant, the different colours may be selected from red, green and blue.

In some embodiments, the difference between the first and second emission angles may be selected so that the angles can readily be distinguished from one another by a human.

In some embodiments, the luminescent material may be selected only to generate luminescence at one or both of the first and second wavelengths in response to electromagnetic radiation outside the visible spectrum, so that the luminescence requires a special source of stimulating radiation and is inactive or relatively inactive under ambient conditions. If the first and second wavelengths are in the visible spectrum, this allows the luminescent colours to be concealed under ambient light. In some embodiments, the luminescent material is responsive to ultraviolet (UV) light to generate luminescence of one or both of the first and second wavelengths. This may enable the luminescent feature to be stimulated by the same UV light sources which are currently used to stimulate conventional luminescent security features, and which are in common usage in many locations, such as banks and retail outlets, thereby avoiding the need and expense for replacing existing equipment. In some embodiments, the luminescent material may be selected so that both the first and second wavelengths are stimulated by the same UV light source, i.e. the same UV wavelength. As many existing UV light sources for authentication emit a single UV wavelength, this arrangement may also prevent the need to replace or modify existing equipment.

In other embodiments, for one or both emission wavelengths, the luminescent material may respond to UV radiation to generate luminescence in the infrared spectrum or may be responsive to visible light to generate luminescence in the infrared spectrum. In other embodiments, for one or both luminescence wavelengths, the luminescent material may respond to stimulating radiation of a longer wavelength to generate luminescence of a shorter wavelength (anti-Stokes), for example, to generate luminescence radiation in the visible spectrum in response to an infrared source. In other embodiments, for one or both luminescent wavelengths, the luminescent material may respond to radiation in the visible spectrum to generate luminescence in the visible spectrum and thus may comprise a "Day glow" phosphorescent material. In this case, the luminescent emission may be observed under relative dark conditions.

In some embodiments, the luminescent material, when stimulated, emits luminescent radiation at a third wavelength, different to the first and second wavelengths. This provides a further characteristic of the device as a security device, which may further enhance its effectiveness against copying and counterfeiting and may also be used for authentication.

In some embodiments, the luminescent means is adapted to produce, when stimulated, luminescent radiation having a third wavelength different from the first and second wavelengths, and the optically variable structure is adapted to permit emission of luminescent radiation of the third wavelength from the device at a third emission angle different from the first and second emission angles.

In some embodiments, the optically variable structure is adapted to cause the relative emissivity of the device for luminescent radiation of the first and third wavelengths to change with a change in emission angle from the third emission angle to the first emission angle.

In some embodiments, the optically variable structure is adapted to cause the relative emissivity of the device for luminescent radiation of the second and third wavelengths to change with a change in emission angle from the third emission angle to the second emission angle.

In some embodiments, at the first emission angle, the emissivity of the device for luminescent radiation of the third wavelength is greater than the emissivity of the device for the second wavelength.

In some embodiments, at the second emission angle, the emissivity of the device for luminescent radiation of the third wavelength is greater than the emissivity of the device for luminescent radiation of the first wavelength.

In some embodiments, the optically variable structure may be adapted to cause the intensity of luminescent emission at the third wavelength to be relatively or substantially independent of changes in emission angle between the third emission angle at one or both of the first and second emission angles. For example, the intensity of luminescent emission of the third wavelength at one or both of the first and second angles may be substantially the same as the intensity of luminescent radiation of the third wavelength at the third emission angle.

In some embodiments, the optically variable structure, at a third angle or third range of angles of emission from the device different from the first and second angles or first and second range of angles, limits emission of luminescent radiation to a third colour including the third wavelength or a third range of colours including the third wavelength, wherein the third colour or range of colours is different to the first and second colours or range of colours. In this embodiment, not only does the luminescent material emit luminescent radiation at a third wavelength but the optically variable structure controls its direction of emission from the device, providing yet another characteristic for authentication, for example. In some instances, one or both of the first and second wavelengths may be present in the third colour or range of colours.

In some embodiments, the third wavelength is in the visible spectrum and will thus appear as a distinct visible colour at a particular viewing angle, thereby enabling the feature to be authenticated by a human. In some embodiments, all three emission wavelengths from the device may be in the visible spectrum and appear as different visible colours at different viewing angles.

Other embodiments may include a luminescent material which luminesces at four or more different wavelengths, to provide different characteristics. The optically variable structure may control the direction of emission of each additional component of the luminescence spectra so that each only appears at a particular viewing angle or particular viewing angles.

In some embodiments, the device has a solid-to-air interface for emitting the luminescent radiation and which extends along a first direction, and wherein two or more of the first, second and third emission angles (if there is a third emission angle) lie in the same quadrant defined between a first line extending along the first direction and a second line extending outwardly of the interface and orthogonal to the first line. This arrangement allows the different emission spectra to be viewed from the same side of the device. One of the emission angles may be directed parallel to the second line, i.e. normal to the surface of the interface.

In some embodiments, the optically variable structure is at least partially transparent or transmissive to stimulating radiation for stimulating the luminescent material. Where the optically variable structure is above the luminescent material, this allows the luminescent material to be stimulated from the same side as the luminescent emission. Where the luminescent material is above the optically variable structure, this allows the luminescent material to be stimulated from below.

In some embodiments, the optically variable structure is at least partially transmissive to the stimulating radiation for stimulating radiation directed in first and second directions, wherein the first and second directions are angled relative to one another by an angle equal to the difference between the first and second emission angles. This arrangement enables stimulating radiation to pass through the optically variable structure in two different directions so that the stimulating radiation will reach the luminescent material for two different tilt angles whose difference corresponds to the difference between the emission angles. This allows the change of luminescent emission spectra to be observed at a single observation point or location without simultaneously rotating or changing the direction of the stimulating radiation, to facilitate detection and authentication by a human observer, for example. In some embodiments, the stimulating radiation may be directed over a wide range of angles and therefore impinge on the optically variable structure over a wide range of incident angles. The ability of the optically variable structure, in this embodiment, to transmit stimulating radiation having different incident angles allows the radiation to reach the luminescent material over a range of different tilt angles.

In some embodiments, the device has an interface for emitting the luminescent radiation from the luminescent material wherein the optically variable structure is positioned between the luminescent material and the interface, so that in this arrangement, the optically variable structure transmits the luminescent radiation therethrough. Thus, in this embodiment, the optically variable structure functions as a wavelength selective filter which also selects the direction of transmission of luminescent radiation through the device based on wavelength. The interface may be an interface of the optically variable structure or another interface, for example, provided by a layer of material external of the optically variable structure.

In some embodiments, the luminescent material may be disposed externally of the optically variable structure or device. In other embodiments, the luminescent material may be disposed internally of the optically variable device, and in yet other embodiments, the luminescent material may be partially disposed externally of the optically variable device and partially disposed within the optically variable device. For example, in this latter embodiment, luminescent material which emits one of the first and second wavelengths may be disposed externally of the optically variable device and luminescent material which emits luminescent radiation at the other of the first and second wavelengths may be disposed within the optically variable device. On the other hand, luminescent material which emits luminescent radiation at both the first and second wavelengths may be disposed both externally and internally of the optically variable device.

Configuring the device with the luminescent material disposed externally of the optically variable structure or device may simplify the manufacturing process, increase the range of materials that can be used as the luminescent material and improve the ease with which properties or characteristics of the optically variable device and the luminescent material can be changed in the design and manufacturing process. For example, where the optically variable device is a multi-layer interference structure comprising layers of material having different refractive indices and precisely controlled thicknesses, which are typically fabricated using vapour deposition processes, it is not necessary to consider the effect of the luminescent material on the refractive index of a particular layer within the stack in the design process, which may limit the number of suitable luminescent materials that can be used. Furthermore, it is not necessary to modify the fabrication process to include luminescent material and control its thickness. As the fabrication process may involve high temperatures, high energy ions or deep UV and/or x-ray radiation, the luminescent material need not be limited to only those materials that can withstand the high temperatures involved, but can include many other materials, for example, organic materials.

In some embodiments, the device has a first interface for emitting the luminescent radiation and a second interface opposite the first interface, with the optically variable structure or device being positioned between the first and second interfaces. In some embodiments, the luminescent material is positioned externally of the optically variable device and externally but proximate to the second interface. The luminescent material may be immediately adjacent the second interface or spaced therefrom by one or more intermediate layers. In some embodiments, one or more of the intermediate layers comprises an adhesive material. In other embodiments, the luminescent material may be disposed at least partially or completely within the adhesive layer.

In some embodiments, the luminescent material is in the form of one or more luminescent layers.

In some embodiments, the optically variable device comprises any one or more of an optical interference structure, a liquid crystal structure, a micro electrical mechanical system, a diffraction structure and a holographic structure.

In some embodiments, the optically variable structure comprises a plurality of layers of material.

In some embodiments, the optically variable structure or device comprises an optical interference structure comprising three or more layers of material, each layer being adjacent another said layer and arranged in a stack.

In some embodiments, the optical interference structure is in the form of a continuous sheet. In other embodiments, the optical interference structure comprises discrete particles or flakes, in which each particle or flake comprises three or more layers of material arranged in a stack.

In some embodiments, the optical interference structure comprises first, second and third layers of material wherein the refractive index of the second layer is either higher or lower than the refractive index of the first and third layers.

In some embodiments, at least a portion of the optically variable structure is transmissive to visible light.

In some embodiments, at least a portion of the optically variable structure is adapted to control transmission of visible light therethrough and its direction based on the wavelength of the light.

In some embodiments, at least a portion of the optically variable structure is adapted to limit the wavelengths of visible light that can be transmitted therethrough (in any direction).

In some embodiments, the optically variable structure comprises first and second opposed interfaces, and at a first predetermined angle of emission from one of the interfaces, permits emission from the interface of visible light at a first wavelength, and at a second predetermined angle of emission from the interface, different from the first predetermined angle, permits emission of visible light at a second wavelength, different to the first wavelength, and the transmissivity of the optically variable structure for visible light of the first wavelength relative to the transmissivity of the optically variable structure for visible light of the second wavelength changes with a change in transmission/emission angle from the first predetermined angle to the second predetermined angle. In this embodiment, the optically variable structure functions as a wavelength selective filter, in which the intensity of transmitted radiation depends on both wavelength and transmission/emission angle. For example, in one embodiment, the transmissivity of the optically variable structure for visible light of the first wavelength at the first predetermined angle is greater than the transmissivity of the optically variable structure for visible light of the second wavelength at the first angle. Alternatively, or in addition, the transmissivity of the optically variable structure for visible light of the second wavelength at the second predetermined angle may be greater than the transmissivity of the optically variable structure for visible light of the first wavelength at the second predetermined angle.

In some embodiments, the optically variable structure comprises first and second opposed interfaces, and at a first predetermined angle or first range of angles of emission from one of the interfaces, limits emission of visible light from the interface to a first wavelength of visible light or a first range of wavelengths of visible light including the first wavelength, and at a second predetermined angle or second range of angles of emission from the interface, different from the first predetermined angle or first range of angles, limits emission of visible light to a second wavelength or a second range of wavelengths of visible light including the second wavelength, wherein the second wavelength or range of wavelengths is different to the first wavelength or range of wavelengths of visible light. In this embodiment, in transmission mode, the optically variable device transmits visible light of one colour in a first direction and transmits visible light of another colour in a second direction to provide a viewing angle-dependent colour shift. Advantageously, this provides a further feature or characteristic of the device as a security device for authentication.

In some embodiments, the optically variable structure comprises a diffraction structure and a transmissive material spaced from the diffraction structure. The luminescent material is disposed between the diffraction structure and the transmissive material, wherein the transmissive material and/or the interface between the transmissive material and the luminescent material is adapted to reflect part of the luminescent radiation produced by the luminescent material towards the diffraction structure and to transmit part of the luminescent radiation therethrough, wherein the intensity of transmitted luminescent radiation is a function of wavelength of the luminescent radiation and angle of emission thereof from the security device.

In some embodiments, the diffraction structure comprises a reflective material. The diffraction structure may comprise a holographic diffraction structure.

In some embodiments, the optically variable structure comprises a reflector, an absorber and a support for enabling a spacing between the reflector and absorber to be varied, and the luminescent material is disposed between the reflector and the absorber, wherein the absorber controls the admittance of the reflector in response to changes in the spacing therebetween. The emissivity of the device for luminescent radiation of the first and second wavelengths may be varied by changing the spacing between the absorber and reflector. The spacing may be varied by any suitable means, including, for example, a variable mechanical, electrical or magnetic force.

In some embodiments, the optically variable structure comprises a member having opposed upper and lower major surfaces, and opposed first and second edges, wherein the luminescent means comprises a luminescent material on or above the upper major surface for producing luminescent radiation of the first wavelength, and a luminescent material on or below the lower major surface for producing luminescent radiation of the second wavelength.

In some embodiments, the optically variable structure comprises a plurality of members, adjacent members being spaced apart to provide a gap therebetween for the passage of luminescent radiation from the luminescent material for producing luminescent radiation of the second wavelength.

In some embodiments, the device has a lower surface or interface, and the lower major surface of the or each member is angled upwardly relative to the lower surface or interface of the device.

In some embodiments, the optically variable structure comprises a first portion having an area which faces in a first direction and a second portion having an area which faces in a second direction different from the first direction, and wherein the luminescent means comprises first luminescent means in the first area, when, when stimulated, emits luminescent radiation of the first wavelength, and second luminescent means in the second area, which, when stimulated, emits luminescent radiation of the second wavelength.

In some embodiments, the device extends along a plane, and the first area faces away from one side of a line orthogonal to the plane and the second area faces away from one of (1) the other side of the line and (2) the same side of the line. The optically variable structure may further comprise a blocking formation for reducing, at a predetermined angle, the emissivity of the device for luminescent radiation of one of the first and second wavelengths relative to the emissivity of the device for luminescent radiation of the other of the first and second wavelengths.

In some embodiments, the optically variable structure may comprise a laterally extending series of side-by-side ridge formations each having a first portion and a second portion. Each or a plurality of ridge formations may further include a blocking formation for reducing, at a predetermined angle, the emissivity of the device for one of the first and second wavelengths relative to the other.

In some embodiments, the luminescent means comprises one or more first regions of a luminescent material which produces luminescent radiation of the first wavelength, one or more regions of luminescent material which produces luminescent radiation of the second wavelength, and wherein the optically variable structure comprises one or more first areas and one or more second areas, wherein the first area(s) has a higher reflectivity than the second area(s) for radiation of the first wavelength, and the first area(s) is arranged to provide a background for the first region(s) at the first angle of emission and the second area(s) is arranged to provide a background for the first region(s) at the second angle of emission, and wherein the background area for the first region(s) provided by the first area(s) relative to the background area for the first region(s) provided by the second area(s) changes with changes in the emission angle from the first angle to the second angle.

In some embodiments, the optically variable structure is positioned to provide a background to the luminescent material, and wherein at the first emission angle, the optically variable structure reflects luminescent radiation at the first wavelength, and wherein the reflectivity of the optically variable structure changes with a change in emission angle from the first angle. In this arrangement, the amount of luminescent radiation at the first wavelength reflected by the optically variable structure and thereby emitted from the device changes with emission angle. This results in a higher intensity of luminescent radiation of a particular wavelength at one angle relative to the luminescent intensity for that particular wavelength at another angle.

In some embodiments, the luminescent material which luminesces at the first wavelength has a boundary defining a first predetermined shape and the luminescent material which luminesces at the second wavelength has a boundary defining a second predetermined shape. The first and second predetermined shapes may be the same or different. In some embodiments, the first and second predetermined shapes may either be arranged not to overlap one another, or to partially or fully overlap one another.

In some embodiments, the device includes a region external of the peripheral boundary of the optically variable structure, the region containing one or more predetermined colour. The colour may be luminescent or solid or part luminescent and part solid. The colour or one or more colours external of the optically variable structure may be selected (1) to match one or more luminescent colours emitted from within the area of the optically variable structure, and/or (2) to provide a comparison therewith. This arrangement may be beneficial in facilitating authentication or verification of the device as a security device, for example.

Embodiments of this aspect of the invention may include any one or more further features disclosed herein.

According to another aspect of the present invention, there is provided an arrangement comprising a luminescent material for producing, when stimulated, luminescent radiation of a predetermined colour or wavelength, an optically variable structure for controlling emission, from within an area of said optically variable structure, of said luminescent radiation from said arrangement, and to cause, from said area, the emissivity of said arrangement for said luminescent radiation to change with a change in at least one of or both (1) emission angle from said arrangement and (2) the angle or direction of incident stimulating radiation on said arrangement, the arrangement further comprising an area external of the peripheral boundary of said optically variable structure having colour, and which is positioned to enable the colour to be compared with the colour of luminescent emission from within the area of the optically variable structure.

In some embodiments, the coloured area may be disposed proximate or adjacent the peripheral boundary of the optically variable structure. The colour contained in the area may be luminescent or solid or part luminescent and part solid.

In some embodiments, the colour in the area may substantially match the colour of the luminescent emission from within the area of the optically variable structure.

Embodiments of this aspect of the invention may include any one or more further features disclosed herein.

According to another aspect of the present invention, there is provided a device including luminescent means for producing, when stimulated, luminescent radiation, the device being configured to change the colour of luminescent radiation emitted therefrom with a change in one or both of (1) emission angle and (2) angle of incidence of stimulating radiation for stimulating said luminescent means.

Embodiments of this aspect of the invention may include any one or more further features disclosed herein.

According to another aspect of the present invention, there is provided a device comprising luminescent means, which, when stimulated, produces luminescent radiation of a plurality of different wavelengths, and an optically variable structure for controlling emission of the luminescent radiation from the device to produce a change in colour of luminescent emission with a change in at least one of (1) emission angle from the device, and (2) angle of incidence of stimulating radiation directed towards said device.

Embodiments of this aspect of the invention may include any one or more further features disclosed herein.

According to another aspect of the present invention, there is provided a device comprising: luminescent means, which, when stimulated, produces luminescent radiation of first and second wavelengths, the second wavelength being different to the first wavelength, said luminescent means including a luminescent material; and an optically variable structure for controlling emission of luminescent radiation of at least one of the first and second wavelengths from the device, the device being arranged to permit, from within an area of the optically variable structure, emission of luminescent radiation of the first and second wavelength from the device, wherein the optically variable structure is arranged to cause, from said area, the relative emissivity of the device for luminescent radiation of the first and second wavelengths to change with at least one or both of (1) a change in emission angle of luminescent radiation from said device and (2) a change in the direction or angle of incidence of stimulating radiation on said device for stimulating said luminescent means.

In some embodiments, the change in relative emissivity of the device for luminescent radiation of the first and second wavelengths occurs at the same emission angle as the direction or angle of incidence of stimulating radiation changes.

Embodiments of this aspect of the invention may include any one or more further features disclosed herein.

According to another aspect of the present invention, there is provided a device comprising a luminescent material, which, when stimulated, emits luminescent radiation, and an optically variable structure, which controls the intensity of emission of said luminescent radiation from said device with angle of emission of said luminescent radiation from said device, based on the wavelength of said luminescent radiation.

In some embodiments, the optically variable structure is responsive to the wavelength of the luminescent radiation to control the intensity of emission of the luminescent radiation from the security device with angle of emission.

In some embodiments, the optically variable structure comprises an optical interference structure. The optical interference structure may comprise a plurality of layers of material. In some embodiments, the optical interference structure comprises three or more layers of material in which each layer has a different refractive index to that of an adjacent layer.

Embodiments of this aspect of the invention may include any one or more further features disclosed herein.

According to another aspect of the present invention, there is provided a device including an optically variable structure comprising first and second opposed electromagnetic radiation transmissive interfaces, an electromagnetic radiation transmissive medium between said first and second interfaces, and control means for controlling the intensity of radiation emitted from one of said first and second interfaces that is passed through the other of said first and second interfaces and said medium based on the wavelength of said electromagnetic radiation and the emission angle of said electromagnetic radiation from said device.

In some embodiments, the control means permits transmission of radiation of first and second wavelengths from the other interface to the one interface, the second wavelength being different from the first wavelength, and permits emission of radiation of the first wavelength from the device at a first angle of emission, and permits emission of radiation of the second wavelength from the device at a second angle of emission, different from the first angle, and the control means causes the emissivity of the device for radiation of the first or second wavelengths to change relative to the emissivity of the device for radiation of the other of the first or second wavelengths with a change in emission angle from the first emission angle to the second emission angle.

In some embodiments, the control means is adapted to cause the emissivity of the device for luminescent radiation of the first wavelength at the first angle to be greater than the emissivity of the device for radiation of the first wavelength at the second angle. Alternatively, or in addition, the control means is adapted to cause the emissivity of the device for radiation of the second wavelength at the second angle to be greater than the emissivity of the device for radiation of the second wavelength at the first angle.

In some embodiments, one or both of the first and second wavelengths are in the visible spectrum.

In some embodiments of this aspect of the invention, the device is a security device.

According to another aspect of the invention, there is provided a paint, coating, covering, ink, toner fluid, powder, mixture, suspension, or other substance, comprising particles, pigments or flakes, wherein at least some of the particles, pigments or flakes each comprises a device according to any aspect or embodiment of the invention disclosed or claimed herein.

Embodiments of this aspect of the invention may include any one or more further features disclosed herein.

According to another aspect of the present invention, there is provided a method of authenticating a security device which includes a luminescent material, which, when stimulated produces luminescent radiation of first and second wavelengths, the second wavelength being different to the first wavelength, the method comprising the steps of exposing the security device to stimulating radiation for stimulating the luminescent material to produce luminescent radiation of the first and second wavelengths, and observing or detecting in the luminescent radiation from the security device a change in intensity of luminescent radiation of the first or second wavelengths relative to the intensity of the luminescent radiation of the other of the first or second wavelengths with a change in emission angle from the security device.

Embodiments of this aspect of the invention may include any one or more further features disclosed herein.

According to another aspect of the present invention, there is provided a method of authenticating a security device which includes a luminescent material, the method comprising the steps of exposing said security device to stimulating radiation for stimulating said luminescent material to produce luminescent radiation and observing a colour shift in the luminescent radiation from said security device with a change in emission angle from said security device.

In some embodiments, the method comprises observing a first dominant colour at a first angle of emission and a second dominant colour, different from the first dominant colour at a second angle of emission different from the first angle.

Embodiments of this aspect of the invention may include any one or more further features disclosed herein.

According to another aspect of the present invention, there is provided a method of authenticating a security device which includes a luminescent material, which, when stimulated, produces luminescent radiation of first and second wavelengths, the second wavelength being different to the first wavelength, the method comprising the steps of: exposing the security device to stimulating radiation for stimulating the luminescent material to produce luminescent radiation of the first and second wavelengths, and observing or detecting in the luminescent radiation from the security device a change in intensity of luminescent radiation of the first or second wavelengths relative to the intensity of the luminescent radiation of the other of the first or second wavelengths with at least one or both of (1) a change in emission angle from the security device and (2) a change in direction or angle of incidence of stimulating radiation on the security device for stimulating said luminescent material.

Embodiments of this aspect of the invention may include any one or more further features disclosed herein.

According to another aspect of the present invention, there is provided a method of authenticating a security device, the security device having first and second opposed electromagnetic radiation transmissive interfaces and an electromagnetic radiation transmissive medium between said first and second interfaces, the method comprising the steps of exposing said first interface to electromagnetic radiation and observing from the second interface a change in relative intensities of first and second wavelengths of radiation emitted from the security device with a change in emission angle from said security device.

In some embodiments, the step of observing or detecting comprises observing a colour shift in radiation emitted from the security device with the change in emission angle.

BRIEF DESCRIPTION OF THE SEVERAL VIEWS OF THE DRAWINGS

Examples of embodiments of the present invention will now be described with reference to the drawings, in which:

FIG. 8A shows a plan view of a security device (i.e. at a viewing angle normal to its surface) according to another embodiment of the present invention;

FIG. 8B shows a cross-sectional view of the security device of FIG. 8A along the line A-A';

FIG. 9A shows a plan view of a security device (i.e. at a viewing angle normal to the surface) according to another embodiment of the present invention;

FIG. 9B shows a cross-sectional view through the security device of FIG. 9A along the line A-A';

FIG. 10A shows a plan view of a foil to which an optical security device can be applied;

FIG. 10B shows a cross-sectional view through a foil and an optical security device according to an embodiment of the present invention;

FIG. 10C shows a cross-sectional view through the optical security device and foil of FIG. 10B when the security device is mounted to the foil;

FIG. 10D shows a cross-sectional view through the optical security device and foil combination shown in FIG. 10C mounted to a substrate;

FIG. 10E shows a plan view of the optical security device/foil combination of FIG. 10D mounted to the substrate;

FIG. 11A shows a cross-sectional view through an optical security device according to another embodiment of the present invention;

FIG. 11B shows a cross-sectional view of the optical security device of FIG. 11B when mounted to a substrate;

FIG. 11C shows a cross-sectional view of an optical security device according to another embodiment of the present invention;

FIG. 11D shows a cross-sectional view of a substrate for receiving the optical security device of FIG. 11C;

DETAILED DESCRIPTION

Examples of embodiments of the invention are described below with particular reference to the device as a security device. However, as indicated above, the device may be used for any other application, non-limiting examples of which include encryption, e.g. to encrypt or provide latent symbols or messages, for printing or for decorative purposes, e.g. in paints, coatings or coverings. Accordingly, the following description of embodiments of the device applies equally to examples of the device as used in any other application.

Figure 1:
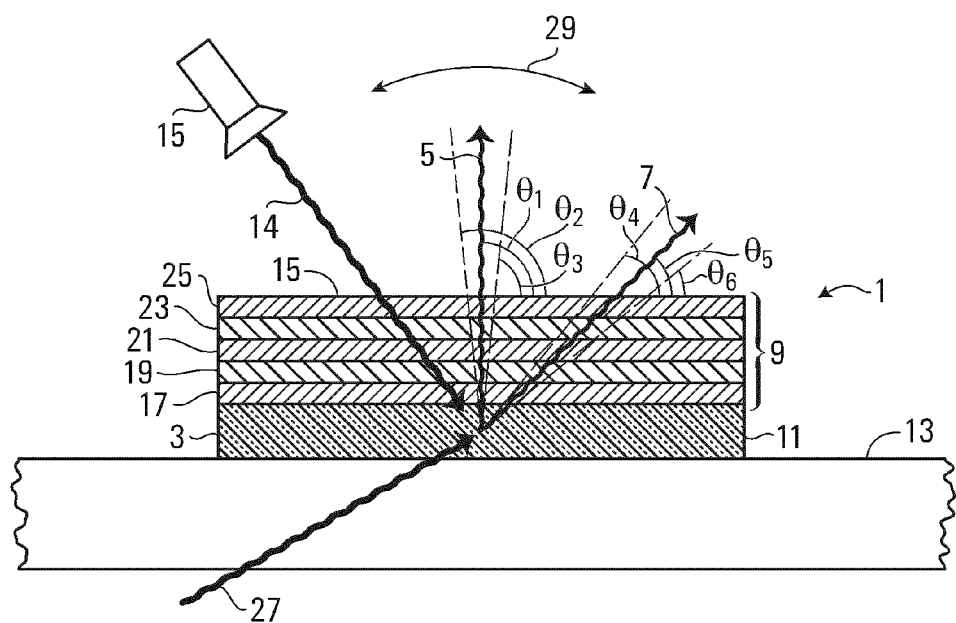
FIG. 1 shows a cross-sectional view through a security device according to an embodiment of the present invention.

Referring to FIG. 1, a security device 1 according to an embodiment of the present invention, comprises a luminescent material 3, which when stimulated emits luminescent radiation of first and second wavelengths 5, 7, and an optically variable structure or device 9 arranged to control emission of the luminescent radiation 5, 7 from the security device. In particular, the optically variable structure is arranged to permit emission of luminescent radiation of the first wavelength from the security device at a first angle of emission $\theta_1$ or a first range of emission angles $\theta_2$ to $\theta_2$, and to permit emission of luminescent radiation of the second wavelength from the security device at a second angle of emission $\theta_4$, or a second range of emission angles $\theta_5$ to $\theta_6$. The optically variable structure 9 is further adapted to cause the relative emissivity of the security device for luminescent radiation of the first and second wavelengths to change with a change in emission angle from the first emission angle $\theta_1$ to the second emission angle $\theta_4$.

In this particular example, at the first emission angle $\theta_1$, the emissivity of the optically variable structure for luminescent radiation of the first wavelength is greater than the emissivity of the optically variable structure for the second wavelength. Thus, at the first angle, the optically variable structure suppresses or limits emission of luminescent radiation of the second wavelength relative to emission of luminescent radiation of the first wavelength.

The actual intensity of luminescent emission of the first and second wavelengths from the security device at the first angle is dependent both on the respective intensities of luminescent radiation of the first and second wavelengths generated by the luminescent material, which may be the same or different, and on the ability of the optically variable structure to suppress emission of the second wavelength relative to the first. The combination of the luminescent material and optically variable structure may be adapted so that, at the first angle of emission, the intensity of luminescent emission for the first wavelength is greater than that for the second, if any. For example, if the luminescent material, when stimulated, produces luminescent radiation of the first and second wavelengths of equal intensity, at the first emission angle, the intensity of luminescent radiation emitted from the security device will be greater for the first wavelength than for the second wavelength due to the higher transmissivity of the optically variable structure for the first wavelength relative to the second at that angle. The variable structure may be arranged so that the intensity of luminescent emission of the first wavelength dominates any luminescent emission of the second wavelength over the first range of emission angles $\theta_2$ to $\theta_3$.

Similarly, at the second emission angle $\theta_4$, the emissivity of the optically variable structure for luminescent radiation of the second wavelength is greater than the emissivity of the optically variable structure for luminescent radiation of the first wavelength. Thus, at the second emission angle, the optically variable structure suppresses or limits emission of luminescent radiation of the first wavelength relative to the second wavelength.

Again, the actual intensity of luminescent emission of the first and second wavelengths from the security device at the second angle is dependent both on the respective intensities of luminescent radiation of the first and second wavelengths generated by the luminescent material, which may be the same or different, and on the ability of the optically variable structure to suppress emission of the first wavelength relative to the second. The combination of the luminescent material and optically variable structure may be adapted so that, at the second angle of emission, the intensity of luminescent emission for the second wavelength is greater than that for the first, if any. For example, if the luminescent material, when stimulated, produces luminescent radiation of the first and second wavelengths of equal intensity, at the second emission angle, the intensity of luminescent emission from the security device will be greater for the second wavelength than for the first wavelength due to the higher transmissivity of the optically variable structure for the second wavelength relative to the first at that angle. The optically variable structure may be arranged so that the intensity of luminescent emission from the security device at the second wavelength dominates any emission of luminescent radiation of the first wavelength over the second range of emission angles $\theta_5$ to $\theta_6$. Thus, a shift in the dominant wavelength or colour emitted from the security device will be observed as the emission or observation angle changes from the first emission angle to the second emission angle and vice versa.

In other embodiments, at one of the first and second emission angles, the emissivity of the optically variable structure or the security device may be substantially the same or similar for both the first and second wavelengths of luminescent radiation. In some embodiments, the emissivity of the optically variable structure or the security device for luminescent radiation of one of the first and second wavelengths may be substantially the same or similar at the first and second emission angles. In this case, the emissivity of the optically variable structure or the security device for the other of the first and second wavelengths will change with a change in emission angle from the first to the second emission angle or vice versa. One or both of the first and second wavelengths may be in the visible spectrum or one or both of the first and second wavelengths may be outside the visible spectrum, for example the infrared or ultraviolet spectrum.

In this particular embodiment, the luminescent material is formed as a layer 11 on a substrate 13 such as a bank note, credit card or document. The luminescent layer 11 may comprise a mixture of two luminescent substances each of which luminesces at a different wavelength in the visible spectrum when irradiated with stimulating radiation, for example, ultraviolet (UV) light from a suitable UV light source 15 or other radiation from a suitable source. The luminescent layer may comprise an ink or lacquer containing luminescent pigments and may be applied to the substrate using any suitable printing, coating or other deposition technique. Alternatively, the luminescent layer may be applied to the optically variable device 9 and secured to the substrate using a suitable adhesive.

In this embodiment, the optically variable device 9 is positioned over the luminescent layer 11 and transmits the luminescent radiation therethrough to a solid-to-air interface 15 from which the luminescent radiation is emitted at different angles of emission depending on its wavelength.

In this embodiment, the optically variable device is adapted to control transmission of the luminescent radiation therethrough based on the wavelength of the radiation. In particular, the optically variable device is responsive to the wavelength of luminescent radiation to control the direction of transmission of the luminescent radiation through the device depending on its wavelength. The optically variable device may comprise any suitable device adapted to perform this function. In the embodiment of FIG. 1, the device 11 comprises an optical interference device comprising a number of layers of material of controlled thickness and refractive index which cause refraction and interference of the luminescent radiation. In the example of FIG. 1, the optically variable device comprises five layers of material positioned one above the other in a stack formation with adjacent layers having different refractive indices. In one embodiment, the refractive indices of adjacent layers alternate between higher and lower values. For example, the refractive index of the first, third and fifth layers may be either higher or lower than the refractive index of the second and fourth layers. In one embodiment, the first layer 17 has a relatively high refractive index, the second layer 19 has a relatively low refractive index, the third layer 21 has a relatively high refractive index, the fourth layer 23 has a relatively low refractive index and the fifth layer 25 has a relatively high refractive index.

In the embodiment of FIG. 1, the optically variable device is also transmissive to the excitation radiation used to stimulate luminescence emission from the luminescent material so that the excitation radiation can be applied to the same side of the optical security device from which the luminescent radiation is emitted. To effect transmission of the excitation radiation, the materials of the optical stack may be selected to have relatively low absorption at the wavelength(s) that stimulate the luminescence. Materials which have relatively low UV absorption at wavelengths of some UV stimulated luminescent materials include zirconium oxide ($ZrO_2$) and silicon oxide ($SiO_2$), $ZrO_2$ having a relatively high refractive index, and $SiO_2$ having a relatively low refractive index. In one embodiment, the first, third and fifth layers 17, 21, 25 each comprises $ZrO_2$, and the second and fourth layers 19, 23 each comprises $SiO_2$.

In some embodiments, the optical interference stack may comprise three or more layers having alternating relatively high and relatively low refractive indices, for example, any number of layers in the range of 3 to 15 or more.

Generally, the performance of the optical interference stack in terms of limiting transmission of only certain wavelengths and limiting the range of angles over which a wavelength is transmitted, depends on how the structure is modelled. At the interface between different layers, a certain amount of light will be transmitted, and a certain amount reflected back into the originating layer, the amount reflected back increasing with the difference in the refractive indices of the two layers. The light which is reflected back interferes both constructively and destructively with light in the layer, resulting in the selectivity of the transmission angle and wavelength(s) supported for transmission to the next layer and ultimately through the optical structure.

Thus, generally, as the difference in the refractive indices between adjacent layers increases and/or as the number of layers increases, the range of angles over which each luminescent spectral component is emitted from the optically variable device becomes narrower, the emission direction better defined, and the component becomes more monochromatic. Thus, depending on the number of layers and their relative refractive indices, the optical security device can be designed to produce a gradual shift from one colour to another as the emission angle is changed, or a sharp, e.g. digital-like change or switch from one colour to another. In the former case, the optically variable device may support both transmission of first and second colours each at a respective different emission angle and one or more other colours resulting from mixing of the first and second colours at a respective different emission angle, for example between the two emission angles of the first and second colours. Thus an observer will see a colour shift from the first colour to a mixture of both colours to the second colour, or vice versa, as the viewing angle is changed. For example, if the first colour is red and the second green, a colour shift of red to orange to green or vice versa will be observed.

Depending on the selectivity of the optically variable structure, it may not be possible to completely eliminate the second colour component from the first colour component at the emission angle which favours the first colour. Similarly, it may not be possible to completely eliminate the first colour component from the second colour component at the emission angle which favours the second colour.

The performance of the optical security device also depends on how well the colours emitted by the luminescent material are matched to the colours which are transmitted by the optically variable structure. If the colours are well matched, the luminescence emission will generally appear brighter than if the colours are poorly matched. Also, depending how well the colours are matched, increasing the number of layers in the optical structure may affect the brightness of the luminescence emission. In particular, increasing the number of layers tends to narrow the band of wavelengths that can be transmitted. If the luminescent material emits over a wider band, only part of the available luminescence will be transmitted.

As the number of layers in the optical structure increases, absorption of the excitation radiation (e.g. UV light) may increase, in which case, there will be a trade-off between increasing the number of layers to obtain a better defined luminescent emission characteristic and decreasing the number of layers to reduce absorption of excitation light. In addition, for materials which are relatively absorbing of the excitation light, fewer layers may be used in comparison to an optical stack formed of layers which are relatively transmissive to the excitation light.

In other embodiments, which contemplate stimulating the luminescent material by applying excitation light from another direction to avoid transmission through the optically variable device, for example, from the other side of the substrate 13, as indicated by arrow 27 in FIG. 1, absorption by the optical stack of excitation light need not be considered when designing the optical stack.

In some embodiments, the interference layers of the optical stack may be configured so that the layer or layers with a higher refractive index have a thickness corresponding to ¼ wavelength of a targeted wavelength for the optical reflectance spectrum and the layer or layers with a lower refractive index have a thickness corresponding to ¾ wavelength. Thus, in the embodiment where the optical stack comprises alternating layers of $ZrO_2$ and $SiO_2$, the $ZrO_2$ layers have a thickness of ¼ wavelength and the $SiO_2$ layers have a ¾ wavelength thickness. This configuration also contributes to the efficiency of the fabrication process, in that the deposition rate of $SiO_2$ or other low index material, which forms the thicker layer is generally higher than the deposition rate of $ZrO_2$ or other high index material.

Figure 2:
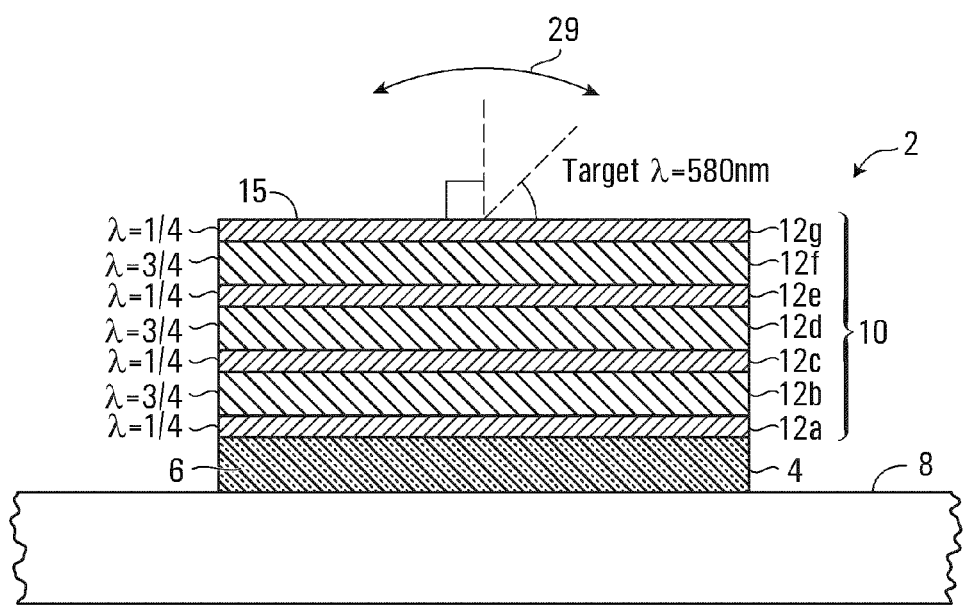
FIG. 2 shows a cross-sectional view through a security device according to another embodiment of the present invention.

A specific embodiment of an optical stack will now be described with reference to FIGS. 2 and 3. This example is included herein for illustrative purposes only and is in no way limiting of the invention. Referring to FIG. 2, a security feature 2 comprises a luminescent material 4 formed as a layer 6 above a substrate 8 and an optically variable stack 10 positioned above the luminescent layer. The optical stack is formed of seven layers of alternating high and low refractive index materials 12a to 12g with the lowermost layer 12a and each alternating layer 12c, 12e and 12g being formed of a high refractive index material and the second, fourth and sixth layers 12b, 12d, 12f being formed of a low refractive index material. In this specific example, the high refractive index material forming the first, third, fifth and seventh layers 12a, 12c, 12e and 12g is $ZrO_2$ which has a refractive index, n, of 2.05173 and the low refractive index material forming the second, fourth and sixth layers 12b, 12d and 12f is $SiO_2$, which has a refractive index, n, of 1.45874. In designing the stack, a required characteristic in the optical performance of the stack is defined. One particular characteristic is the wavelength of light for which the transmissivity by the optical stack is a minimum at an emission angle of 90° to the surface. Having defined the "target" wavelength, the thickness of the layers in the optical stack can be determined. In particular, the thickness, $t_1$ of the ¼ wavelength layers can be determined from the equation:

$$t_1 = \frac{\lambda}{4n_1},$$

where $\lambda$ is the target wavelength and $n_1$ is the refractive index of the ¼ wavelength layer.

The thickness of the ¾ wavelength layer $t_2$ can be determined from the equation:

$$t_2 = \frac{3\lambda}{4n_2},$$

where $n_2$ is the refractive index of the ¾ wavelength layer.

In this specific example, a target wavelength $\lambda$=580 nanometers is selected. From the above equations, the target thickness of the ¼ wavelength $ZrO_2$ layer, $t_1$=70.67 nanometers, and the target thickness of the ¾ wavelength $SiO_2$ layer, $t_2$=298.20 nanometers.

Figure 3:
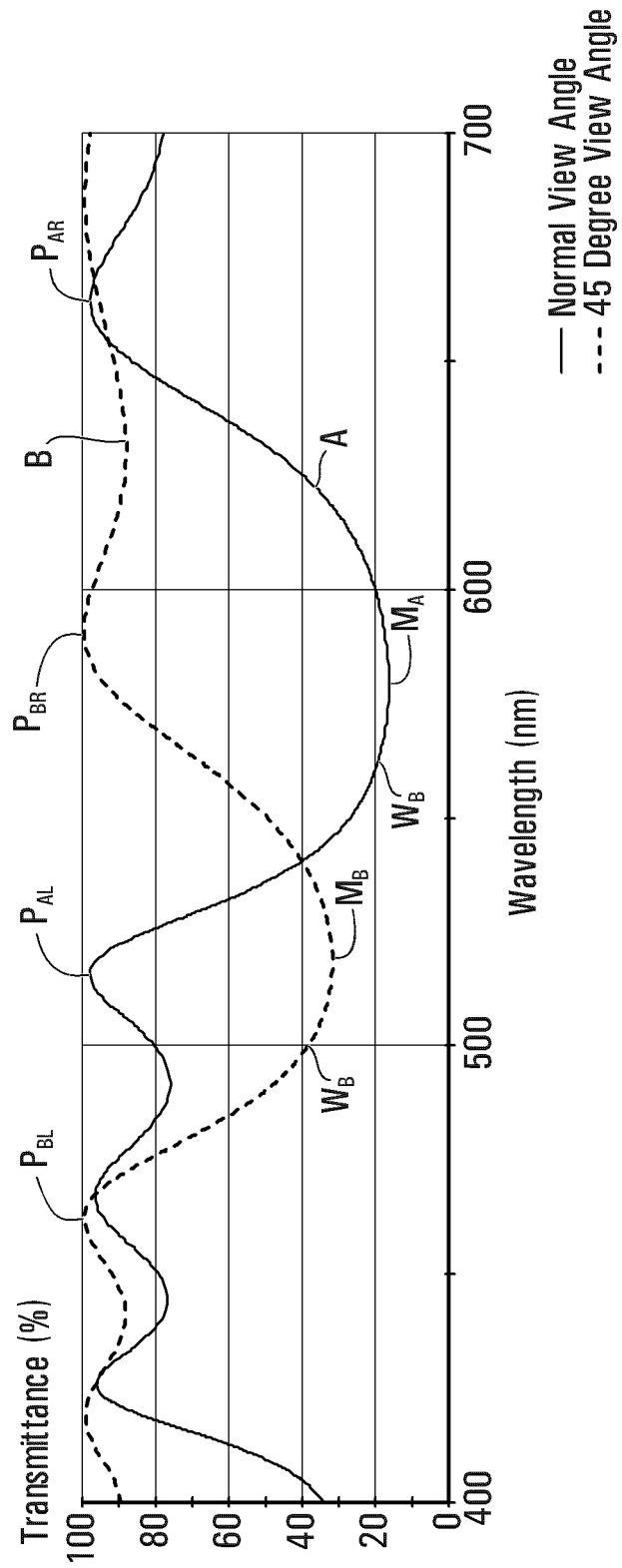
FIG. 3 shows an example of a graph of transmittance as a function of wavelength for the optically variable structure of the embodiment shown in FIG. 2.

FIG. 3 is a graph of transmittance as a function of wavelength showing the optical response of the optical stack of FIG. 2 for both a viewing angle which is normal to the upper surface 15 of the optical stack, indicated by the solid line curve A, and a viewing angle of 45° to the upper surface 15 of the optical stack, as indicated by the broken line curve B. The optical response of the seven layer stack of FIG. 2 was modelled by Concise MacLeod Software (version 8.16.196) by Thin Film Center Inc., Tuscan, Ariz. U.S.A.

As can be seen from the graph at normal viewing angle (curve A), the transmittance of the stack has a minimum value of about 18% at a wavelength of about 580 nanometers, corresponding to red light, and has a maximum value of about 98% for a wavelength of about 520 nanometers, corresponding to green light. Conversely, at a 45° viewing angle (curve B), the optical stack has a transmittance of about 92% for a wavelength of 580 nanometers (red light), and a transmittance of about 32% for a wavelength of 520 nanometers (green light). Thus, the transmittance of the optical stack at normal viewing angle is significantly greater for green light than for red light and at a 45° viewing angle the transmittance is significantly greater for red light than for green light.

With a luminescent material which is capable of emitting luminescence at the appropriate wavelengths, the combination of the optical stack and the luminescent material enable a colour change from green at normal viewing angle to red at a 45° viewing angle to be observed. In general, the luminescent material is adapted to emit a first colour or wavelength for which, at a first viewing angle, the optical stack has a relatively high transmittance, and to emit a second colour or wavelength for which, at the same angle, the transmittance of the optical stack is relatively low; and where at a second viewing angle, the transmittance of the optical stack for the second colour or wavelength is relatively high, and at the same angle, the transmittance of the optical stack for the first colour or wavelength is relatively low. In the present example, the luminescent material may be selected to emit one or more wavelengths in the green part of the optical spectrum where the transmittance at normal viewing angle is in the region of a maximum, for example in the range 510 to 525 nanometers, and to emit one or more wavelengths in the red part of the visible spectrum in the region where the transmittance is a maximum at a 45° viewing angle, for example in the range of 575 to 610 nanometers. Due to the non-zero transmittance of the optical stack at normal viewing angle for red light, some red luminescence will be transmitted through the optical stack at normal viewing angle with the green luminescence. However, the green luminescence will dominate. Similarly, for a 45° viewing angle, due to the non-zero transmittance of the optical stack for green light, some green luminescence will be transmitted through the optical stack with the red luminescence. However, the red luminescence will dominate.

It will be noted that the optical response curves A and B of FIG. 3 both have similar shapes, each having left and right-hand peaks $P_{AL}$, $P_{AR}$, $P_{EL}$, $P_{ER}$ separated by a trough or well $W_A$, $W_B$ each having a minimum $M_A$, $M_B$. As the viewing angle changes from normal to 45°, curve A is effectively shifted to the left, i.e. the left and right-hand peaks $P_{AL}$, $P_{AR}$ and the minimum $M_A$ are shifted to shorter wavelengths. Thus, what was a minimum transmittance for red light at normal viewing angle becomes a minimum transmittance for green light at a 45° viewing angle, and what was a maximum transmittance for green light at normal viewing angle becomes a maximum for transmittance for red light at a 45° viewing angle. In the present example, the sides of the trough or well both have a finite slope, and the bottom of the well is curved and has a non-zero minimum. These characteristics will give rise to the transmission of finite amounts of different colours within the spectral range of the trough or well if produced by the luminescence material. One method of limiting the number or range of colours emitted by the optical security device at any particular emission angle would be to design the optical stack so that the sides of the trough or well are relatively vertical, the well is deep (e.g. approaches zero transmittance) and the bottom is relatively flat. Another method is to limit the number of colours that can be emitted by the luminescent material, when stimulated. For example, the luminescent material may be designed only to emit green and red light having a respective wavelength or number or range of wavelengths.

In another example, in addition to exhibiting an angle dependent colour between first and second colours or wavelengths, the optical security device may be adapted to emit a third colour with either no or little angular dependence. With reference to FIG. 3, the luminescent material may be adapted to emit blue light in addition to green and red light. As can be seen from curves A and B, there is little angular dependence in the transmittance of light for wavelengths below about 460 nanometers as the viewing angle changes from normal to 45°. Thus, the optical security device can be arranged to emit blue light at both normal and 45° viewing angles.

Referring to FIGS. 1 and 2, the security feature 1, 2 produces a luminescent colour shifting effect when stimulated with the UV light source. The colour-shift is caused by the interaction of the light generated by the luminescent material in the optically variable device 9, 10. As a result, a person using this feature to authenticate a bank note, for example, would observe that the colour of the light being emitted by the luminescent image changes as the bank note is tilted back and forth as indicated by the arrow 29. Thus, authentication can be performed by observing the emitted colours, the angle of emission and the order in which the colours appear as the security device is tilted back and forth, and by comparing any one or more of these characteristic(s) with a known criteria. In some embodiments, the colour shift may involve only two colours whereas in other embodiments, three or more angle-dependent colours may be encoded into the security device. A wide range of colour pairs for the colour shift can be generated depending on the choice of luminescent material, e.g. inks or pigments, and the design of the optically variable stack. In some embodiments, the luminescent material comprises a mixture of different coloured pigments to produce an overall emission spectrum that is tailored to match the colour-shifting properties of the optically variable device.

Advantageously, the security feature provides significantly enhanced security over other security features which are simply based on a UV fluorescent ink, for example. The luminescent colour-shifting effect cannot be simulated by ink jet or offset printing of a UV ink. Instead, the counterfeiter must also have access to optically variable thin film foils and combine this with the correct luminescent composition (which is unknown to the counterfeiter) to match the colour switch found on genuine bank notes, for example. In addition, as commercially available colour shifting pigments are highly UV absorbing, and therefore not compatible with UV luminescent ink, embodiments of the security device in which UV light is applied to the same side as the luminescence emission further enhances the device's resistance to counterfeiting. Furthermore, for embodiments in which the luminescent emission is in the visible spectrum, the security device includes a feature that can readily be detected and authenticated by a person. The security feature also allows luminescent materials to be used which are compatible with existing UV light sources, so that new equipment for stimulating the luminescent feature is not required.

In embodiments in which the optically variable structure comprises an optical interference structure formed of alternating layers of high and low refractive index materials, a number of different materials may be suitable for the high and low refractive index layers. Non-limiting examples of high refractive index materials which may be suitable include: zirconium oxide ($ZrO_2$), titanium dioxide ($TiO_2$), indium oxide ($In_2O_3$), indium-tin-oxide (ITO), magnesium oxide (MgO), tantalum pentoxide ($Ta_2O_5$), carbon (C), ceric oxide ($CeO_2$), yttrium oxide ($Y_2O_3$), europium oxide ($Eu_2O_3$), iron oxides, for example (II) diiron(III) oxide ($Fe_3O_1$) and ferric oxide ($Fe_2O_3$), hafnium nitride (HfN), hafnium carbide (HfC), hafnium oxide ($HfO_2$), lanthanum oxide ($La_2O_3$), neodymium oxide ($Nd_2O_3$), niobium pentoxide ($Nb_2O_5$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide ($S_iO$), selenium trioxide ($Se_2O_3$), tin oxide ($SnO_2$), tungsten trioxide ($WO_3$), zinc sulfide (ZnS), zinc oxide (ZnO) and/or other high index materials, or combinations thereof.

Non-limiting examples of low refractive index materials which may be suitable include: silicon dioxide ($SiO_2$), aluminum oxide ($Al_2O_3$), metal fluorides, including, for example, aluminum fluoride ($AlF_3$), barium fluoride ($BaF_2$), calcium fluoride ($CaF_2$), cerium fluoride ($CeF_3$), lanthanum fluoride ($LaF_3$), magnesium fluoride ($MgF_2$), neodymium fluoride ($NdF_3$), sodium aluminum fluorides (e.g., $Na_3AlF_5$ or $Na_5Al_3F_{14}$), samarium fluoride ($SmF_3$), lithium fluoride (LiF), and/or other low index materials or combinations thereof. Other suitable low index materials may include organic monomers and polymers, including dienes or alkenes such as acrylates (e.g., methacrylate), perfluoroalkenes, polytetrafluoroethylene (Teflon), or fluorinated ethylene propylene (FEP).

The suitability of the material for the high and low index index layers may depend on their ability to transmit electromagnetic radiation therethrough at the wavelength(s) of the luminescent stimulating radiation. It is to be noted that in some embodiments, the optically variable device or structure may comprise layers which are all formed of either relatively high or relatively low refractive index materials, with the difference in refractive index between adjacent layers being relatively small. An example is described below with reference to FIG. 14.

In some embodiments, the optical interference stack may comprise three or more layers of material. The upper layer may be either the higher refractive index material or the lower refractive index material depending on the implementation. For example, where the upper layer interfaces with air, and a relatively high reflection at the interface is beneficial, the upper layer may be formed of a higher index material, for example. Similar considerations may be applied to the lowermost layer of the optical stack. The uppermost and lowermost layer may both be higher or lower index materials or one may be a higher index material and the other a lower index material. The number of layers in the optical stack may be odd or even.

In other embodiments of the security device, the optically variable structure is adapted to control luminescent emission of only one of the first or second wavelengths and not to control luminescent emission from the security device of the other wavelength. For example, returning to FIG. 1, the luminescent layer 11 may be adapted to produce luminescence of the first wavelength but not the second wavelength or vice versa. The security device may include luminescent material above the optically variable structure 9 which luminesces at the other of the first and second wavelengths. The optically variable structure may be adapted not to control emission of luminescent radiation of the other wavelength from this upper layer. In this arrangement, when stimulated with a suitable source of stimulating radiation, luminesce from the upper layer is emitted without the optically variable structure controlling the direction of emission thereof, and therefore the emissivity of luminescent radiation from the upper layer may be similar at all angles, for example. On the other hand, the angle dependent emissivity from the security device of luminescent radiation originating in the lower layer 11 is controlled by the optically variable structure 9 and therefore the intensity of luminescence originating from the lower layer exhibits an angle dependence. The optically variable structure may be arranged so that the emissivity of the security device for luminescence from the lower layer is relatively high for a predetermined angle or range of angles and is substantially reduced at other angles. In this case, for the predetermined angle or range of angles which favours emission of luminescence from the lower layer from the security device, the observed colour will be the additive effective of the first and second wavelengths. At emission angles where the emissivity of the security device for luminescence from the lower layer 11 is reduced, the observed colour will be dominated by luminescent emission from the upper layer above the optically variable structure. Accordingly, a change in colour of emitted luminescent radiation will be observed as the security device is tilted or the observation angle relative to the security device otherwise changed.

Figure 5:
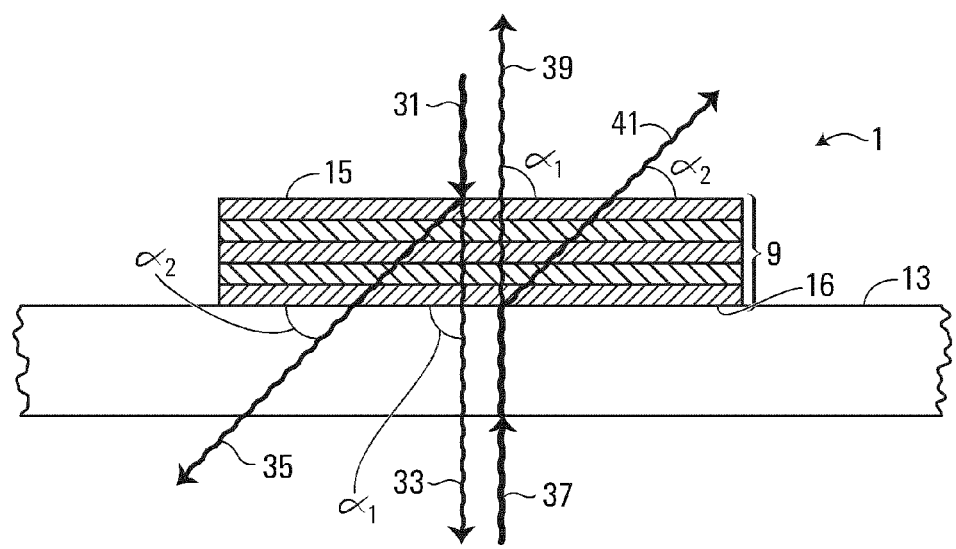
FIG. 5 shows a cross-sectional view of a security device according to another embodiment of the present invention.
Figure 6:
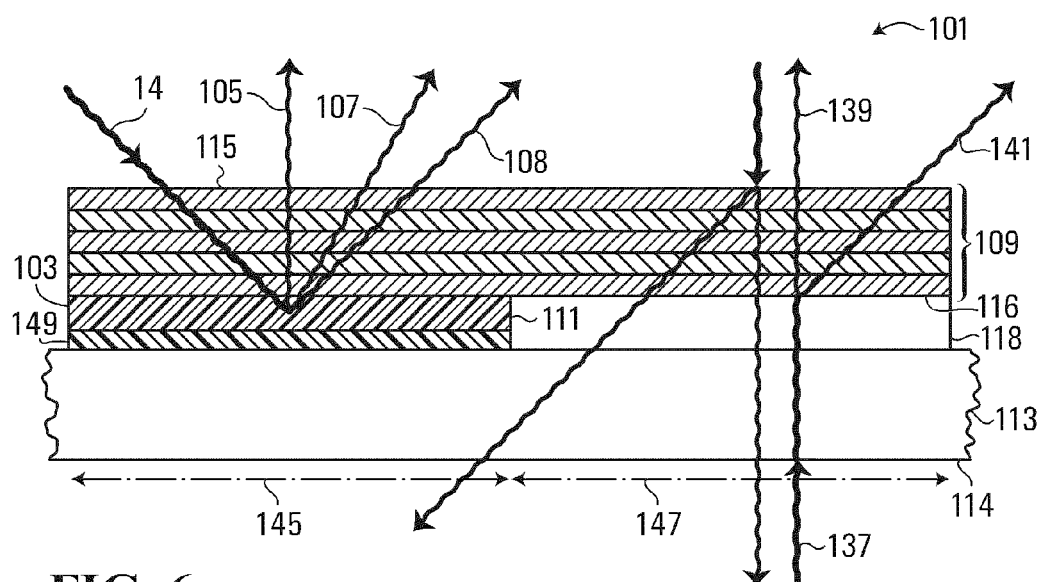
FIG. 6 shows a cross-sectional view of a security device according to another embodiment of the present invention.

Another aspect of the present invention provides a security device which includes an optically variable structure or device having first and second opposed electromagnetic radiation transmissive interfaces, an electromagnetic radiation transmissive medium between the first and second interfaces, and control means, e.g. structure, for controlling the intensity, direction and wavelength of radiation emitted from one of the first and second interfaces that is passed through the other of the first and second interfaces and the medium. In some embodiments, the security device may be transmissive to electromagnetic radiation in the visible spectrum and provide an angle-dependent colour-shift effect on the emission side for light transmitted through the device from the other side. Examples of embodiments which incorporate this feature are shown in FIGS. 4 to 6.

Figure 4:
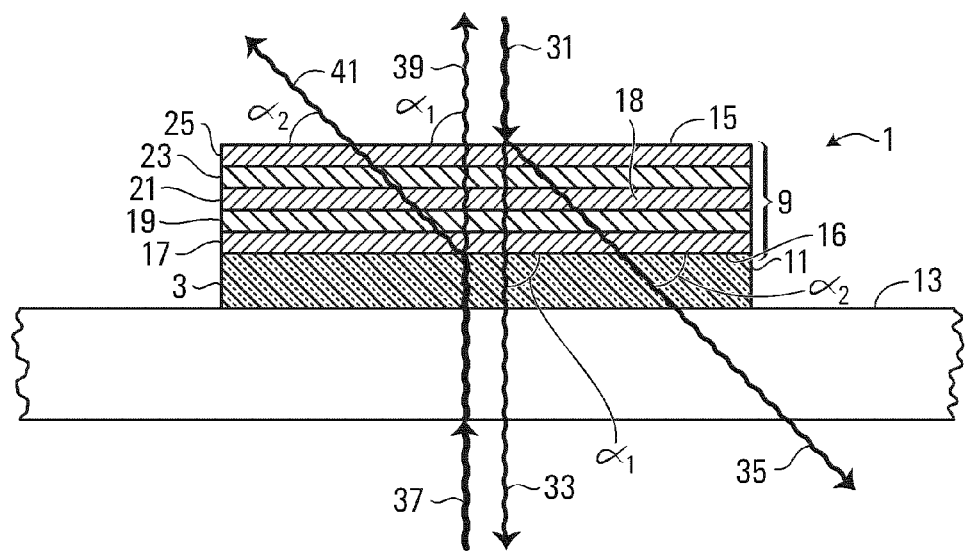
FIG. 4 shows a cross-sectional view of a security device in accordance with another embodiment of the present invention.

FIG. 4 shows the security feature incorporated into the security device of the embodiment of FIG. 1, and like parts are designated by the same reference numerals. In particular, the security device 1 includes an optically variable device 9 having first and second opposed interfaces 15, 16 and an optically transmissive medium 18 between the two interfaces which is capable of transmitting visible light therethrough. The optically variable device is positioned above a layer 11 of luminescent material 3 above a substrate 13. Both the luminescent layer and the substrate are capable of transmitting visible light therethrough and may comprise transparent or translucent materials. It is to be noted that in this aspect, the luminescent material does not participate in the security feature and in other embodiments, may be omitted altogether.

The optically variable device comprises a number of layers of material 17, 19, 21, 23, 25 forming an optical interference structure and may be the same as that described above in connection with FIG. 1 or 2, for example. In particular, each layer has a controlled thickness and refractive index to produce an interference effect which controls the direction and wavelength of visible light emitted from one interface which is passed through the device from the other interface.

In the embodiment of FIG. 4, when a source of white light indicated by arrow 31 is directed towards the first interface 15, the optically variable structure or device 9 controls the light transmitted therethrough to permit transmission of light 33 of a first wavelength or colour from the first interface 15 to the second interface 16 and to be emitted from the second interface at a first angle $\theta_1$. The optically variable structure is adapted to permit transmission of light 35 of a second wavelength or colour from the first interface 15 to the second interface 16 and to be emitted from the second interface at a different angle, $\theta_2$. The optically variable structure 9 is further adapted to cause the relative emissivity of the security device for light of the first and second wavelengths to change with a change in emission angle from the first emission angle $\alpha_1$ to the second emission angle $\alpha_2$, or vice versa. In the present embodiment, the relative transmissivity of the optically variable structure controls the relative emissivity of the security device for radiation of the first and second wavelengths or colours with emission angle. In this example, at the first transmission or emission angle $\alpha_1$, the transmissivity of the optically variable structure for light of the first wavelength or colour is higher than the transmissivity of the optically variable structure for light of the second wavelength or colour. Accordingly, at the first emission angle, the intensity of light emitted from the second interface will be greater for the first wavelength or colour than for the second wavelength or colour, if any. At the first emission angle, the optically variable structure may substantially suppress transmission and emission of the second wavelength or colour and may also suppress the transmission and emission of other wavelengths so that light emitted from the second interface at the first angle is substantially limited to light of the first wavelength or colour.

Similarly, at the second emission angle $\alpha_2$, the transmissivity of the optically variable structure for light of the second wavelength or colour is higher than the transmissivity of the optically variable structure for the first wavelength or colour. Accordingly, at the second emission angle, $\alpha_2$, the intensity of light emitted from the second interface 16 will be greater for the second wavelength or colour than for the first wavelength or colour. At the second emission angle, the optically variable structure may be adapted to substantially suppress transmission and emission of the first wavelength or colour, and may substantially suppress the transmission of other wavelengths, so that light emitted from the second interface at the second angle is substantially limited to light of the second wavelength or colour.

Thus, the security device provides an angle-dependent chromatic filter. The optical security device may also provide a similar effect when viewed from the other side of the device. Thus, when visible light indicated by arrow 37 is directed towards the second interface 16 through the substrate 13 and luminescent layer 11, the optically variable device controls the direction and wavelength of light through the device to substantially limit emission from the first interface 15 at a first angle $\theta_1$ to light having the first wavelength or colour, and to substantially limit emission from the second interface 15 at a second angle $\theta_2$, to light having the second wavelength or colour.

In other embodiments, at one of the first and second emission angles $\alpha_1$, $\alpha_2$, the transmissivity and emissivity of the security device for light of the first and second wavelengths or colours may be substantially the same. In some embodiments, for one of the first and second wavelengths or colours, the transmissivity and emissivity of the security device may be substantially the same for both the first and second emission angles, $\alpha_1$, $\alpha_2$.

The light source may be natural ambient light or light from an artificial source, for example, a lamp. In other embodiments, the first and/or second wavelengths or colours may be outside the visible range, for example UV or IR.

The angle-dependent colour-shift of transmitted visible light provides a security feature which can be detected and authenticated by a person. On the other hand, the angle-dependent colour-shift for light outside the visible range can be detected by a suitable detector for authentication.

Advantageously, the same optically variable device can produce both colour shifting effects for luminescent radiation and colour shifting effects for transmitted visible light. This allows both attributes to be readily combined and incorporated into the same security device for use in conjunction with a transparent substrate.

In other embodiments, the security device of this aspect of the invention having angle-dependent colour shifting properties for transmitted light can be employed as a security feature without the luminescent emission angle-dependent feature, and an example of this embodiment is shown in FIG. 5.

The security device 1 comprises an optically variable structure or device 9 which is similar to that shown in FIG. 4, and like parts are designated by the same reference numerals. The optically variable device is positioned on and secured to a transparent or translucent substrate 13. The main difference between this embodiment and that shown in FIG. 4, is that the luminescent layer 11 is omitted. Otherwise, the security device functions in the same way as that described with reference to FIG. 4.

FIG. 6 shows another embodiment of a security device having both a luminescent emission angle-dependent feature and a transmitted light angle-dependent feature positioned in side-by-side relationship.

Referring to FIG. 6, the security device 101 comprises a layer 111 of luminescent material 103 and an optically variable structure or device 109 positioned above the luminescent layer. The security device is positioned above and secured to a substrate 113. The security device includes two lateral regions 145, 147 and the optically variable structure extends over both regions. In this embodiment, the luminescent layer extends over the first region 145 only. However, in other embodiments the luminescent layer may extend over both regions 145, 147. A further layer 149 may be provided between the luminescent layer and the substrate for absorbing or reflecting light in the visible spectrum. The absorber or reflector layer 149 extends over the first lateral region 145 only. The entire substrate 113 may comprise a transparent or translucent material or may comprise a transparent material in the second lateral region 147 (or over a portion thereof) and an opaque or relatively opaque material over the first lateral region 145.

The optically variable device 109 may comprise a multi-layered interference structure as described above with reference to FIGS. 1 to 5, for example.

When a suitable source of excitation radiation 14 is directed towards the luminescent layer 111 from the upper side 115 of the security device, the device emits from the upper side 115, luminescent radiation 105 having a first colour at a first emission angle and luminescent radiation 107 having a second colour at a second emission angle. Optionally, the security device may be arranged to emit luminescent radiation 108 having a third colour at a third angle.

When the security device is illuminated by light 137 directed towards a transparent portion of the lower side 114 of the substrate 113, the security device emits visible light 139 from the upper side 115 at a first angle and emits visible light 141 from the upper side of another colour at another angle. A similar effect for visible light may be observed when the light is transmitted in the opposite direction and the emitted light is observed from the underside 114 of the substrate 113, as shown by the arrows.

It is to be understood that the optically variable device in the second region may be directly adjacent the upper surface of the substrate or a transparent spacer layer 118 may be provided in this region.

A specific example of a security feature having a configuration based on the embodiment of FIG. 6 is shown in FIGS. 7A to 7D.

Referring to FIGS. 7A to 7D, an optical security device 201 comprises an optically variable stack and an underlying luminescent layer. The security device is applied over a window area 203 of a substrate 205. The substrate 205 may be relatively opaque, and the window area formed by a cut-out in the substrate material. In this embodiment, the window area 203 includes a relatively opaque region 207 having the outline of a maple leaf, which subdivides the window area into a number of transparent window regions 203a, 203b, 203c, 203d. The relatively opaque region 207 may be part of the substrate 205, or formed by another material. For example, if the substrate 205 is formed of a transparent material, the opaque region may be provided by a separate layer or coating below the luminescent layer. The optically variable stack 209 covers the window area 203. The luminescent layer 211 covers at least the relatively opaque maple leaf region, and may extend beyond this region, for example, across the entire window region or a portion thereof. The relatively opaque region below the luminescent layer enables the luminescent emission to be observed. In this particular example, the luminescent layer is a UV fluorescent ink printed onto the transparent substrate.

Figure 7A:
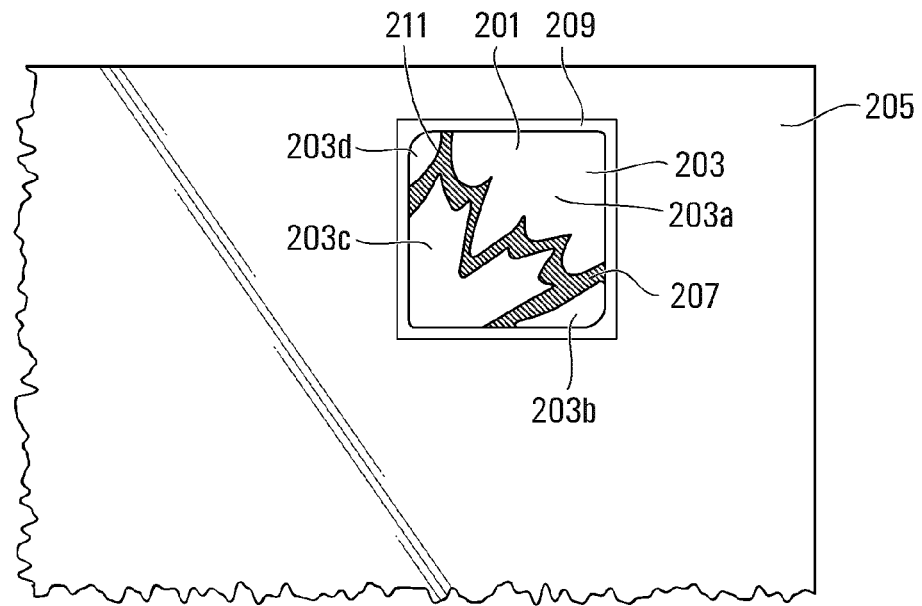
FIG. 7A shows a plan view of a security device (i.e. at a viewing angle normal to its surface) according to an embodiment of the present invention.
Figure 7B:
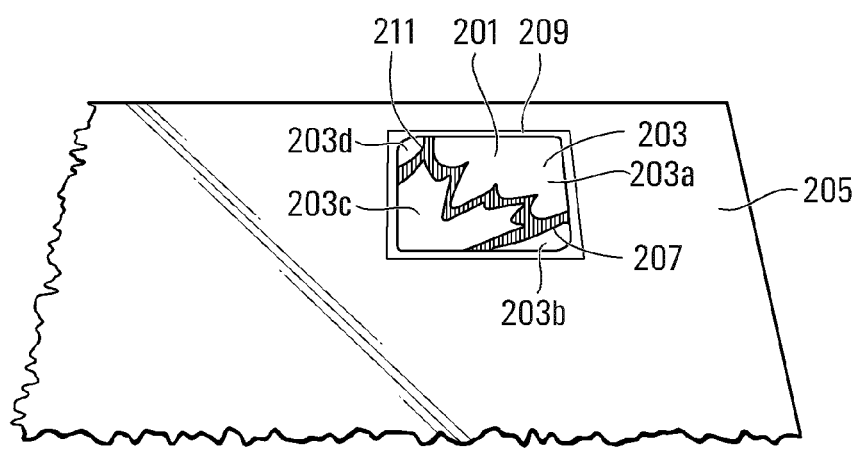
FIG. 7B shows a view of the security device of FIG. 7A at an oblique viewing angle.

FIGS. 7A and 7B show the security device under UV illumination. FIG. 7A shows the security device at an observation angle which is normal to the plane of the substrate 205 and FIG. 7B shows the security device at an observation angle of 45° to the plane of the substrate. In this example, at the normal emission or observation angle, the luminescent emission from the luminescent outline of the maple leaf is green as shown in FIG. 7A. At a 45° emission or observation angle, the luminescent emission from the maple leaf outline is red, as shown in FIG. 7B.

Figure 7C:
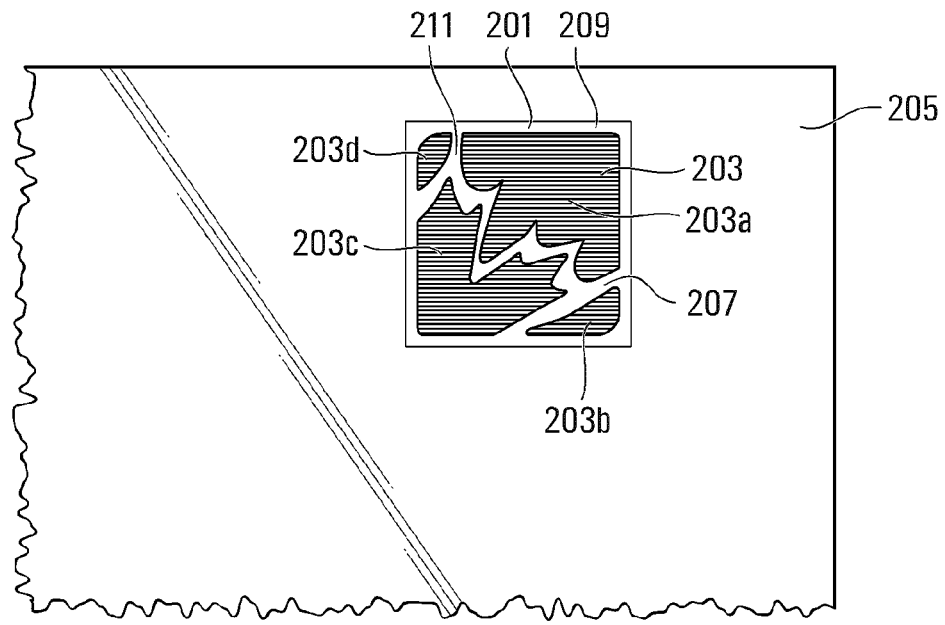
FIG. 7C shows a plan view of the security device (i.e. at a viewing angle normal to its surface) shown in FIG. 7A.
Figure 7D:
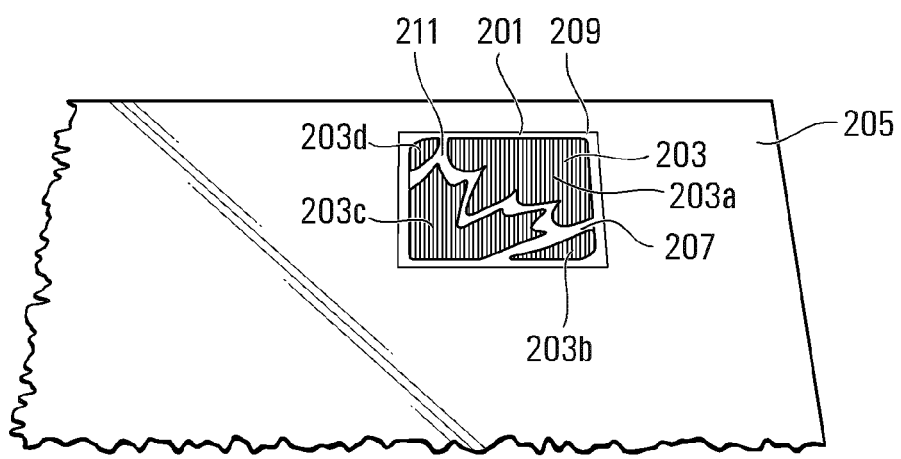
FIG. 7D shows a view of the security device of FIG. 7C at an oblique viewing angle.

FIGS. 7C and 7D show the security device illuminated with white light from behind so that light is transmitted through the device. FIG. 7C shows the appearance of the security device at an observation angle which is normal to the plane of the substrate 205 and FIG. 7D shows the appearance of the security device at a viewing angle of 45° to the plane of the substrate. At a normal observation angle, shown in FIG. 7C, the window appears blue for transmitted light. At a 45° observation angle, shown in FIG. 7D, the window appears magenta in colour for transmitted light.

In other embodiments, the luminescent feature may have any other shape or form, and each angle-dependent luminescent and transmitted colour may be any colour, as required.

Advantageously, the security device having both luminescent emission colour shift and ambient transmissive colour shift provides both a human assisted security device and a human unassisted security device, thereby enabling the security device to be authenticated by two key types of security users. In addition, the optically variable device or structure, which may comprise a relatively hard film, provides additional protection for the luminescent feature making it more durable. This is particularly advantageous for bank notes which are subjected to daily wear and tear through circulation and handling. In some embodiments, a transparent substrate material, coating or layer may be provided below the luminescent layer for protection thereof.

In some embodiments, the security device may include both a non-angle-dependent luminescent feature and an angle dependent luminescent feature which, when both are revealed combine to produce a third feature. The non-angle-dependent luminescent feature may comprise part of a symbol. The angle-dependent luminescent feature may comprise part of a symbol, for example, part of the same symbol as the non-angle-dependent luminescent feature, an extension of the same symbol, or another symbol which combines with the non-angle-dependent feature to produce a third symbol. An example of a specific embodiment of a security device having this characteristic is shown in FIGS. 8A to 8E.

Figure 8C:
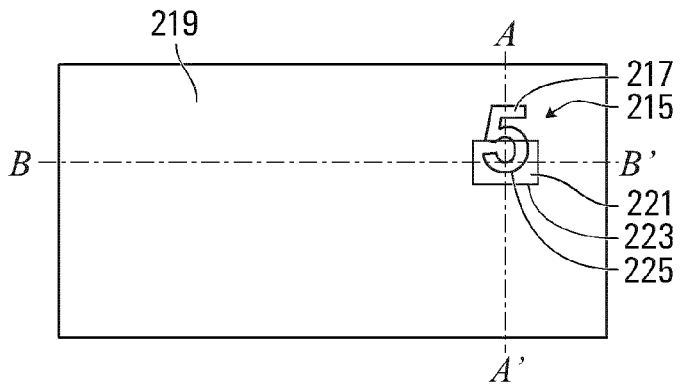
FIG. 8C shows a cross-sectional view through the security device of FIG. 8A through the line B-B'.
Figure 8C:
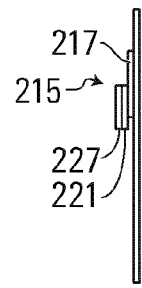
Figure 8C:
Figure 8D:
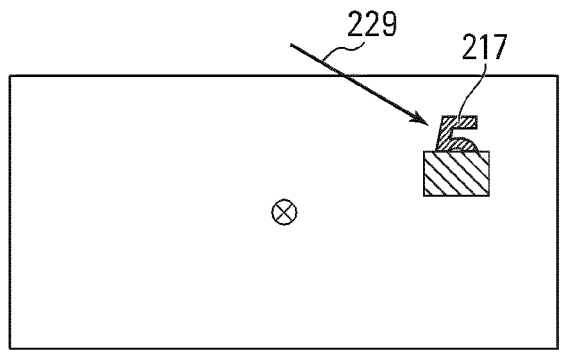
FIG. 8D shows a plan view of the security device of FIG. 8A (i.e. at a viewing angle normal to its surface), when illuminated by stimulating radiation.
Figure 8E:
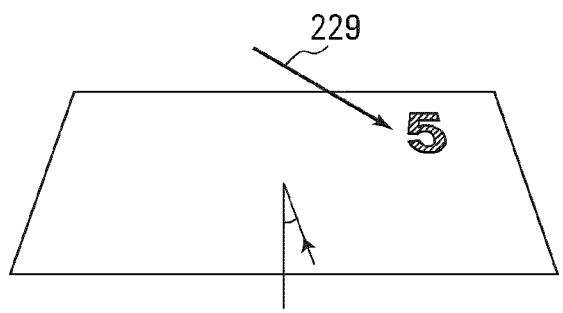
FIG. 8E shows a view of the security device of FIG. 8A at an oblique viewing angle, and when illuminated by stimulating radiation.

Referring to FIGS. 8A to 8E, an optical security device 215 comprises a symbol 217 disposed on a substrate 219. The symbol 217, which in this example is the number "5" (although in other embodiments it could be any other symbol), comprises a first layer of luminescent material which emits luminescence having a first colour or wavelength, for example red, when stimulated with appropriate radiation, e.g. UV light. The security device 215 further includes a second layer 221 of luminescent material which, when stimulated with appropriate radiation, emits radiation of a second colour or wavelength different from the first colour or wavelength, for example green. The second layer 221 is positioned over part of the symbol (in this case the lower half of the number 5). At least part of the peripheral edge 223 of the second layer 221 does not coincide with the peripheral edge 225 of the symbol so that the shape of the symbol is at least partially masked by the second layer. In this particular embodiment, the shape of the second layer is different from that of the underlying symbol with the peripheral edge 223 of the second layer extending beyond that of the symbol so that the lower half of the symbol is completely masked. The security device 215 further comprises an optically variable device 227 positioned over the second layer of luminescent material 221. The optically variable device, which may comprise a thin film optical stack is designed to, at a first emission angle, transmit light therethrough of the wavelength of luminescent emission of the second layer while suppressing or substantially blocking light emitted by the first layer, and at a second, different angle of emission, transmit light having the colour or wavelength emitted by the first luminescent layer while suppressing or substantially blocking light of the wavelength or colour emitted by the second luminescent layer 221. For example, at a normal (or other) emission angle, the optically variable device may be adapted to transmit green luminescence produced by the second layer and substantially block red luminescence from the first layer, and at a 45° (or other) emission angle transmit red luminescence from the first layer 217 and substantially block green light from the second luminescent layer 221. Referring to FIG. 8D, which shows the optical security device at a normal viewing angle, when the device is stimulated with suitable radiation 229, the upper part of symbol 217 will emit luminescent radiation at the first wavelength (e.g. red). At the same viewing angle, the lower part of the security device will emit luminescent radiation of the second colour or wavelength (e.g. green) from the second luminescent layer, and the lower part of the symbol will be obscured. Referring to FIG. 8E, which shows the optical security device at a 45° viewing angle, when the device is illuminated with stimulating radiation 229, the upper part of the symbol 217 again emits luminescence of the first wavelength. The lower part, at this viewing angle, also emits light from the first luminescent layer 217, so that the complete symbol is revealed.

Another embodiment of an optical security device is shown in FIGS. 9A to 9E, and in certain respects is similar to that of FIGS. 8A to 8E. The security device 231 comprises a symbol 233, in this case, the number "100" applied to a substrate 235. Each digit of the symbol, i.e. '1', '0', '0' comprises a first layer 237 of luminescent material which luminesces at a first colour or wavelength, for example red. A second layer 239 overlays part of the first layer 237, and in this particular example, the second layer 239 overlays the two zeros. The peripheral edge 241 of the second layer has a different shape to that of the first layer, and in this example is rectangular and extends completely beyond the peripheral edges of the first layer. An optically variable device 243, which may comprise a thin film optical interference stack, overlays the second layer 239 but does not cover the symbol "1". The optically variable device is adapted to transmit luminescent radiation from the second luminescent layer at a normal emission or viewing angle while suppressing or substantially blocking luminescent radiation from the first layer, and to transmit luminescent radiation from the first layer but to suppress or substantially block luminescent radiation from the second layer at an angle of 45°.

Figure 9C:
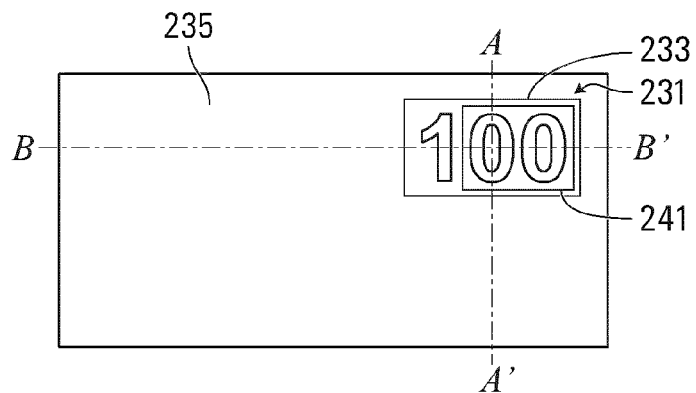
FIG. 9C shows a cross-sectional view through the security device of FIG. 9A along the line B-B'.
Figure 9C:
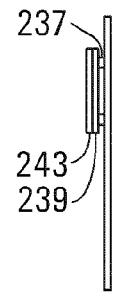
Figure 9C:
Figure 9D:
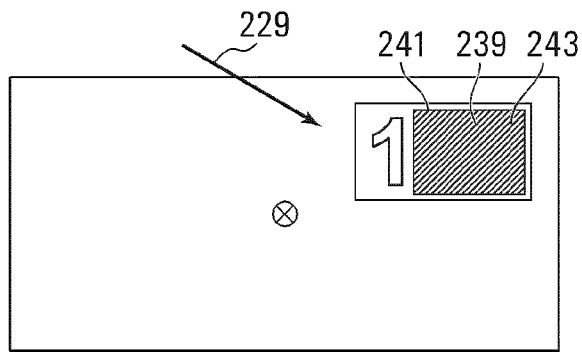
FIG. 9D shows a plan view of the security device of FIG. 9A (i.e. at a viewing angle normal to its surface), when illuminated by stimulating radiation.
Figure 9E:
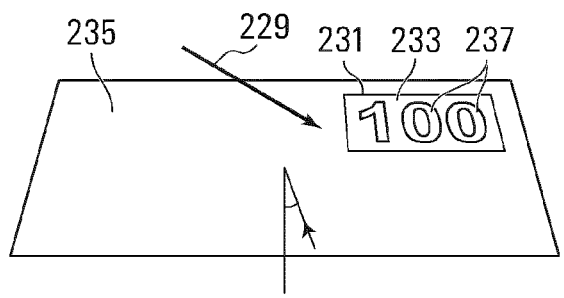
FIG. 9E shows a view of the security device of FIG. 9A at an oblique viewing angle and when the security device is illuminated by stimulating radiation.

Referring to FIG. 9D, which shows the optical security device at normal viewing angle, when the security device is illuminated by a suitable source of stimulating radiation 229, the symbol "1" will emit luminescent radiation of the first wavelength, and thereby be revealed, and at the same angle, the optically variable device 243 will transmit predominantly luminescence from the second layer 239 at the second wavelength, thereby obscuring the two zeros of the symbol. Referring to FIG. 9E, which shows the optical security device at a 45° viewing angle, when stimulated with suitable stimulating radiation 229, the number "1" of the symbol will again luminesce and at the same angle, the optically variable device 243 will transmit luminescent radiation from the first layer 237, so that the complete symbol is revealed.

It will be appreciated that in other embodiments, any other symbol or symbols may be used other than those described above with reference to FIG. 8A to 8E and 9A to 9E.

In other embodiments, the security device may include a non-luminescent colour (e.g. solid colour) against which a luminescent colour from the area of the optically variable structure can be compared. The non-luminescent colour may be positioned external of the boundary of the optically variable structure, and may have any arbitrary shape. For example, the embodiments of FIGS. 8 and 9 could be modified by replacing part or all of the area of luminescent material beyond the boundary of the optically variable structure with a solid colour or by adding an area of solid colour, e.g. near the boundary. The solid colour may be selected to match a colour of the luminescence emitted from the area within the boundary of the optically variable structure. For example, in FIG. 8, the solid colour may be selected to match the colour of the lower part of the symbol "5", and in FIG. 9, the solid colour may be selected to match the colour of the symbol "0".

In some embodiments, the security device is adapted to emit a single luminescent colour whose intensity varies with emission angle and includes a region external of the boundary of the optically variable structure containing a colour (luminescent and/or solid) with which the colour from within the area of the optically variable structure can be compared. For example, the security device of FIGS. 8 and 9 could be modified by omitting one of the luminescent materials, e.g. layers within the area of the optically variable structure, so that luminescence of only one colour is emitted, and the intensity of the luminescent emission is angle dependent. In any embodiment, the colour external of the boundary of the optically variable structure may be selected to match the colour of luminescence emitted from within the area of the optically variable structure, thereby facilitating authentication of the security device (and document or other item, if any, to which it is attached or otherwise associated with).

Various methods of fabricating a security device and applying the security device to a substrate will now be described with reference to FIGS. 10A to 10E and 11A to 11E.

FIGS. 10A to 10E show a configuration in which the security device is secured to a foil, and the foil and security device subsequently transferred to a substrate such as a bank note.

Referring to FIG. 10A, a foil 251 is provided having a window area 253. The foil may optionally contain one or more other security features 255, 257, 259 such as a hologram or other DOVID (Diffractive Optical Variable Image Device) type features.

Referring to FIG. 10B, a carrier web 261 formed of any suitable material such as PET is provided having a release layer 263. Successive layers of material forming an optically variable structure 265 are deposited onto the release layer side of the carrier web 261, using any suitable conventional deposition process such as PVD (physical vapour deposition), CVD (chemical vapour deposition), PECVD (plasma enhanced chemical vapour deposition), sputtering or any other suitable technique. The resulting optical thin film structure typically has a thickness of less than 1 micron. Next, a luminescent ink layer 267 is deposited onto the optical thin film 265, followed by application of an adhesive layer 269, which may be a hot foil transfer adhesive. The luminescent ink layer may have a typical thickness in the range of 1 to 2 microns, for example, and the adhesive layer may have a typical thickness of about 1 micron. A discrete area 271 of the resulting structure is removed, e.g. cut from the web and applied as a patch to the foil 251 over the demetallized window area 253, and is secured to a perimeter area or margin 273 surrounding the window 253, by means of the adhesive layer 269. The web carrier and release coating are removed from the optical thin film layer resulting in a foil containing the optical security device with the optical thin film 265 uppermost, and containing any other optional, selected security features, as shown in FIG. 10C.

The foil 251 is then transferred to a substrate 275 such as a bank note or other substrate. As shown in FIG. 10D, the substrate 275 may include a window area 277 and the foil applied so that the foil window 253 registers with the substrate window 277. The window allows light to pass through the foil and substrate to enable authentication of the security device using its angle-dependent colour shift for transmissive light, as described above. A plan view of an example of the foil applied to a rectangular substrate is shown in FIG. 10E. The window 277 may comprise a transparent material or a void.

In another embodiment, the security device may be applied directly to a substrate, i.e. without an intermediate foil, and various examples are described below with reference to FIGS. 11A to 11E.

Referring to FIG. 11A, a patch 271 is provided having a web carrier layer 261, a release layer 263, an optical thin film layer 265, a luminescent layer 267 and an adhesive layer 269. The patch may be formed in a similar manner to that described above in connection with FIG. 10.

Referring to FIG. 11B, a substrate 275 is provided having a window area 277. The patch 271 is positioned over the window area 277 and transferred and adhered to the upper surface 279 of the substrate by means of the adhesive layer 269. The window area 277 may include a transparent material, in which case, the adhesive layer may directly adjoin the upper surface 281 of the transparent material. Alternatively, the window area may comprise a void and the adhesive layer secured to a perimeter region or margin of the bank note (or other substrate) surrounding the window.

Figure 11E:
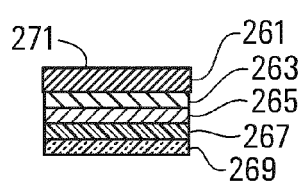
FIG. 11E shows a cross-sectional view of the optical security device of FIG. 11C mounted to the substrate of FIG. 11D.
Figure 11E:
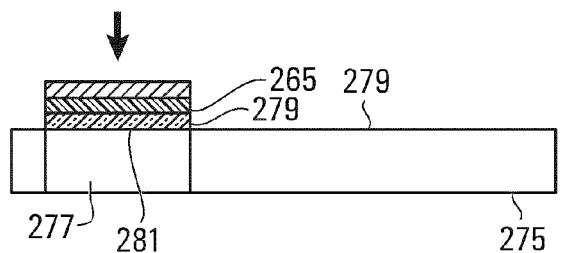
Figure 11E:
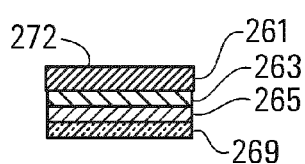
Figure 11E:
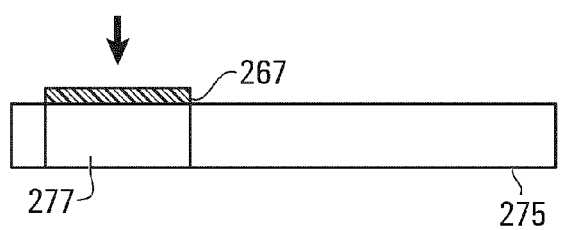
Figure 11E:
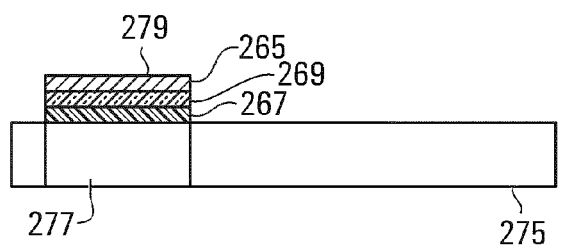

In another embodiment, the luminescent layer and the optical thin film structure are each applied to the substrate in separate steps. An example of such a process is shown in FIGS. 11C to 11E. Referring to FIG. 11C, a carrier web or foil 261 is provided having a release layer 263. Layers forming an optical thin film 265 are deposited onto the release layer 263 using any suitable deposition or coating technique, for example, PVD, CVD, PECVD, sputtering or any other suitable process. An adhesive layer 269 is subsequently applied to the optical thin film 265. A discrete area is removed from the resulting multi-layer structure to provide a patch 272.

Referring to FIG. 11D, a substrate 275 is provided having a window area 277 which may comprise a transparent material. A luminescent layer 267 is applied to the substrate over the window region. The luminescent layer may comprise an ink containing a luminescent substance, for example luminescent pigments, and may be printed over the transparent window using any suitable printing technique, for example offset printing, intaglio printing or another printing technique.

The patch 272 is subsequently applied to the luminescent layer and is secured thereto by means of the adhesive layer 269. The carrier foil 261 and the release coat 263 are removed to provide a substrate with a security device 279 mounted thereon comprising the luminescent layer 267, an adhesive layer 269 above the luminescent layer, and an optical thin film 263 above the adhesive layer.

In an alternative embodiment, the luminescent material may be incorporated into the adhesive layer. The combined layer may be produced by mixing the luminescent substance or pigments into the adhesive mixture. In some embodiments, this would eliminate the need for a separate luminescent layer, although other embodiments may include both an adhesive layer containing luminescent material, and a separate layer also containing luminescent material. In this latter embodiment, the adhesive layer may contain luminescent material of one type (e.g. producing one colour or a group of colours), and the separate luminescent layer may contain luminescent material of another type, for example producing another colour or another group of colours).

Figure 11F:
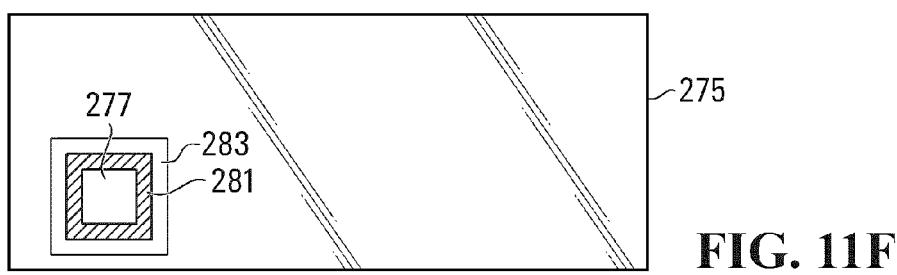
FIG. 11F shows a plan view of the optical security device and substrate of FIG. 11E.

Referring to FIG. 11F, a dark border region 281 may be provided on the substrate 275 which at least partially surrounds or is adjacent to the window region 277 and the optically variable layer or device may extend over the dark region 281. This extended region of the optically variable layer may produce an angle-dependent colour shift effect under reflected ambient light. Alternatively, or in addition, a portion of the luminescent layer may extend beyond the optically variable layer. In this case, when the security feature is illuminated by a stimulating light source, e.g. UV light, the region of the luminescent layer which is overlaid by the optically variable layer will exhibit an angle-dependent colour shift, whereas the portion which is not overlaid by the optically variable layer will not exhibit a colour shift. An example of a portion of the luminescent layer which is not overlaid by the optically variable layer is shown as a border region 283 in FIG. 11F. Providing a luminescent region which does not exhibit a colour shift may provide a contrasting reference point which may assist in accentuating the luminescent colour shift region and the colour shift effect, thereby making the security device easier to use.

Figure 12A:
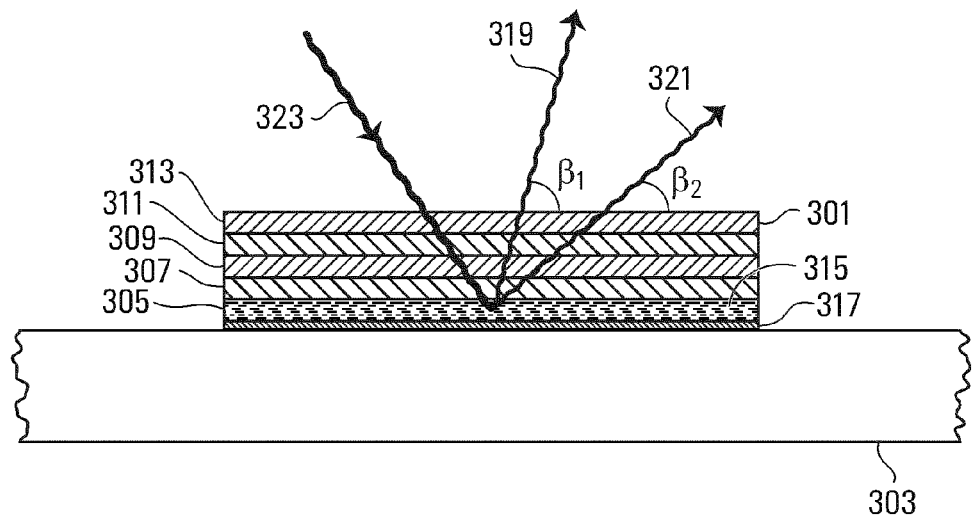
FIG. 12A shows a cross-sectional view of an optical security device according to another embodiment of the present invention.

In other embodiments, rather than the luminescent material being disposed externally of the optically variable device, the luminescent substance may be included within the optically variable device. Where the optically variable device comprises a multi-layer interference structure, the luminescent substance may be included in one or more layers of the optical interference structure or within the optical interference structure as a separate layer. FIG. 12A shows an example of an optical security device 301 mounted on a substrate 303 in which the optically variable device comprises an optical interference stack comprising a plurality of layers 305, 307, 309, 311, 313. A luminescent substance 315 is included in one of the layers, which, in this example, is the lowest most layer 305. The luminescent substance may be deposited as part of the material forming a particular layer using any suitable deposition technique such as PVD, CVD, PECVD, sputtering or any other suitable process. The luminescent substance may be selected so that it can withstand the temperatures involved in the deposition process, an inorganic substance, for example. An optional reflective layer 317 may be provided below the layer 305 containing the luminescent substance to reflect the luminescence stimulating radiation back into the luminescent substance to increase the intensity of the luminescent signals. The luminescent substance may be capable of emitting luminescence at one or more wavelengths, which may be in the visible spectrum, thereby emitting one or more different visible colours. For example, the luminescent substance may contain luminescent pigments which luminesce at a single wavelength or colour or a mixture of luminescent pigments which luminesce at different wavelengths. The refractive index and the thickness of each layer of the interference structure are selected so that each luminescent colour emitted from the luminescent substance is emitted from the optically variable device at a particular, discrete angle or range of angles to produce an angle-dependent colour shift effect. In the particular embodiment of FIG. 12A, the luminescent substance contains a mixture of two different colour pigments and the optically variable structure is tuned to the luminescent wavelengths so that light having a first colour 319 is emitted at a first angle $\beta_1$ and light of a second colour 321 is emitted at a second angle $\beta_2$ when the device is illuminated by a UV or other stimulating light source 323.

Figure 12B:
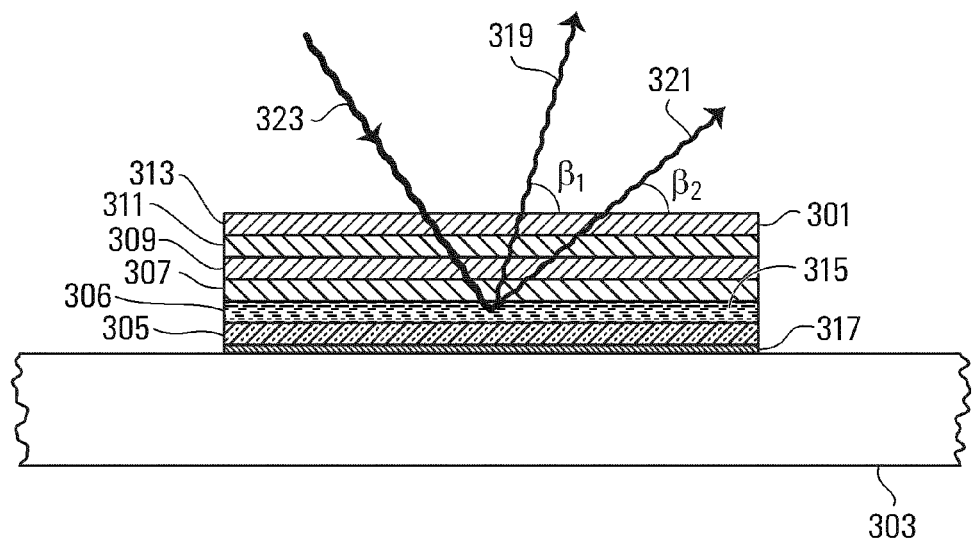
FIG. 12B shows a cross-sectional view of an optical security device according to another embodiment of the present invention.

FIG. 12B shows a cross-sectional view of a security device according to another embodiment of the present invention. The security device is similar to that shown in FIG. 12A and like parts are designated by the same reference numerals. The main difference between the embodiment of FIG. 12B and that shown in FIG. 12A is that in FIG. 12B, the luminescent substance is incorporated into the optically variable device as a separate layer 306, rather than into one of the optically variable layers. This configuration enables the luminescent layer to be deposited in a separate process from the processes involved in depositing the dielectric layers. This might enable the luminescent layer deposition process to be specifically tailored to the particular type of material, possibly with the use of lower temperatures resulting in a wider variety of luminescent materials that can be used. For example, the use of lower temperatures might allow more suitable chromophores to be used in the luminescent material, including chromophores with higher efficiency for ease of detection or viewing. Lower efficiency chromophores may also be used, and might be more suitable for machine detection. The security device shown in FIG. 12B may function in a similar manner to that of FIG. 12A.

In some embodiments of the optical security device, one or both of the optically variable structure and the luminescent material may be formed as a plurality of discrete elements, for example particles or flakes rather than as single continuous components.

Figure 13A:
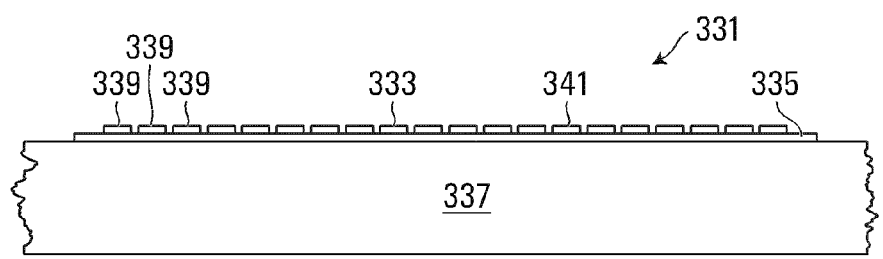
FIG. 13A shows a cross-sectional view of an optical security device according to another embodiment of the present invention.

An embodiment of a security device in which the optically variable portion is formed as discrete elements or particles is shown in FIG. 13A. In this embodiment, the security device 331 comprises an optically variable portion 333 and a luminescent portion 335. The luminescent portion is in the form of a continuous layer and positioned on a substrate 337. The optically variable portion comprises a distribution of particles 339 above the luminescent layer 335. Each particle 339 has the form of a flake, e.g. a particle having opposed major surfaces in which the length and/or width dimensions of the major surfaces is substantially greater than the thickness between the major surfaces. Advantageously, this configuration enables the orientation of the particles to be readily identified and controlled. The optically variable particles may each comprise an optical interference stack. As shown in FIG. 13A, the orientation of the upper surfaces 341 of the individual flakes are substantially aligned. This assists in maintaining uniformity or congruency of the angle dependent luminescent emission properties of the optical security device across the particles. As shown in FIG. 13A, where the substrate 337 is flat, the upper surfaces 341 of the flakes also lie in substantially the same plane. However, in other embodiments, where the substrate 337 is flat, this need not be the case, and different optically variable particles may lie in different planes, i.e. at different heights relative to a reference plane. However, any variation in height between the different particles of the flakes may be kept relatively small to reduce the masking of one particle or flake by another, which might become important at oblique viewing angles.

The optically variable particles may be applied to the luminescent layer by any suitable technique. For example, if the luminescent layer is applied as a wet or fluid substance, the optically variable particles may be applied to the luminescent layer before it has fully dried or cured so that the particles become bound to the luminescent layer, and possibly partially embedded therein. In other embodiments, the particles may be adhered to the luminescent layer using a suitable adhesive. For example, an adhesive layer may be applied to the luminescent layer, and the particles then deposited on the adhesive layer. In other embodiments, the particles may be contained in a liquid coating which is applied to the luminescent layer. The particles may be oriented by contact with the underlying layer, for example the luminescent layer or an adhesive layer. If necessary, the particles may be oriented with the assistance of some external means, for example a mechanical device, such as a roller, or by using magnetic, electrical or acoustic means.

Figure 13B:
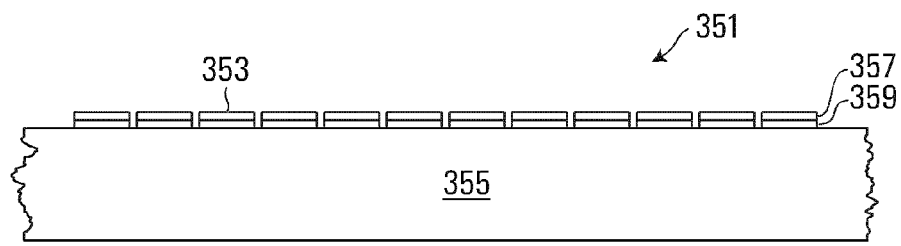
FIG. 13B shows a cross-sectional view of an optical security device according to another embodiment of the present invention.

An embodiment of a security device in which both the optically variable portion and the luminescent portion are formed as particles is shown in FIG. 13B. In this embodiment, the security device 351 comprises a distribution of particles 353 above a substrate 355. Each particle 353 has the form of a flake and comprises an optically variable portion 357 and a luminescent portion 359. The optically variable portion may comprise a multi-layer optical interference stack and the luminescent portion may comprise a luminescent layer. Again, the particles 353 are in the form of flakes so that their orientation can readily be identified and controlled. The relative position of the optically variable portion and the luminescent portion may be important, depending on the type of optically variable device. For example, where the angle-dependent colour shift is controlled by transmission through a device or structure, it is important that the optically variable device or structure is above the luminescent layer, as for example shown in FIG. 13B. In other embodiments, it may be important for the luminescent layer to be positioned above the optically variable portion of the particle. The particles may be applied to the substrate using any suitable technique. For example, the particles may be applied to the substrate using an adhesive. In other embodiments, the particles may be contained in a liquid which is then coated onto the substrate. The orientation of the particles may be controlled and fixed using any suitable technique, for example, as described above in connection with FIG. 13A.

In other embodiments, the optical security device may be adapted to emit multiple colours in which different colours are emitted at different angles to produce an iridescent effect as the security device is tilted or the observation angle relative to the security device is otherwise changed. An iridescent effect may be implemented by the combination of an optically variable device comprising a multi-layer structure and a luminescent material or other luminescence source which is capable of generating luminescent radiation having multiple different colours or wavelengths. In multi-layer films, the transmittance of the dominant colour or wavelength is strongly dependent on both the number of layers in the multi-layer film and the difference between the refractive indices of the alternating layers. The bandwidth of the transmitted spectra is dependent on the variation of the thickness of each layer having the same refractive index through the multi-layer film. In particular, the spectral bandwidth of the dominant transmission is narrow where the thickness of each alternating layer is the same throughout the multi-layer structure and broadens where the thickness is systematically varied. An example of an optical security device which is capable of producing an iridescent effect is shown in FIG. 14.

Figure 14:
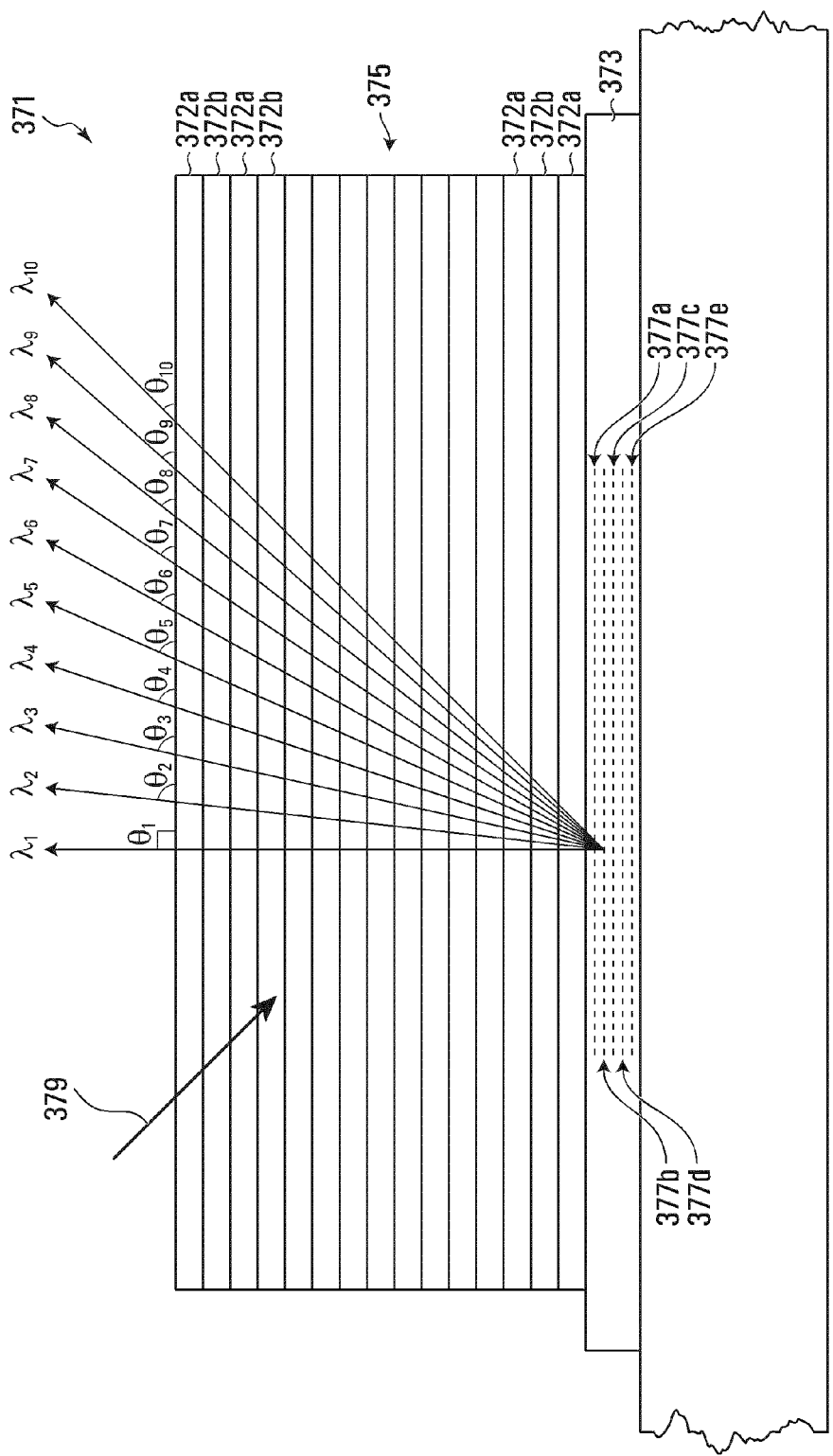
FIG. 14 shows a cross-sectional view of an optical security device according to another embodiment of the present invention.

Referring to FIG. 14, the optical security device 371 comprises a luminescent material 373 and an optically variable device 375 comprising a multi-layer film or structure. The material for each layer is selected so that the refractive indices alternate from one layer to the next between different values. The number of layers is entirely arbitrary and may be selected depending on the optical characteristic required. The multi-layer structure may for example comprise any number of layers ranging from 20 to 300 or more. The multi-layer structure may be formed by co-extrusion in which the resulting layer thicknesses are controlled by parameters of the extrusion process, for example the extrusion rate. Any suitable materials may be used to form the layers, and in one non-limiting example, the layers may comprise plastic or polymeric material, for example alternating layers of polystyrene and polymethylmethacrylate, which have refractive indices of 1.59 and 1.49, respectively.

In the present embodiment, the luminescent material 373 provides a source of luminescence of different colours or wavelengths, for example $\lambda_1$ to $\lambda_{10}$. The optically variable device 357 has a relatively high transmittance for each of a number of different wavelengths at a respective different angle, for example $\theta_1$ to $\theta_{10}$, so that a change in colour is observed with a change of emission angle. For example, the optically variable device may be adapted to transmit a dominant wavelength or dominant band of wavelengths at a particular angle while suppressing, at that angle, other luminescent wavelengths generated by the luminescent material or source 373. As the emission angle varies, the transmitted luminescent wavelength or colour may change continuously so that each transmitted colour is different from any other transmitted colour. Alternatively, the same colour may be repeated one or more times for different emission angles.

In some embodiments, one or more luminescent colours may be associated with a particular symbol or image. For example, the luminescent material 373 may comprise a plurality of layers 377a to 377e, each layer comprising a luminescent material which luminesces at a particular wavelength or colour. Each layer may be adapted to luminesce at a different wavelength or colour. A plurality of different layers may define a particular image or symbol and two or more symbols may be different or the same. When the luminescent source 373 is stimulated by appropriate stimulating radiation 379, the image associated with each colour will appear at a particular observation angle and the observed colour and possibly the symbol will change as the observation or emission angle changes. In one non-limiting example, differently coloured layers 377a to 377e define a respective number, for example 5, 4, 3, 2, 1 (or any other sequence or group of numbers). As the observation angle relative to the security device changes, the numbers will appear one after the other depending on the colour and order of colours that are transmitted by the optically variable device as the observation angle is progressively changed. Thus, the order in which the different symbols appear is essentially controlled by the optically variable device. The symbol(s) and its associated colour and the order in which the symbols appear with a change in emission/observation angle provide other security features which can be encoded into the security device and used for authentication.

It will be appreciated that forming one or more luminescent emitters or materials as a symbol to provide an additional security feature may be implemented in any of the embodiments described herein, for example, the embodiments of FIGS. 1, 2 and 4, in which the optical interference structure has fewer layers.

Figure 15A:
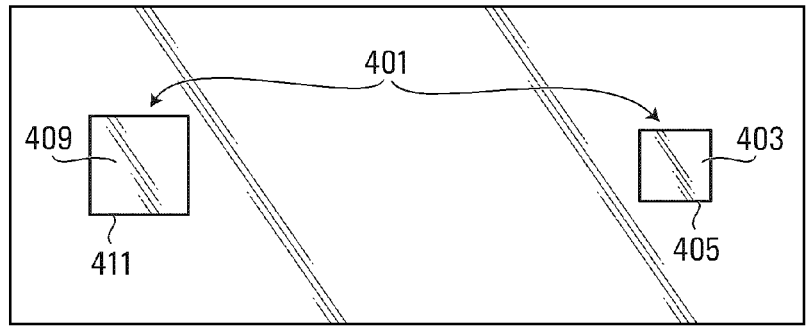
FIG. 15A shows a plan view of a distributed optical security device or feature disposed on a substrate, according to an embodiment of the present invention.
Figure 15B:
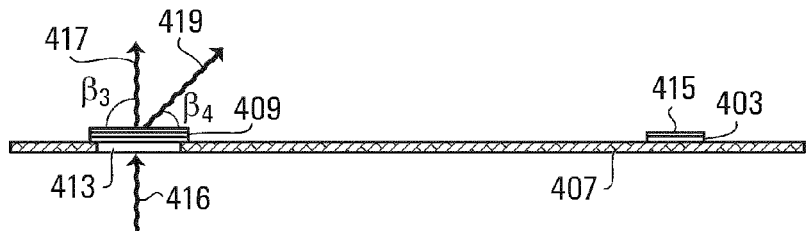
FIG. 15B shows a cross-sectional view of the optical security device shown in FIG. 15A.

In other embodiments, the optically variable device and the luminescent layer of the security device may be disposed at different locations on a substrate, and authentication of the security device may be performed by folding the substrate so that the optically variable device overlays the luminescent layer. An example of such a "distributed" security device is shown in FIGS. 15A to 15D. Referring to FIGS. 15A and 15B, a security device 401 comprises a luminescent material 403 positioned at a first location 405 on a flexible, sheet-like substrate 407 and an optically variable device 409 secured to the substrate at a second location 411. The optically variable device is positioned over a window region 413 formed in the substrate 407 to allow light to pass from one side of the substrate to the other through the optically variable device. The luminescent layer may include a optional protective cover layer 415, formed, for example, of a polymeric material, to protect the luminescent layer 403 from damage by scratching or scuffing, for instance.

In this embodiment, the optically variable device exhibits an angular dependent colour shift for transmissive light and may comprise a multi-layered optical interference structure similar to that described above. The luminescent material may be one which luminesces at one colour only or one which luminesces at two or more colours. The optically variable device is tuned to the luminescent colour or colours so that each particular colour is transmitted through the optically variable device and emitted therefrom at a discrete angle or a discrete range of angles to produce luminescence with an angle-dependent colour shift effect.

Referring to FIG. 15B, the angle-dependent colour shift effect by transmissive light can be authenticated by directing visible light 416 through the optically variable device 409 via the transparent window 413 and observing a first colour 417 at a first angle of emission $\beta_3$ and a second colour 419 at a second angle of emission $\beta_4$.

Figure 15C:
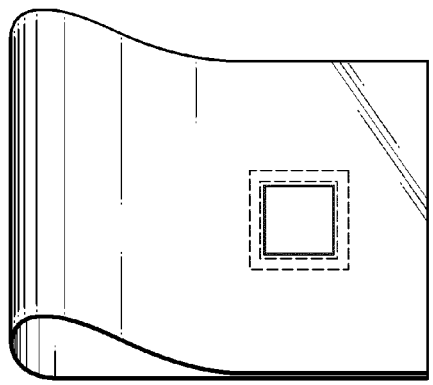
FIG. 15C shows a plan view of the optical security device of FIGS. 15A and 15B, with the substrate in a folded state.
Figure 15D:
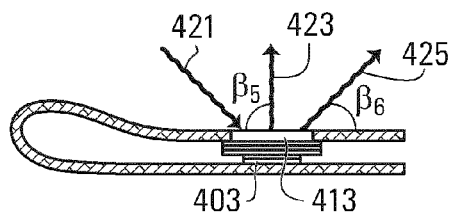
FIG. 15D shows a cross-sectional view of the optical security device shown in FIGS. 15A to 15C, with the substrate in the folded state.

Referring to FIGS. 15C and 15D, the angle-dependent luminescent security attribute may be produced and authenticated by folding the substrate 407 so that the optically variable device 409 is positioned over the luminescent region 403, directing luminescent stimulating radiation 421 through the window 413 to the luminescent layer 403, and observing luminescence emission 423 of a predetermined colour at a first luminescence emission angle $\beta_3$, and, if a second predetermined luminescent colour is present, observing luminescence emission 425 having the second colour at a second angle of emission $\beta_6$.

It will be appreciated that the transmissive light security feature can be authenticated by directing light through the optically variable device in the opposite direction to that shown in FIG. 15B and observing the angle-dependent colour shift from the window side. It will also be appreciated that the optically variable device need not be positioned on the same side of the substrate as the luminescent material, but could be positioned on the opposite side of the substrate.

Liquid Crystal Variants

In other embodiments of the present invention, the optically variable device or structure may comprise a liquid crystal material to produce an angle-dependent colour shift in emitted luminescence from the security device. One or more layers of liquid crystal material may be disposed above a luminescent material capable of luminescing at one or more wavelengths, and the layer(s) of liquid crystal material may be tuned to selectively transmit a particular wavelength of light therethrough at a particular angle. Examples of embodiments of a security device in which the optically variable device comprises a liquid crystal material will now be described with reference to FIGS. 16A to 16C and 17A to 17C.

Figure 16A:
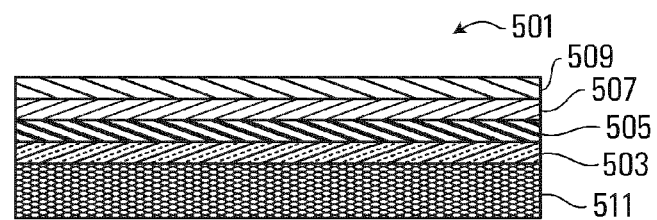
FIG. 16A shows a cross-sectional view of an optical security device implemented by a liquid crystal material according to an embodiment of the present invention.

Referring to FIG. 16A, a security device 501 comprises a layer 503 of luminescent material, a first layer 505 of a liquid crystal material above the luminescent layer and a second layer 507 of a liquid crystal material above the first layer 505. The security device further includes an upper layer 509 of a suitable polymeric material, for example, polyethylene terephthalate (PET) or bi-axially oriented polypropylene (BOPP) above the second liquid crystal layer 507 to form a laminate, and a lower layer 511 comprising an adhesive material for fastening the security device to a substrate, e.g. document.

In this embodiment, the luminescent layer is capable of luminescing at two different wavelengths in the visible spectrum, although in other embodiments, the luminescent layer may be capable of emitting only one wavelength in the visible spectrum or more than two wavelengths in the visible spectrum.

In one embodiment, one or both liquid crystal layers 505, 507 each comprises cholesteric phase liquid crystals, otherwise known as chiral nematic phase liquid crystals which exhibit chirality, i.e. handedness. In this phase, the molecules have positional ordering in a layered structure with molecules within the same layer being directed in essentially the same direction within the layer plane, and molecules in adjacent layers being oriented in different directions so that the orientation from one layer to another layer progresses in a twisting or helical manner either clockwise or anti-clockwise. The chiral pitch is the distance between two layers which have undergone a full 360° twist. The system exhibits a number of unique optical properties, including circular polarization and selective reflection. In the present embodiment, the first liquid crystal layer 505 comprises a left-handed chiral nematic phase liquid crystal material and the second layer 507 comprises a right-handed chiral nematic phase liquid crystal material. (In other embodiments the chirality of the layers may be reversed.)

Figure 16B:
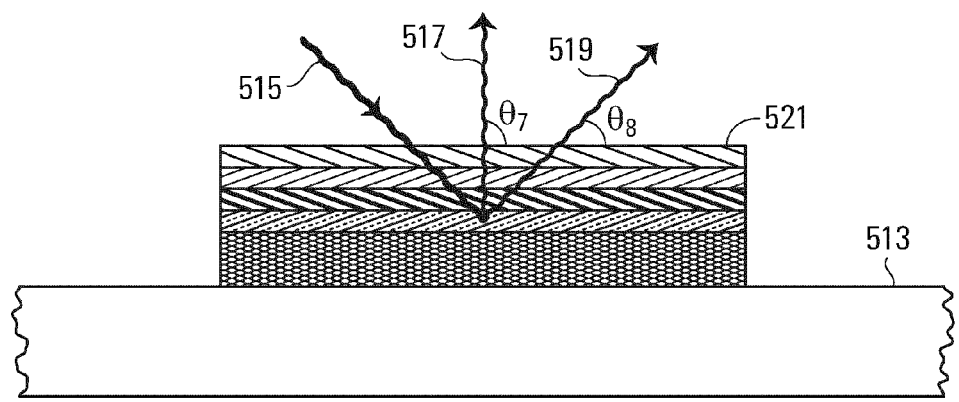
FIG. 16B shows a cross-sectional view of the optical security device of FIG. 16A mounted on a first substrate.

FIG. 16B shows the optical security device 501 fastened to an opaque substrate 513 by the adhesive layer 511. Each of the upper layer 509 and the first and second liquid crystal layers 505, 507 are transmissive or transparent to the incident radiation 515, e.g. UV light, for stimulating luminescence emission from the luminescent layer 503, so that the excitation light can be applied to the same side of the substrate from which the luminescence is emitted.

On applying excitation light 515 to the optical security device 501, the luminescent layer 503 emits light corresponding to the colours that are included in the luminescent layer, and in the present embodiment, the luminescent layer is adapted to emit luminescent radiation 517, 519 having first and second wavelengths, i.e. first and second colours, respectively. The first and second liquid crystal layers 505, 507 control the direction of transmission therethrough so that luminescence of the first colour 517 is emitted at a first angle, $\theta_7$, relative to the upper surface 521 of the optical security device, and luminescence of the second colour 519 is emitted at a second, different angle, $\theta_8$, relative to the surface 521. In this example, the first colour is emitted at an angle of about 90° to the surface and the second colour is emitted at an angle of about 45° to the surface. In other embodiments, one or both colours may be emitted at different angles. Thus, the optical security device exhibits an angle-dependent colour shift which can be observed as a switch in colour of the luminescent layer as the substrate and device are tilted back and forth.

Figure 16C:
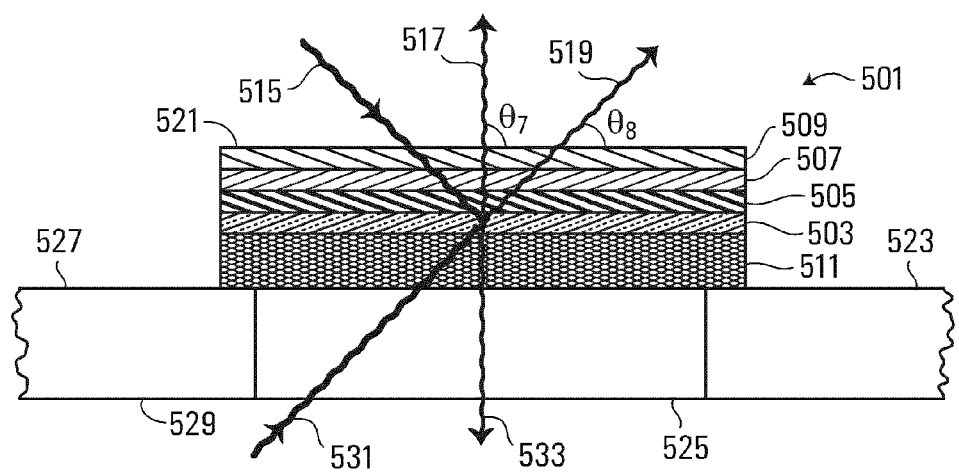
FIG. 16C shows a cross-sectional view of the optical security device of FIG. 16A mounted on a second, windowed substrate.

FIG. 16C shows an example of the security device mounted on a windowed substrate 523. In this embodiment, the substrate includes a window portion 525 extending between the upper and lower surfaces 527, 529 of the substrate and which may be provided by a void or a transparent or translucent material. The optical security device 501 is mounted above the window portion 525 and adhered to the substrate (including the transparent portion, if any) by means of the adhesive layer 511. In this embodiment, the adhesive layer is also transparent to luminescent excitation radiation to enable the luminescent layer to be stimulated by excitation light 531 applied from below the substrate through the window portion 525 or from above the substrate as in the case of FIG. 16B. In other embodiments, the structure above the luminescent layer 503 may be opaque to luminescent excitation radiation 515 so that the luminescent layer can only be stimulated from below. In the embodiment of FIG. 16C, when the luminescent layer is stimulated by excitation light 515, 531 from above or below, luminescence of the first and second colours 517, 519 is emitted from the surface 521 of the optical security device at first and second angles, $\theta_7$, $\theta_8$, respectively. If the adhesive layer 511 is transparent to visible light, luminescence 533 having a colour resulting from the additive colour mixing of the first and second colours within the luminescent layer will also be emitted through the window portion 525, but without any colour shifting effect. This may provide an additional authentication feature.

In other embodiments, luminescent material may be included within the adhesive layer and the luminescent layer omitted altogether, or luminescent material may be included in both the adhesive layer and also a separate luminescent layer.

In another embodiment, the liquid crystal-based security feature may be adapted to emit only a single colour, wavelength or band of wavelengths, in which the emission is angle-dependent. This may be implemented by limiting the luminescent material to generate a single colour, wavelength or band of wavelengths, for example. In this case, the single colour or wavelength(s) may only appear at a specific emission angle or range of angles or be emitted with a significantly higher intensity at a specific emission angle or range of angles compared to other angles. In other embodiments, the single colour or wavelength(s) may be emitted with a relatively high intensity over a wide range of angles except for a specific angle or sub-group of angles within the range, where the intensity is significantly reduced. Thus, the colour may appear with a relatively high and/or constant intensity for a wide range of emission angles, but significantly diminish at a particular viewing angle within the range, thereby providing an observable "Go-No-Go" effect, which enables the security feature to be authenticated, by the absence (or significant reduction) of the colour at a particular viewing angle. In other embodiments, the security device may be adapted to replace the "absence" of colour at the particular viewing angle (or range of angles) with a different colour. This may be implemented by adapting the luminescent material to generate a second colour and by adapting the optically variable structure to transmit the colour with a relatively high intensity only at the particular angle or in a range of angles where the other colour is significantly diminished or substantially absent. Alternatively, emission of the second colour may be controlled with little or no angular dependence, so that both colours are emitted together over a relatively wide range, with the observed colour being the additive effect of the combination, for example, except for a window within the angular range, at which the second colour dominates.

In other embodiments, the liquid-crystal based optical security device may be adapted to emit a first colour or wavelength which has angle-dependence and a second colour or wavelength which has less, little or no angle dependence. In this case, the second colour will be observed over a relatively wide angular range, and the combination of both the first and second colours will be observed only or predominantly for a specific angle or limited range of angles.

It is to be noted that the variants described above are not limited to liquid-crystal based features, but may also be implemented by other optically variable devices or structures, e.g. optical interference structures, such as those having a number of layers of material in which adjacent layers have different refractive indices.

Figure 17A:
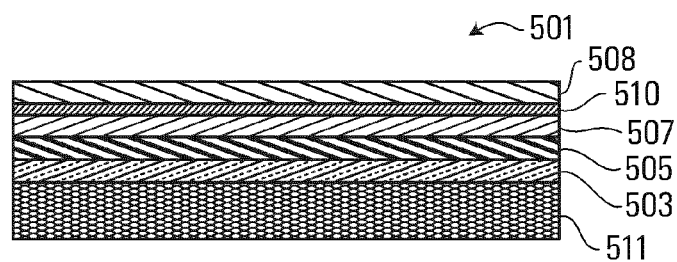
FIG. 17A shows a cross-sectional view of an optical security device which is based on a liquid crystal material according to another embodiment of the present invention.
Figure 17B:
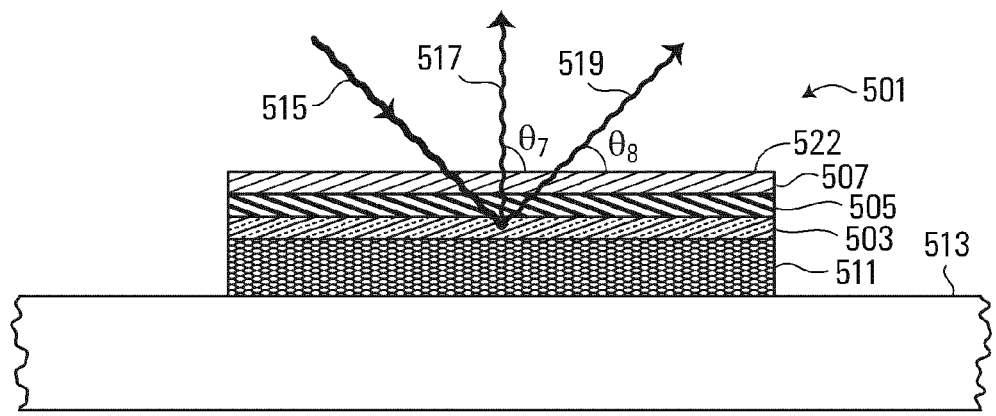
FIG. 17B shows a cross-sectional view of the optical security device of FIG. 17A mounted on a first substrate.
Figure 17C:
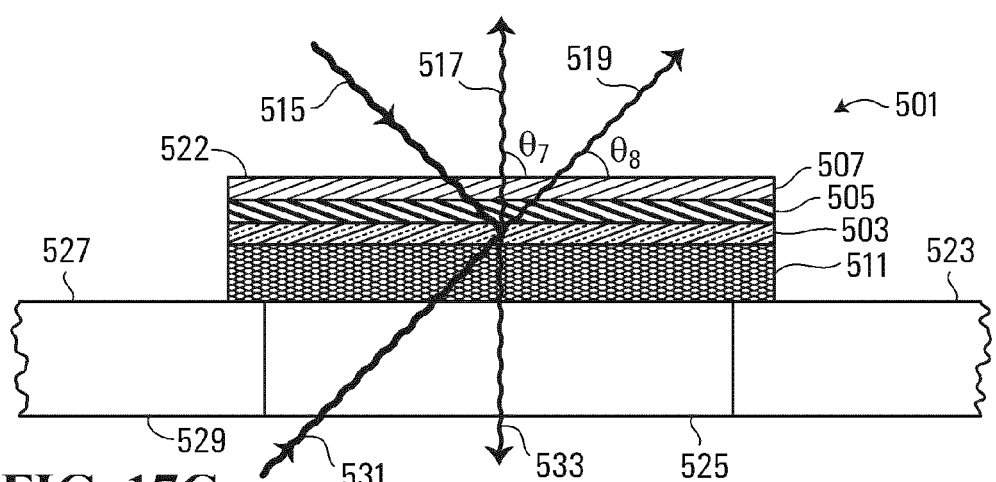
FIG. 17C shows a cross-sectional view of the optical security device of FIG. 17A mounted on a second, windowed substrate.

FIGS. 17A to 17C show an alternative embodiment of an optical security device 501 in which the angle-dependent luminescence emission is controlled by layers of liquid crystal material. The embodiment is similar to that of FIGS. 16A to 16C, and like parts are designated by the same reference numerals. In this alternative embodiment, the optical security device is fabricated on a foil carrier as shown in FIG. 17A and subsequently transferred to a substrate as shown in FIGS. 17B and 17C. Referring to FIG. 17A, a foil carrier layer 508 is provided having a release layer 510. The carrier layer 508 may comprise any suitable material, including a polymeric material such as PET, PFFF or BOPP. The second liquid crystal layer 507 is formed adjacent the release layer 510 and the first liquid crystal layer 505 is formed adjacent the second liquid crystal layer 507. The luminescent layer 503 is formed adjacent the first liquid crystal layer 505, followed by an adhesive layer 511. As shown in FIGS. 17B and 17C, the optical security device thus formed is transferred from the carrier foil 508 to a suitable substrate 513, 523 and secured thereto by the adhesive layer 511. FIG. 17B shows the optical security device 501 applied to an opaque substrate 513 and FIG. 17C shows the optical security device applied to a windowed substrate 523. The main difference between the embodiment of FIGS. 17B and 17C and the embodiment of FIGS. 16B and 16C is that in the embodiment of FIGS. 17B and 17C, the PET laminate layer of FIGS. 16B and 16C is omitted so that the upper surface 522 of the second liquid crystal layer 507 constitutes the upper surface of the security device. Otherwise the optical security device of FIGS. 17B and 17C operates in a similar manner to the embodiment of FIGS. 16B and 16C, and the description thereof applies equally to FIGS. 17B and 17C.

Holographic Variant

Figure 18:
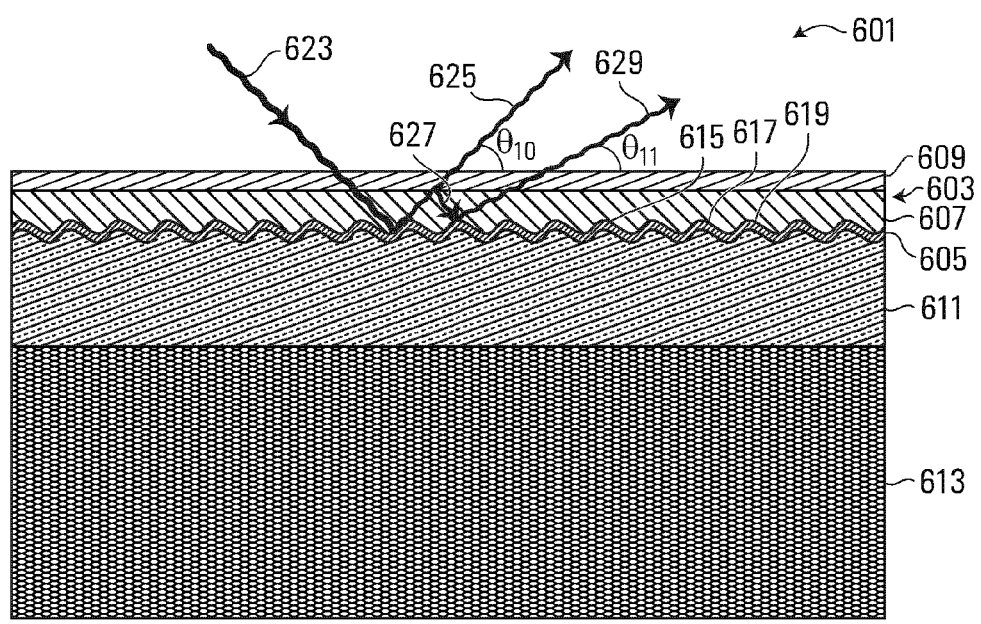
FIG. 18 shows a cross-sectional view of an optical security device based on a holographic structure according to an embodiment of the present invention.

In another embodiment of the optical security device, the optically variable device or structure may comprise a holographic structure to provide an angle-dependent colour or wavelength shift of luminescent emission. An example of such a security device is shown in FIG. 18. The optical security device 601 comprises a holographic optically variable device 603 which includes a reflective layer 605, a luminescent layer 607, and an upper layer 609 above the luminescent layer 607. The optical security device also includes an optional protection layer 611 below the reflective layer 605, and may include an optional adhesive layer 613.

The reflective layer 605 defines a hologram or holographic pattern by surface perturbations formed at the interface 617 between the reflective layer 605 and luminescent layer 607. In some embodiments, the hologram may be formed as an embossed structure on the lower surface 619 of the luminescent layer 607 by stamping, molding or another suitable process. The reflective layer may be subsequently formed on the embossed surface 619 by any suitable technique, which may include vacuum deposition, sputtering or any other suitable coating or deposition process. In other embodiments, the holographic pattern may be formed on the upper surface 621 of the protection layer 611, and the reflective layer subsequently formed thereon.

The luminescent layer 607 contains luminescent material which is capable of emitting luminescent radiation at one or more colours or wavelengths when stimulated by excitation radiation 623 such as UV light. In the present embodiment, the upper layer 609 is at least partially transparent to excitation radiation 623, and is at least partially transparent to luminescent radiation emitted from the luminescent layer. The optically variable device is adapted to reflect part of the luminescent radiation directed towards the upper layer 609 back towards and into the luminescent layer. This may be achieved by forming the upper layer 609 of material with a different refractive index to that of the luminescent layer 607, so that part of the luminescence is reflected at the interface of the two layers 609, 607. Alternatively, or in addition, the upper layer 609 may comprise a partially reflective material, for example, a semi-mirrored material, to reflect part of the luminescence back towards the luminescent layer.

When the luminescent layer 607 is stimulated, part of the luminescent light 625 is diffracted by the diffraction structure and partially reflected by the upper layer 609, resulting in a change in phase of the reflected light. Luminescent light within the space between the diffraction structure and upper layer undergoes constructive and destructive interference. The constructive interference results in a relatively strong luminescent signal at a particular emission angle or range of emission angles which is transmitted through the upper layer 609. Thus, the space between the diffraction structure and the upper layer acts as a cavity which supports constructive interference for a given wavelength at a particular angle. The device thereby emits luminescence whose intensity varies with emission angle to produce an angle dependent luminescent characteristic. In the present embodiment, the luminescent material generates luminescence of a plurality of different colours or wavelengths, and emits luminescent radiation 625 of a first colour or wavelength with a peak intensity at a first angle $\theta_{10}$, and emits luminescent radiation 629 of a second colour or wavelength with a peak intensity at a second angle $\theta_{11}$. Thus, in this embodiment, the holographic structure provides a fluorescent hologram with an angle-dependent colour-shift.

The protection layer 611 may be formed of any suitable material such as an epoxy resin which cannot easily be removed from the reflective layer 605, thereby preventing access to the holographic pattern and possible copying of the optical security device. The optional adhesive layer 613 enables the security device to be mounted and fastened to a substrate.

In some embodiments, an optical interference structure may be placed above the luminescent layer, for example, adjacent the luminescent layer if the upper layer 609 is omitted, or adjacent the upper layer, if retained. The optical interference structure may comprise a plurality of layers of material, adjacent layers having different refractive indices. The provision of an optical interference structure may enhance the luminescent emissivity of the security device, and/or the angle-dependent effect.

In other embodiments, the reflective layer 605 may be omitted. In this case, reflection from the diffraction structure may be achieved by forming the layer adjacent the luminescent layer of a material having a refractive index different to that of the luminescent layer 607.

Micro Electronic Mechanical System (MEMS)

In other embodiments of the present invention, the optical security device may be implemented by an interferometric mechanical modulator system whose optical reflection and absorption characteristics can be modified by varying the spacing between an absorber and reflector separated by an air gap. Examples of this implementation are shown in FIGS. 19A to 19E.

The optical security device 701 comprises a reflective layer 703, a luminescent layer 705 formed on the reflective layer 703, an absorber 707 above the luminescent layer 705 and a support substrate 709 for supporting the absorber 707 above the luminescent layer and reflector. A support structure 711 supports the absorber 707 and substrate 709 to provide a gap 713 between the upper surface 715 of the luminescent layer 705 and the lower surface 717 of the absorber 707. The device 701 may be mounted on a substrate 719.

The purpose of the absorber 707 is to transform the admittance of the reflective film 703. In this embodiment, the absorber comprises films 721, 723, 725. In particular, the absorber is adapted to match the admittances of the reflector film and the support substrate 709. This is achieved by a matching layer 721 which transforms the admittance of absorber layer 723 to that of the support substrate 709 and by a second matching layer 725 which transforms the admittance of the reflector 703 to that of the absorber layer 723. The absorber 707 also attenuates light which is incident on it through the medium, and also light which is reflected from the reflector. The optical characteristics of the structure can be modified by changing the thickness $T_g$ of the air gap 713. For example, with appropriate selection of materials and thicknesses, in the absence of an air gap 713, i.e. when the lower surface 717 of the absorber 707 is in contact with the upper surface 717 of the luminescent layer 705, the absorber can transform the admittance of the reflector 703 so that a range of frequencies of light incident on the support substrate 709 are strongly absorbed, rather than reflected. On the other hand, the presence of an air gap 713 causes a mismatch in the admittances of the reflector and substrate, so that in this state, the cavity behaves like a resonant reflector that strongly reflects certain frequencies while strongly absorbing others.

Figure 19A:
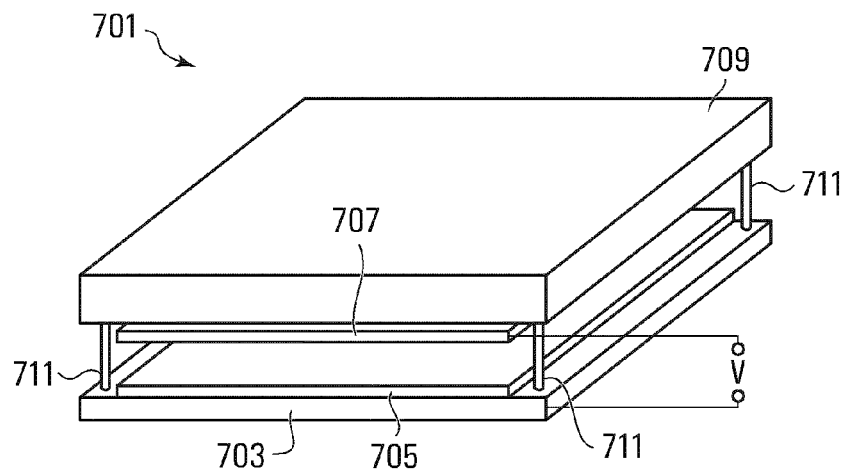
FIG. 19A shows a perspective view of an optical security device according to another embodiment of the present invention, in a first state.
Figure 19B:
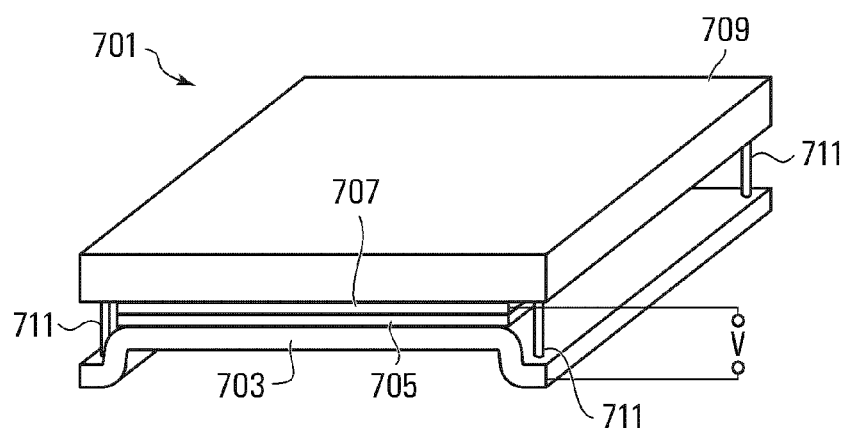
FIG. 19B shows a perspective view of the optical security device of FIG. 19A in a second state.
Figure 19C:
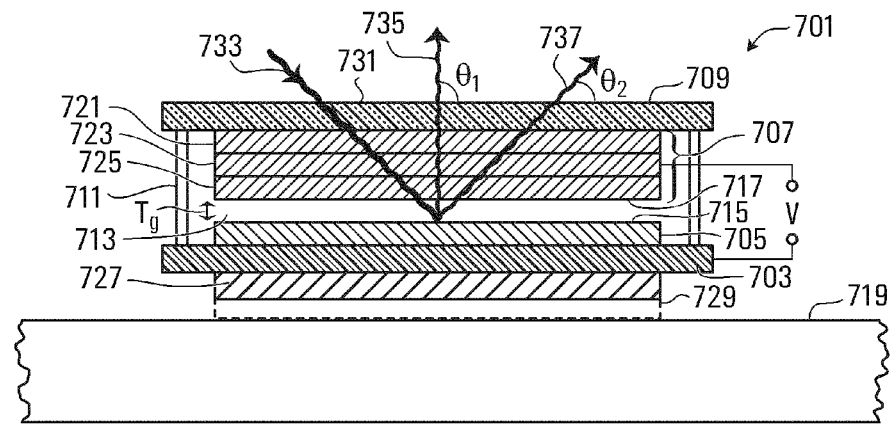
FIG. 19C shows a cross-sectional view of the optical security device of FIGS. 19A and 19B in the first state.
Figure 19D:
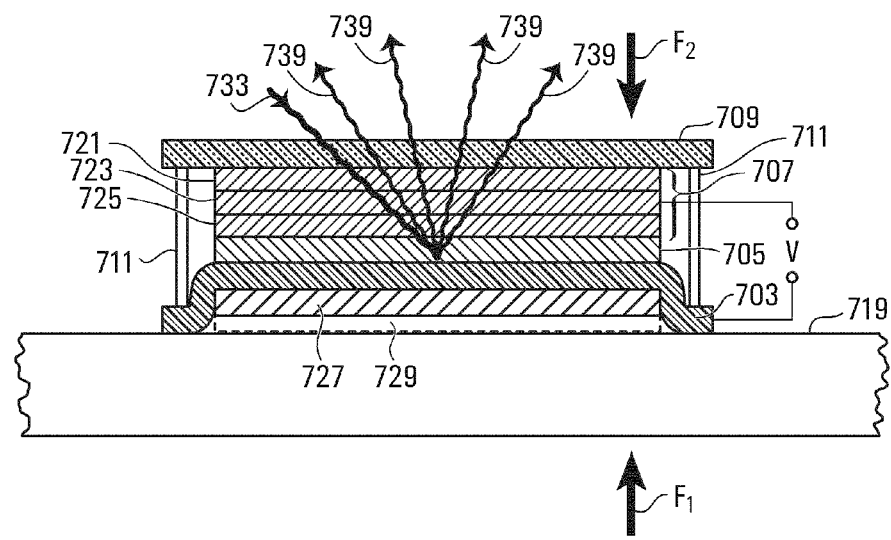
FIG. 19D shows a cross-sectional view of the optical security device of FIGS. 19A and 19B in the second state.
Figure 19E:
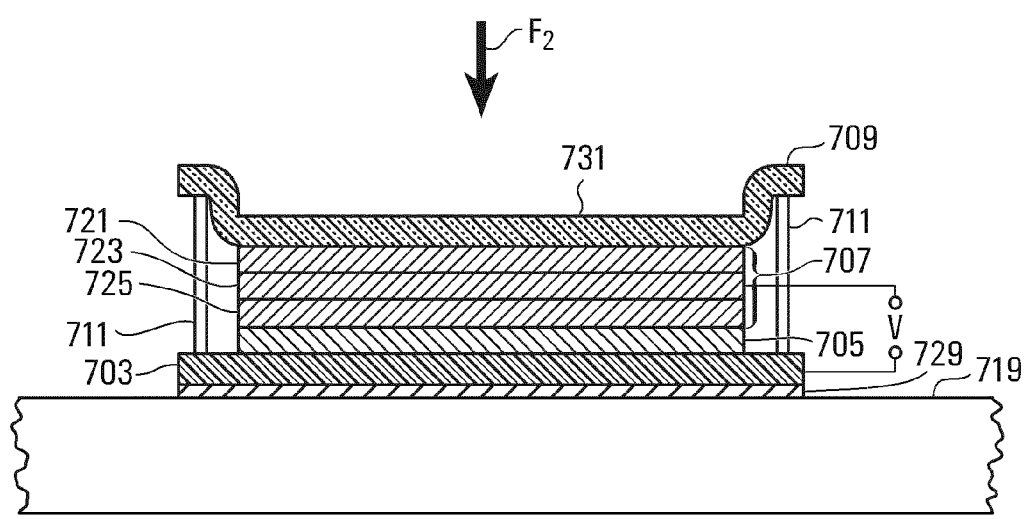
FIG. 19E shows a cross-sectional view of an optical security device according to another embodiment of the present invention.

The thickness $T_g$ of the air gap may be varied in a number of different ways. For example, the gap may be varied by applying an electrostatic force between the reflector and the absorber, and this may be achieved by applying a voltage, V, between the two as shown in FIGS. 19A to 19D. In this particular example, the thickness of the air gap is reduced by increasing the strength of an attractive electrostatic force between the reflector and absorber and is increased by reducing the electrostatic force. As shown in FIGS. 19B and 19D, the gap is reduced by an upward distortion of the reflective layer 703 towards the absorber. However, in other embodiments, the gap may be reduced by a downward distortion of the support substrate 709, as shown in FIG. 19E, or by partial distortion of both the reflector 703 and the substrate 709 towards one another. Alternatively, or in addition, the gap may be varied by magnetic forces and/or by mechanical forces. For example, the structure above or below the air gap may include a magnetic or magnetizable material and the thickness of the gap varied by application of an appropriate external magnetic field, which may be provided by a permanent magnet or an electro magnet, for example.

The thickness of the air gap may be varied either by applying an upwardly directed external mechanical force $F_1$ to the reflector side of the structure through the underlying substrate 719, as shown in FIG. 13D and/or by applying a downwardly directed external mechanical force $F_2$ to the support substrate 709, as shown in FIGS. 13D and 19E. The external mechanical force may be applied by any suitable means, for example, by hand, (e.g. using finger(s) and/or thumb) or using a mechanical device, for example a stylus or other instrument. An optional spacer layer 727 positioned between the reflector 703 and the substrate 719 may be provided to assist in deforming the reflector layer to reduce the gap when an external mechanical force is applied, as shown in FIGS. 19C and 19D. An optical security device may be fastened to the substrate 719 by an adhesive 729. In other embodiments, the air gap may be varied by enabling the length of the support structure 711 to be varied, rather than or in addition to bending or distortion of the reflector layer 703 and/or the substrate 709. For example, the support structure may comprise a resilient material which can be varied between a compressed state to reduce the gap thickness and an extended or relaxed state to increase the gap thickness. The support structure may be adapted to increase the gap thickness relatively slowly, so that when the force is released, the luminescent emission characteristic resulting from a reduced gap thickness does not immediately disappear but remains for a period of time. This might be beneficial when the gap thickness is changed by manual pressure so that the effect is preserved for a sufficient time to be observed once the finger(s) or thumb are no longer obstructing the surface of the security device.

The luminescent layer may comprise a luminescent material which luminesces at a single colour or wavelength or a plurality of colours or wavelengths. The luminescent layer may be deposited using any suitable technique, depending on the luminescent material. For example, the luminescent material may comprise an inorganic material such as ZnS or ZnO and may be deposited by RF sputtering or another suitable technique. For organic based luminescent materials, the luminescent layer may be deposited by solution processing or evaporation, for example, or by another suitable technique.

In other embodiments, the luminescent layer 705 may be formed on the absorber 707 rather than the reflector 703, or a luminescent layer may be formed on both the reflector and the absorber. In any of these variants, the luminescent layer may be deposited after the absorber layer and/or reflective membrane are deposited or formed and before the completion of the structure.

The thickness of the air gap $T_g$ can be tuned so that the absorber selectively transmits a particular colour or wavelength and emits the particular colour or wavelength at a particular emission angle or range of angles from the upper surface 731 of the substrate 709. The luminescent material may be selected to emit luminescence of one or more of these transmittable colours or wavelengths to produce an angle-dependent colour shift effect. For example, with reference to FIGS. 19A and 19C, with the structure in the open state and the luminescent layer being capable of emitting two different colours, when the luminescent layer is exposed to excitation light 733, luminescence of a first colour will be emitted at a first angle $\theta_1$, and luminescence of a second colour will be emitted at a second, different angle, $\theta_2$.

For a different gap thickness, the structure may be tuned to enable transmission of luminescence of a third colour or wavelength, at a particular emission angle or range of emission angles, but which is not transmitted, or not transmitted to the same extent, when the gap thickness is tuned to permit transmission of luminescence of the first and second colours. In addition, at the second "tuned" gap, the structure may disable transmission of the first and/or second colours. Accordingly, when the gap is changed to this second state, luminescence emission of the first and second colours disappears or diminishes and luminescence of the third colour appears or strengthens at a particular viewing angle or range of angles.

On the other hand, in the closed state, as shown in FIG. 19D, i.e. without any air gap, the structure can be tuned to permit luminescence emission from the structure, but without any angle-dependent colour shift. Thus, in this state, when excitation light 733 is applied to the luminescent layer 705, luminescence 739 of the same colour will be emitted at all viewing angles or over a relatively wide range of angles, with the intensity of the emission having relatively little or no angular dependence.

In this example, as the structure is changed from its closed state to its open state, the luminescence emitted from the structure will change from luminescence having a colour which is substantially independent of emission angle (over a range of angles), to luminescence of the first colour at a first viewing angle and luminescence of the second colour at a second viewing angle, via the optional intermediate state in which a third luminescent colour is observed at a third viewing angle.

Additional details of a suitable manufacturing technique for fabricating the absorber, reflector and the supporting structure are disclosed in U.S. Pat. No. 6,040,937 (Miles), the entire content of which is incorporated herein by reference.

Venetian Blind-Type Optical Security Device

Figure 20A:
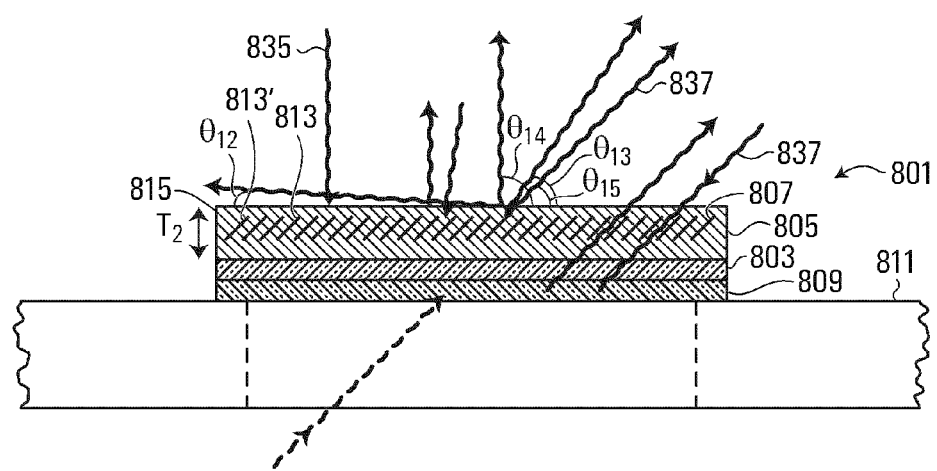
FIG. 20A shows a cross-sectional view of an optical security device according to another embodiment of the present invention.
Figure 20B:
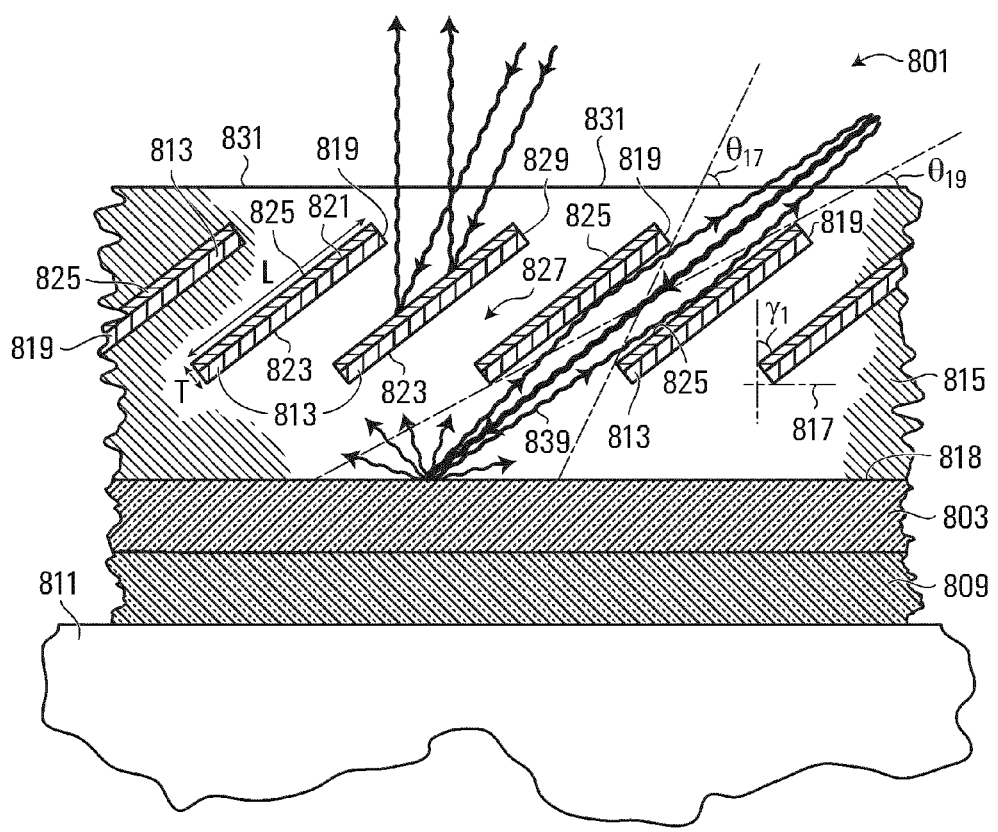
FIG. 20B shows a cross-sectional view of an enlarged portion of the optical security device of FIG. 20A.
Figure 20C:
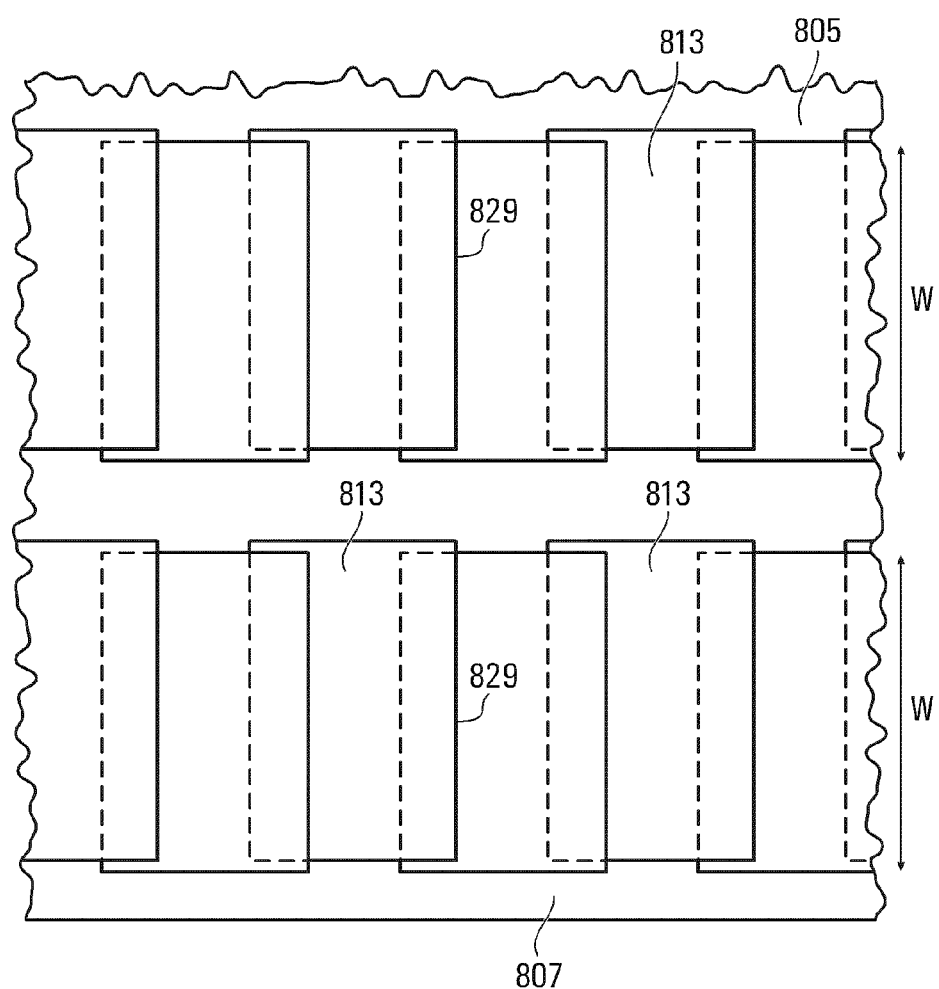
FIG. 20C shows a plan view of the optical security device of FIGS. 20A and 20B.

An optical security device according to another embodiment of the present invention is shown in FIGS. 20A to 20C. The optical security device 801 includes a first layer 803 comprising a luminescent material and a second layer 805 above the luminescent layer 803 comprising an optically variable device 807 and an optional adhesive layer 809 for fastening the security device to a substrate 811. The optically variable device 807 comprises a laterally extending array of generally planar, spaced apart light-blocking members 813 disposed in a layer 815 of transparent material. The light-blocking members 813 are similarly oriented at an oblique angle, $\gamma_1$ to a line 817 which is orthogonal to the laterally extending interface 818 between the transparent layer 815 and the luminescent layer 803. The light blocking members 813 have a generally flake-like form, i.e. their thickness, T, is small in comparison to their length, L, and width, W. In some non-limiting examples, the ratio L to T or W to T may be from 5 to 1 to 30 to 1 or more. As shown in FIG. 20B, the light-blocking members 813 each comprise a substrate 819 having relatively planar upper and lower surfaces 821, 823 and an upwardly facing layer 825 of luminescent material disposed on the upper surface of the substrate. Neighboring or adjacent light blocking members generally lie parallel to one another and are spaced apart by a gap 827 to allow light to pass between the light blocking members to the luminescent layer 803 below. The light blocking members 813 may have any suitable dimensions, and in some embodiments may have a thickness of about 1 micron and a length and width in the range of about 10 to 50 microns.

In the present embodiment, the luminescent material 825 of the light-blocking members 813 luminesces at a first colour or wavelength and the luminescent material of the underlying luminescent layer 803 luminesces at a second, different colour or wavelength.

The light-blocking members 813 are at least partially, and in some embodiments are completely opaque to luminescent radiation of the second colour or wavelength from the luminescent layer 803. In some embodiments, the lower surface 823 of the light-blocking members or elements may comprise a reflective surface capable of at least partially reflecting luminescence emitted from the luminescent layer 803, or the lower surface 823 may also include a layer of luminescent material and which may also luminesce at the first colour or wavelength.

The light-blocking elements 813 can be selected from the group consisting of: non-metallic inorganic flakes, metallic inorganic flakes, and organic flakes.

The transparent layer 805 may comprise a material which initially has a relatively fluid-like state to enable the light-blocking elements to be oriented at the desired angle and which can subsequently be transformed into a hardened-state to maintain the light blocking elements in their adopted orientation. The material may for example comprise a curable, transparent binder composition. Suitable binder materials can be selected from the group of vinylic resins, acrylic resins, urethan-alkyde resins or other resins, and from mixtures thereof and optionally with other polymers. The composition may be either solvent-based or water-based, for example.

The composition containing the light-blocking elements may be applied to the luminescent layer 803 using any suitable technique, for example, a liquid-ink printing technique such as screen-printing or graveur-flexo printing. The thickness $T_2$ of the optically variable layer 805 may be sufficiently small to facilitate orientation of the light-blocking elements, and in some embodiments, the thickness of the layer is of the order of about 10 to about 50 microns, although in other embodiments, the thickness of the optically variable layer 805 may be lower, for example in the range of about 5 microns to about 10 microns. It is also unnecessary for the light-blocking elements to be completely embedded within the transparent layer, and in some embodiments, the light-blocking elements may be only partially embedded with their upper ends 829 being positioned above the upper surface 831 of the transparent layer 805.

The formulation of the transparent layer 805 may be rapidly curable to enable the light-blocking elements to be fixed in position relatively quickly after being oriented to their desired position, and in some embodiments, the formulation may be curable by UV or electron beam (EB). In other embodiments, the formulation may be curable by drying through solvent evaporation or coalescence and possibly by oxy-polymerization drying, although these methods are slower.

The light-blocking elements 813 may be oriented by any suitable means, including magnetic means or non-magnetic means, such as electrostatic or electrophoretic means (using an electric field) or by ultrasonic means (using an acoustic field). For magnetic orientation, the light-blocking elements contain a magnetic or magnetizable material. Once the layer 805 has been applied to the luminescent layer 803, and is still in the fluid state, a magnetic field is applied to the material by means of a suitable source of magnetic flux such as one or more permanent magnets and/or one or more electromagnets. The light-blocking elements in the fluid composition orient themselves along the applied magnetic field lines so that their planes adopt the required orientation. The composition is subsequently hardened to fix the light-blocking elements in position.

In embodiments where electrostatic or electrophoretic orientation is used, the required orienting forces are provided by any difference in the dielectric constant of the light-blocking element relative to the surrounding medium. In the case of orientation by an acoustic (e.g. ultrasonic field), the elements may align with the direction of propagation of the acoustic waves, which may have substantially flat wave fronts, in accordance with the Pohlman-Cell principle. Further details of this technique are disclosed in US 2003/0188842, published on 9 Oct. 2003, the content of which is incorporated herein by reference. The orienting forces for an acoustic/ultrasonic field may be provided by a difference in mechanical properties of the element 813 with respect to the surrounding medium.

The optical security device operates as follows. When excitation light 835 is directed towards the optical security device 801 at an angle to its surface 821 such that the luminescent layer 821 of the light-blocking elements 813 are exposed thereto, the luminescent layer will emit luminescent radiation having a first colour or wavelength over a first range of angles $\theta_{12}$ to $\theta_1$, which in this embodiment, includes an angle $\theta_{14}$ normal to the surface 831. The angle $\theta_{12}$ constitutes a grazing angle relative to the surface 831 or a line intersecting the upper ends 829 of the light-blocking elements, below which luminescent emission from the upper surface of each element is substantially blocked by a respective element to its left. Thus, at viewing angles substantially parallel to the substrate surface, luminescence will only be emitted from the left-most light-blocking element 813'. The angle $\theta_{13}$ constitutes an angle just above an angle $\theta_{15}$ between the upper surface 831 and a line 837 parallel to the plane of the light-blocking elements.

When excitation radiation 837 is directed towards the optical security device at an angle which enables the radiation to pass through the gaps 827 between adjacent light-blocking members to the luminescent layer 803, luminescence at the second colour or wavelength is emitted from the luminescent layer and part of the luminescent emission 839 can pass through the gaps 827 and is emitted from the surface 831 of the device at a second angle or second range of angles $\theta_{17}$ to $\theta_{19}$ which is different from the first range of angles $\theta_{12}$ to $\theta_{13}$. As the luminescence emitted from the luminescent layer 803 has a different colour or wavelength to the luminescent emission from the light-blocking elements, a colour shift in the luminescence emission will be observed at different viewing angles, or at the same observation point as the substrate and security devices tilted.

It will be appreciated that in other embodiments, only a single light-blocking element is required to provide angle-dependence of luminescent emission from the security device. For example, the luminescent material below the light-blocking element may be restricted in area or extent, so that, at a first angle, luminescent emission from the underlying layer is more limited by the light-blocking element than at a second angle.

Surface Structure Embodiments

In some embodiments, the optically variable structure of the security device may be implemented by surface structure and the luminescent material may be provided on the surface structure in a manner which produces an angle-dependent colour or wavelength shift in the luminescent emission. Examples of embodiments having this configuration are described below with reference to FIGS. 15A to 17B.

Figure 21A:
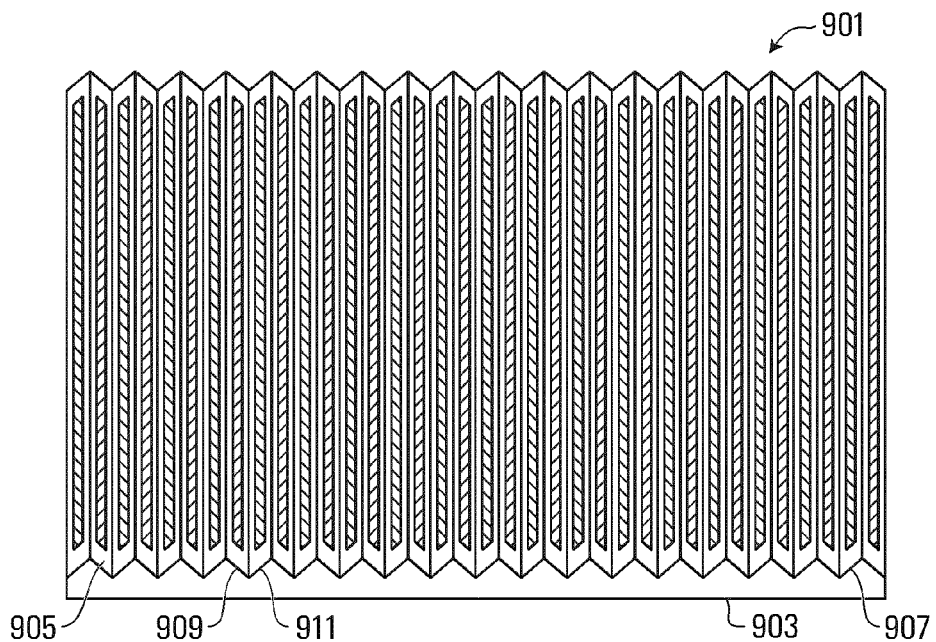
FIG. 21A shows a plan view of an optical security device according to another embodiment of the present invention.
Figure 21B:
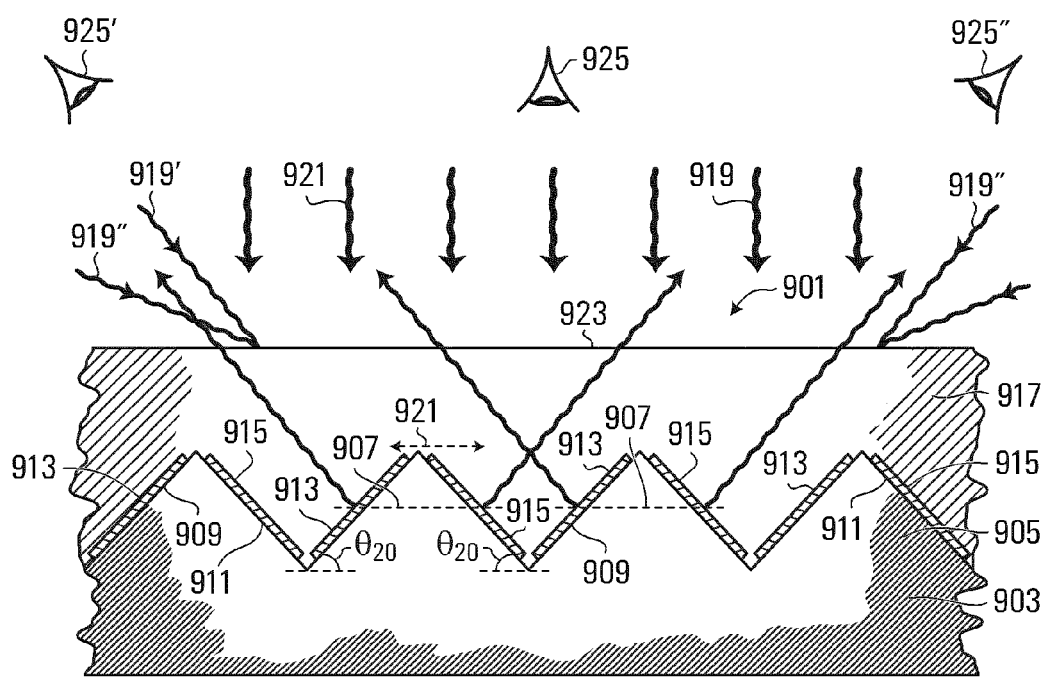
FIG. 21B shows a cross-sectional view of a portion of the optical security device of FIG. 21A.

Referring to FIGS. 21A and 21B, an optical security device 901 according to an embodiment of the present invention comprises a substrate 903 having a surface structure 905 comprising an array of side-by-side elongate ridge formations 907 which run generally parallel to one another. Each ridge formation is defined by oppositely angled sloping sides or flanks 909, 911, with the first flank 909 of each ridge formation facing the left-hand side of the optically security device and the second flank 911 facing towards the right-hand side of the optical security device, as shown in FIG. 21B. In this embodiment, the first and second flanks of each ridge formation are generally planar. However, in other embodiments, one or both flanks may be non-linear and may be curved, for example, concave or convex. In the present embodiment, the first and second flanks of each ridge formation are sloped at an angle $\theta_{20}$ of approximately 45° although in other embodiments, one or both flanks may slope at a different angle either greater or less than 45°, and the slope of both flanks may either be the same or different from one another.

A first layer 913 of luminescent material is formed on the first flank 909 of each ridge formation, and a second layer 915 of luminescent material is formed on the second flank 911 of each ridge formation. The first layer of luminescent material emits luminescent radiation of a first colour or wavelength when stimulated by excitation radiation, and the second layer of luminescent material 915 emits luminescent radiation of a second colour or wavelength when stimulated by excitation radiation, wherein the second colour or wavelength is different from the first colour or wavelength.

An optional cover layer 917 may be disposed over the surface structure to protect the surface structure from damage. The cover layer comprises a material which is transmissive to the luminescent radiation emitted by the first and second layers may be also be transmissive to the luminescent excitation radiation so that the excitation radiation can be applied from above.

The resulting structure is capable of producing a number of angle-dependent visual effects as the angle of incident radiation and/or the observation angle changes.

For example, when excitation radiation 919 is directed towards the surface structure so that the first and second luminescent layers on both flanks are exposed to excitation radiation, luminescent radiation is emitted from both layers producing a colour which is the additive mixture of the individual colours of the first and second layers. The combined colour can be observed at an observation angle of 90° to the general lateral direction 921 of the ridge formations or to the surface 923 of the cover layer 917 which runs generally parallel thereto. As the observation point 925 moves towards the left-hand side of the device 901 as indicated by '925 shown in FIG. 21B, the contribution in the observed luminescence from the second layer of luminescent material decreases so that the luminescent colour changes from the mixed colour to the colour produced exclusively by the first luminescent layer. Similarly, as the observation point 925 moves towards the right-hand side of the device 901, as indicated by 925", the contribution in the observed luminescent emission from the first luminescent layer decreases so that the observed luminescence changes from the mixed colour to that produced exclusively by the second luminescent layer. Thus, an observer will see a colour change from the first colour to a mixture of both colours and then to the second colour as the observation point is moved from the left-hand side of the device to the right-hand side of the device.

Changing the angle of incidence of the excitation radiation can also produce a colour shift. For example, for a fixed observation point 925 substantially orthogonal to the lateral direction 921 of the surface structure, and an angle of incidence of excitation radiation 919 also of 90°, both the first and second luminescent layers will be stimulated and the colour of the luminescence emission that will appear to an observer will be the result of the additive mixing of the first and second colours. As the angle of incidence of excitation radiation is changed from orthogonal to an oblique angle directed from left to right, the emission contribution from the second layer will progressively decrease as the angle of incidence approaches a direction which is parallel to the plane of the second layer as indicated by vector 919'. In this case, at the same observation point 925, the colour of the observed luminescence emission will change from the colour combination from both layers to the colour of the first layer only. As the angle of incidence is progressively reduced towards a grazing angle, the colour of the luminescence emission will continue to be that of the first luminescent layer as the second luminescent layer of each ridge formation is completely screened from receiving any excitation light by the respective left flank 909.

Similarly, as the angle of incidence of excitation radiation is changed from orthogonal to oblique so that excitation radiation is directed from right to left, as indicated by vector 919", the contribution to the luminescence emission from the first luminescent layer progressively decreases so that the observed colour at the same observation point 925 changes from the combined colour of both layers to that of the second layer only. Again, as the oblique angle is reduced further towards a grazing angle, the observed colour of the luminescence emission will remain that of the second layer as the first luminescent layer is completely screened by the respective second flank of the ridge formation and the intensity of the second colour will gradually diminish as the area of the second luminescent layer that is exposed to excitation radiation decreases.

A similar colour shift effect to that described above will also be observed as both the angle of incidence of excitation radiation and the observation angle change together from oblique from the left-hand side of the optical security device towards its right-hand side to oblique from the right-hand side of the device towards its left-hand side, or vice versa.

Figure 22A:
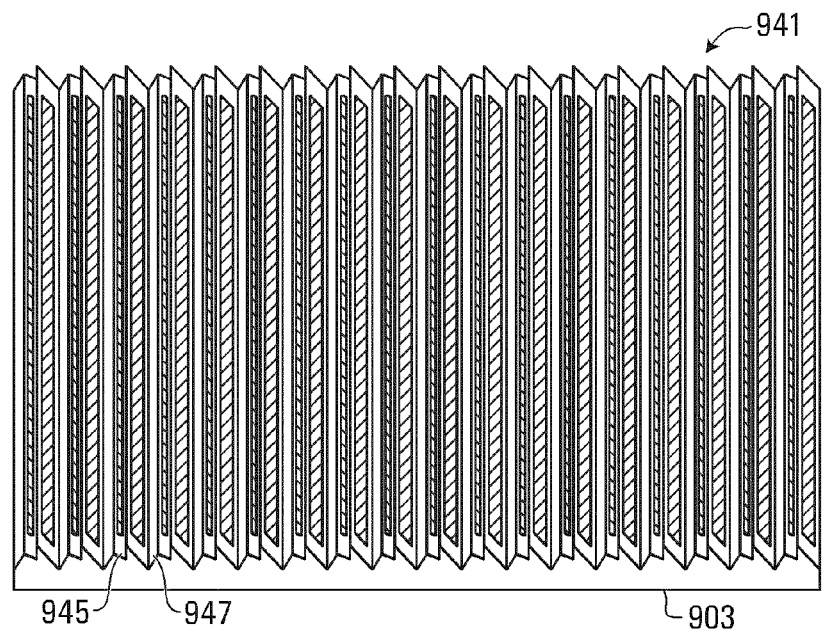
FIG. 22A shows a plan view of an optical security device according to another embodiment of the present invention.
Figure 22B:
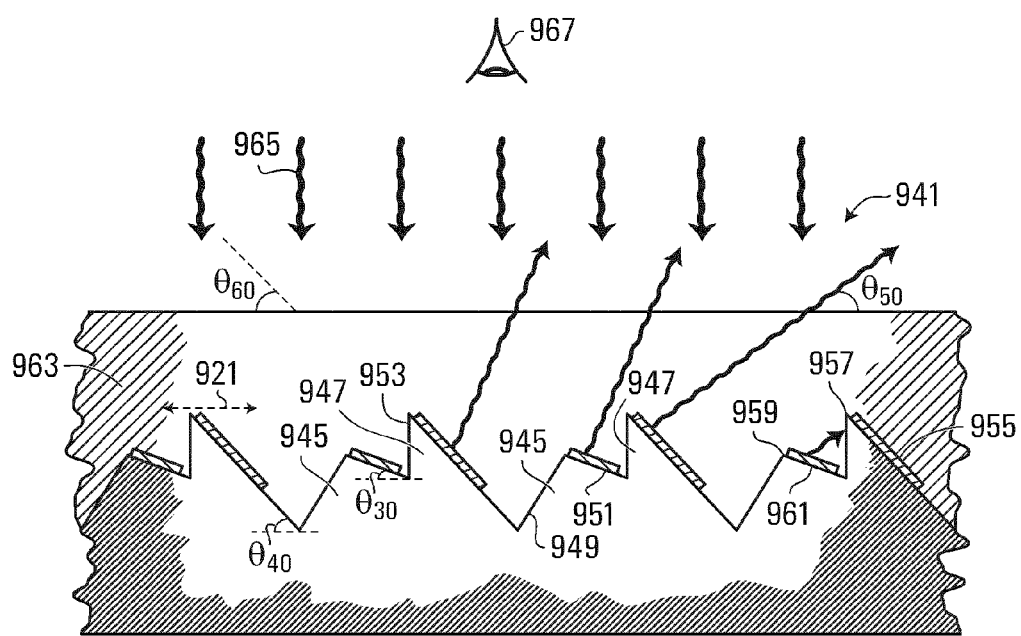
FIG. 22B shows a cross-sectional view of a portion of the optical security device of FIG. 22A.

Referring to FIGS. 22A and 22B, the optical security device 941 has a different surface structure to the embodiment of FIGS. 21A and 21B. In particular, the surface structure 943 comprises an array of side-by-side first and second alternating ridge formations 945, 947 in which the first and second ridge formations are shaped differently from one another as shown in the cross-sectional view of FIG. 22B. The two different ridge formations 45, 47 also have different heights. The first ridge formation 945 includes first and second, oppositely sloped sides or flanks 949, 951. The second ridge formation 947 includes first and second sides or flanks 953, 955 in which the first or left-hand flank 953 is substantially vertical and terminates in a peak 957 which is positioned at a level above the peak 959 of the first ridge formation. The slope or incline, $\theta_{40}$ of the second flank 955 of the second ridge formation is greater than the slope or incline, $\theta_{30}$ of the second flank of the first ridge formation. A first layer 961 of luminescent material which emits luminescent radiation at a first colour or wavelength is provided on the second slope 951 of the first ridge formation, and a second layer 963 of luminescent material which emits luminescence at a second, different colour or wavelength is provided on the second slope 955 of the second ridge formation 947. Thus, in contrast to the embodiment of FIGS. 21A and 21B, different luminescent layers are both provided on the respective second slopes 951, 955 of the first and second ridge formations and both face towards the same side, in this example, the right-hand side of the optical security device.

An optional cover layer 963 may be formed over the surface structure 943 to protect the structure from damage.

Various angle-dependent optical effects can be produced by the optical security device. For example, when excitation light 965 is directed towards the optical security device at an angle substantially orthogonal to the lateral direction 921 of the surface structure, both the first and second luminescent layers will be exposed to excitation light and emit luminescence at their respective wavelengths or colours. This will appear to an observer at an observation point 967 directly above the optical security device, for example, at observation angle 90°, as a colour resulting from the additive colour mixing of the two different colours from the first and second layers. As the observation angle θ changes from orthogonal to oblique towards the right-hand side of the optical security device, the contribution in the observed luminescence emission from the first luminescent layer 959 progressively decreases as more of the surface area of the first luminescent layer is screened or shadowed by the first flank or side 953 of the second ridge formation. Eventually, at an observation angle of $\theta_{50}$, the entire surface area of the first luminescent layer is screened by the first flank 935, in which case the second luminescent layer is the sole contributor to the observed luminescence emission and the observed luminescent colour will be solely that of the second layer.

The reverse effect is produced when the observation angle changes from orthogonal to oblique towards the left-hand side of the optical security device, in that the contribution to the luminescence emission from the second luminescent layer will diminish until the observation angle reaches a value corresponding to the slope of the second side or flank of the second ridge formation, i.e. is parallel to the side, as indicated by angle $\theta_{60}$. In this case, the first luminescent layer will become the sole contributor to the luminescence emission and the observed colour will be that of the first layer. The observation angles $\theta_{50}$ and $\theta_{60}$ at which only the second and first colours appear, respectively, can be different from one another (or the same) and used as a further security feature for authenticating the security device.

In a variant of the embodiment of FIGS. 22A and 22B, a luminescent layer may also be provided on the first slope 949 of the first ridge formation 945. This third luminescent layer may luminesce at the same colour or wavelength as the first or second luminescent layers or may luminesce at a colour or wavelength which is different to both the first and second luminescent layers to provide additional angle-dependent effects.

Figure 23A:
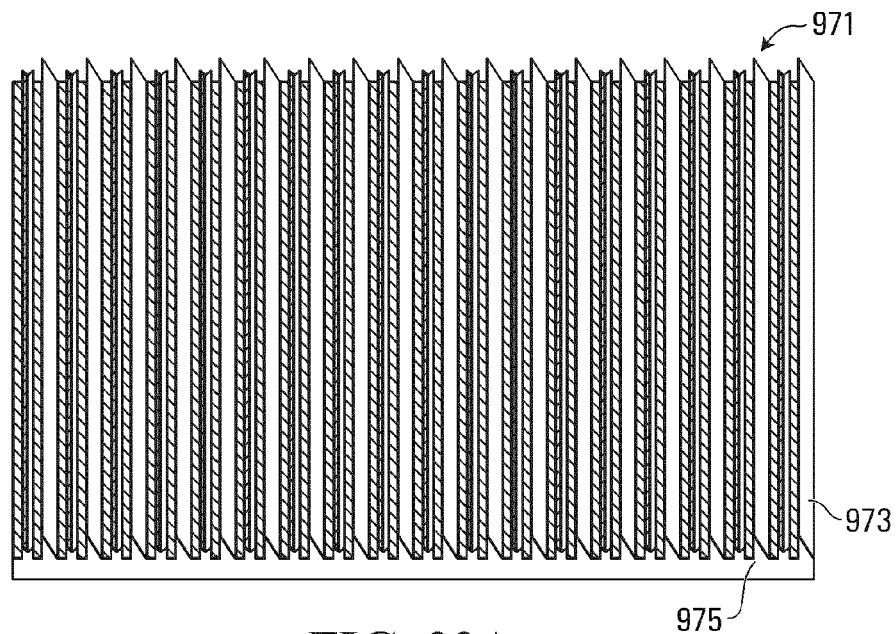
FIG. 23A shows a plan view of an optical security device according to another embodiment of the present invention.
Figure 23B:
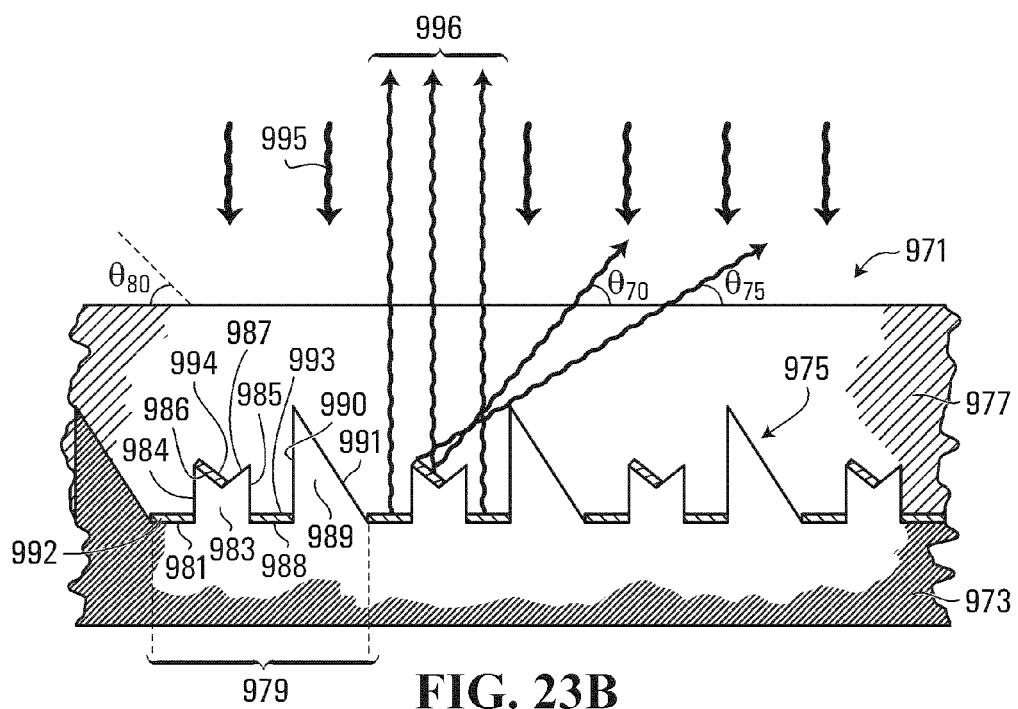
FIG. 23B shows a cross-sectional view of a portion of the optical security device of FIG. 23A.

Referring to FIGS. 23A and 23B, an optical security device 971 according to another embodiment of the present invention comprises a substrate 973 having a surface structure 975 and an optional cover layer 977 to protect the surface structure from damage. The surface structure comprises a laterally extending repeated pattern 979 of ridge formations. Each pattern 979 comprises a first base portion 981, a first ridge formation 983 comprising first and second opposed sides 984, 985 and first and second oppositely sloped intermediate sides or flanks 986, 987, a second base portion 988 and a second ridge formation 989 defined by first and second sides or flanks 990, 991. In this embodiment, both first and second base portions 981, 988 are horizontal, although in other embodiments, one or more both may be angled to the left or to the right, and each may be angled oppositely or to the same side. The first intermediate flank 986 of the first ridge formation 983 is sloped to the right and the second intermediate flank is sloped to the left. In this embodiment, the opposed first and second sides 984, 985 are substantially vertical, although in other embodiments, one or both may be sloped in either direction. The first side 990 of the second ridge formation 989 extends substantially vertically and the second side 991 slopes to the right. The height of the second ridge formation 989 is greater than that of the first ridge formation 983.

A first layer 992, 993 of luminescent material which emits luminescent radiation of a first colour or wavelength is formed on the first and second base portions 981, 988. A second layer 994 of luminescent material which luminesces at a second colour or wavelength different from the first colour or wavelength is formed on the first sloping flank 986 of the first ridge formation 983.

Various angle-dependent optical effects can be produced by the optical device. For example, when both first and second luminescent layers are exposed to excitation radiation 995, for example, directed at an angle normal to the surface structure, luminescence emission 996 will be observed at an observation angle orthogonal to the surface structure and may be observed essentially as one colour resulting from the additive mixing of both colours, or as individual colours, e.g. alternating colours or stripes, depending on the lateral dimensions of the surface structure pattern. As the observation angle changes from orthogonal to oblique towards the right-hand side, the contribution to the observed luminescence from the first layers 992, 993 will gradually diminish due to screening or shadowing by the respective first sides 984, 990 of the first and second ridge formations. Eventually, at a certain oblique angle $\theta_{70}$, the first layers will be completely screened by the respective side walls so that the only contributor to the luminescent emission at this angle is the second luminescent layer 994. Thus, as the observation angle changes from orthogonal to oblique, a colour shift will be observed from the colour combination of both layers to the colour emitted by the second luminescent layer. As the observation angle continues to change towards a grazing angle, the strength of the luminescent signal from the second layer will progressively diminish as the luminescence emission is progressively screened by the first side 990 of the second ridge formation 989.

As the observation angle is changed from orthogonal to oblique towards the left-hand side of the optical security device, the contribution from both the first and second luminescent layers will disappear at approximately the same angle as a result of the geometry of the surface structure, since at a certain angle $\theta_{80}$, the observation direction will be parallel to the plane of the second luminescent layer and simultaneously the first layers 992, 993 of luminescent material will be completely screened by an adjacent second wall of a second ridge formation and an adjacent second wall of a first ridge formation.

In the present embodiment, the combined surface area of the first layers of luminescent material in the pattern 979 is larger than the surface area of the second layer 994. Accordingly, the first layers 990, 993 will contribute more strongly to the luminescence signal than the second layer when both layers are excited equally. This may provide a further characteristic that may be used for authentication. However, the response of the human eye to light is wavelength dependent. For example, the human eye has a significantly higher sensitivity to light in the green part of the spectrum than to the red part of the spectrum. Accordingly, the difference in areas of the first and second luminescent layers may be used to balance these effects. For example, the first luminescent layers having a combined larger area may emit red luminescence and the second layer may emit green luminescence so that the observed luminescence from the combined layers appears orange. In other embodiments, the first and second layers may be adapted to emit any desired colour.

Variable Background Optically Variable Structure

In some embodiments, characteristics of a background for the luminescent material may be used to cause the relative emissivity of the security device for first and second wavelengths to vary with a change in emission angle, e.g. to produce angle dependent colour shift in the luminescent emission. For example, the reflection and/or absorption properties for luminescent radiation of the first and/or second wavelengths may be used to control the strength of luminescent radiation of one or both wavelengths from the security device as a function of angle. Examples of embodiments of a security device having this feature are described below with references to FIGS. 24A, 24B, and 25A to 25C.

Figure 24A:
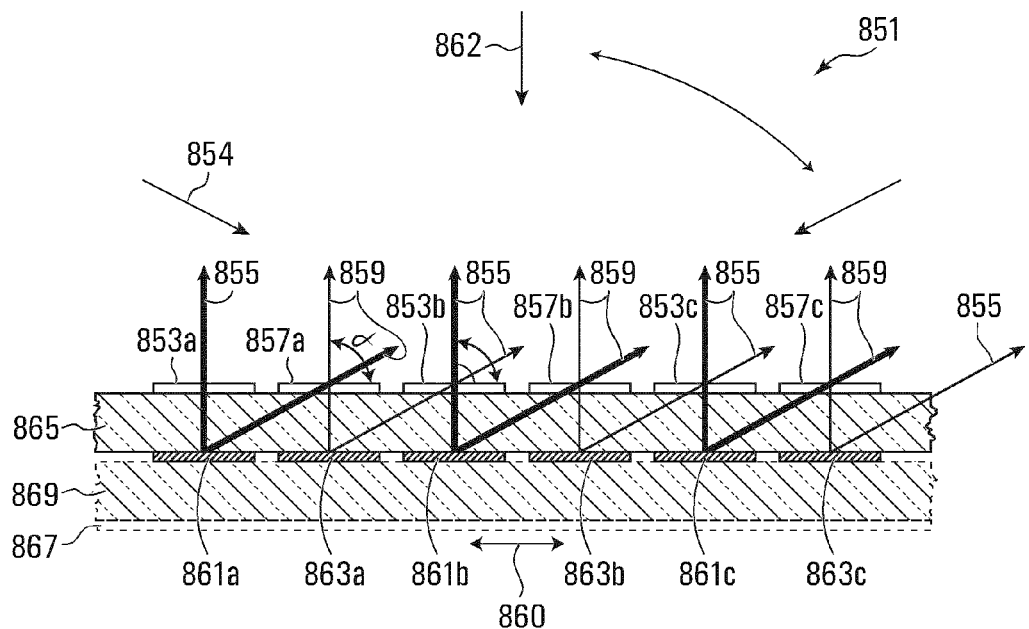
FIG. 24A shows a cross-sectional view of an optical security device according to another embodiment of the present invention.
Figure 24B:
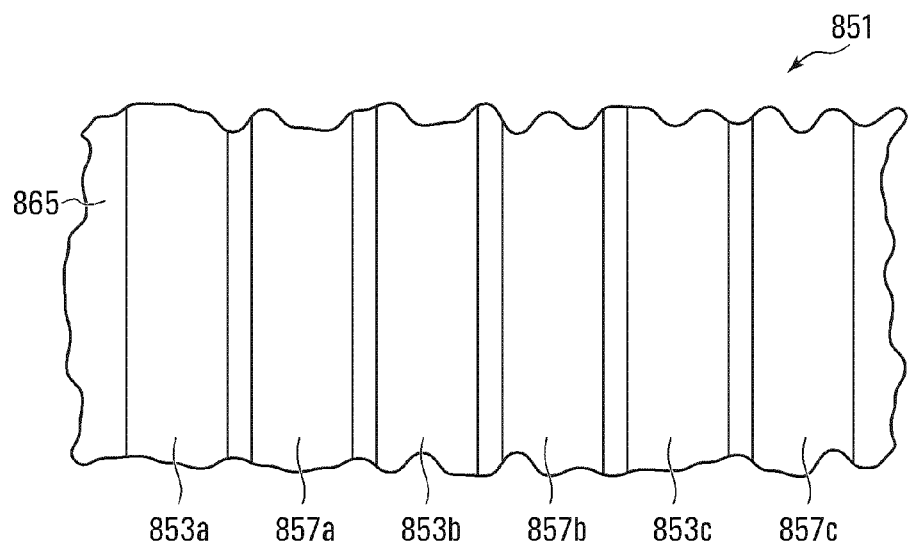
FIG. 24B shows a top view of the optical security device shown in FIG. 24A.

Referring to FIGS. 24A and 24B, a security device 851 comprises a plurality of first regions 853a, 853b, 853c of luminescent material which, when stimulated with stimulating radiation 854 emit luminescent radiation 855 of a first wavelength, $\lambda_1$. The security device 851 also includes a plurality of second regions of luminescent material 857a, 857b, 857c, which, when stimulated with stimulating radiation 854 emit luminescent radiation 859 of a second wavelength, $\lambda_2$, different from the first wavelength. The first and second regions are positioned in a side-by-side relationship in an array, in which the first and second regions alternate in the lateral direction as shown by arrow 860. The security device further includes a plurality of first areas 861a, 861b, 861c, in which a respective first area is positioned below and spaced from a respective first region 853a, 853b, 853c to provide a background therefor when the security device is viewed directly from above, i.e. at an angle orthogonal to the plane of the security device, as indicated by arrow 862. The security device further includes a plurality of second areas 863a, 863b, 863c, in which a respective second area is positioned below and spaced from a respective second region 857a, 857b, 857c to provide a background therefor also at an observation angle of 90° to the plane of the security device. In this embodiment, the first and second areas 861a to 861c, 863a to 863c are also positioned in a side-by-side relationship, with the first and second areas alternating in the lateral direction. The respective regions and areas may be spaced apart by a spacer layer

865. The reflection/absorption characteristics of the first and second areas control the amount of luminescent radiation emitted from the security device. At a normal observation angle, the background for each of the first regions is substantially provided by a respective first area, and the background for each of the second regions is substantially provided by a respective second area. However, as the emission or observation angle, $\alpha$, changes from normal to an oblique angle, the background for each of the first regions progressively changes from the respective first areas to the respective second areas, and the background for the second regions progressively changes from the second areas to the first areas. The intensity of luminescent radiation of the first wavelength can be varied with emission/observation angle by arranging the reflection/absorption characteristics of the first areas to be different to the reflection/absorption characteristics of the second areas for luminescent radiation of the first wavelength. Similarly, the intensity of luminescent radiation of the second wavelength emitted from the security device can be varied with emission/observation angle by arranging the reflection/absorption characteristics of the second areas to be different from the reflection/absorption characteristics of the first areas. The relative emissivity of the security device for luminescent radiation of the first and second wavelengths will change as a function of emission/observation angle as long as the intensity of the first or second wavelengths of emission changes relative to the other with emission/observation angle.

In one specific, non-limiting example, the reflectance of each of the first areas for luminescent radiation of the first and second wavelengths is relatively high, for example 95%, and the reflectance of the second areas for luminescent radiation of the first and second wavelengths is relatively low, for example 25%. For an emission/observation angle of 90° to the plane of the security device, the intensity of luminescent radiation of the first wavelength will be higher than the intensity of luminescent radiation of the second wavelength due to the higher reflectivity of the first areas which at this angle, provide the predominant background for the first regions, relative to the second areas, which, at this angle, provide the predominant background for the second regions. At an oblique emission/observation angle of, for example, 45°, the intensity of luminescent radiation of the second wavelength will be higher than the intensity of the emitted luminescent radiation of the first wavelength due to the higher reflectivity of the first areas, which, at this angle, provide the predominant background for the second regions, relative to the reflectivity of the second areas, which, at this angle, provide the predominant background for the first regions. Thus, the observed colour of luminescent radiation emitted by the security device will change as the emission/observation angle varies. In other embodiments, the reflection/absorption characteristics of the first and second areas may change only for one of the first and second wavelengths and remain relatively constant for the other. In this case, the intensity of luminescent radiation for only one of the first and second wavelengths will change with changes in emission/observation angle. However, an angle dependent colour shift will still be produced.

Although in the embodiment of FIGS. 24A and 24B, the first and second regions of luminescent material are arranged substantially in the same plane, this need not necessarily be the case. In other embodiments, the first regions may lie in a different plane to the second regions, and/or different first regions may lie in different planes relative to one another, and/or different second regions may lie in different planes relative to each other. Although in some embodiments, the spacing between respective regions and areas may be constant, as shown in FIG. 24A, this need not necessarily be the case. For example, in other embodiments, the spacing between pairs of first regions and areas may be different from the spacing between pairs of second regions and areas.

In other embodiments, one of the first areas or second areas may be replaced by a continuous area or layer below the other of the first and second areas, as for example shown in FIG. 24A, where the layer 867 may replace either the first areas 861*a*, 861*b*, 861*c* or the second areas 863*a*, 863*b*, 863*c*. In this embodiment, a spacer, e.g. spacer layer 869 may be provided to separate the continuous layer 867 from the discrete areas above.

In the embodiment of FIGS. 24A and 24B, the first and second areas are substantially aligned or registered with the first and second regions in a direction normal to the plane of the security device. In other embodiments, the first areas and/or second areas may be laterally offset relative to the first and/or second regions so that the first areas provide a maximum background to the first regions at any different predetermined angle, and the second areas provide a maximum background to the second regions also at any other predetermined angle.

Figure 25A:
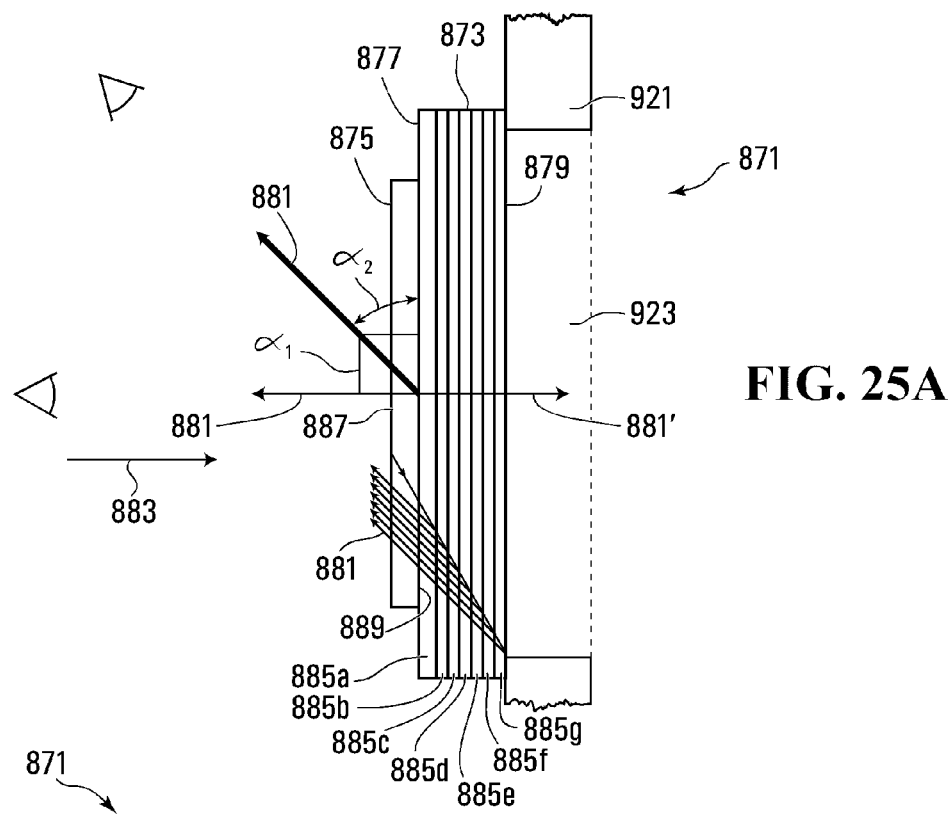
FIG. 25A shows a cross-sectional view of an optical security device according to another embodiment of the present invention.
Figure 25B:
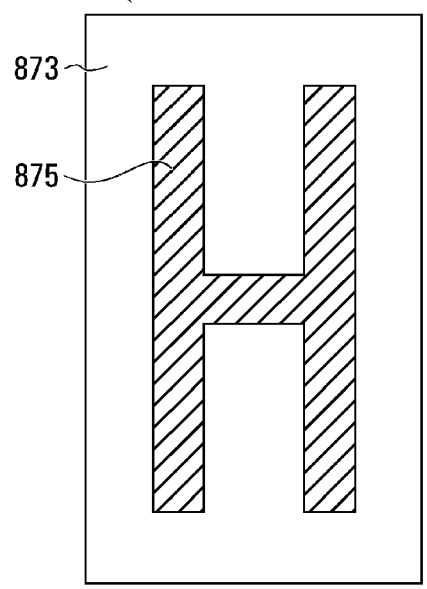
FIG. 25B shows a front view of the optical security device of FIG. 25A at an angle normal to the surface thereof.
Figure 25C:
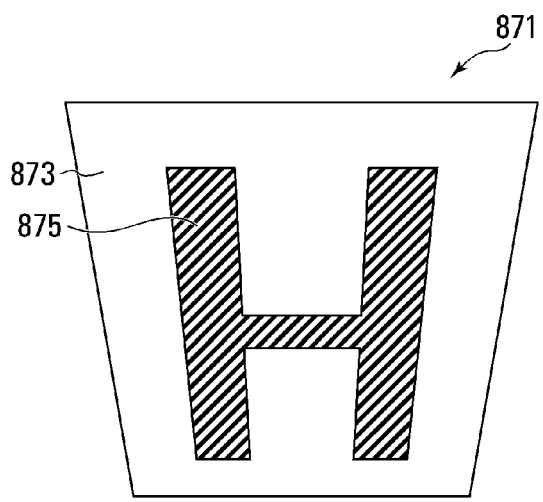
FIG. 25C shows a front view of the optical security device shown in FIGS. 25A and 25B when viewed at an oblique angle to the surface of the security device.

Referring to FIGS. 25A to 25C, a security device 871 according to another embodiment of the present invention comprises an optically variable structure 873 and a luminescent material 875. The optically variable structure 873 has first and second opposed sides or faces 877, 879 and the luminescent material 875 is positioned adjacent the first side 877. The luminescent material 875, which, in this embodiment is formed as a layer, is capable of emitting luminescent radiation 881 of at least a first wavelength when exposed to stimulating radiation 883. The optically variable structure has an angle dependent reflectance for luminescent radiation of the first wavelength which causes the intensity of luminescent radiation of the first wavelength to change as a function of emission/observation angle. In one embodiment, the optically variable structure has a relatively strong reflectance for luminescent radiation of the first wavelength for a particular emission angle or range of emission angles (which, in some embodiments, may be relatively narrow), and a relatively low reflectance for luminescent radiation of the first wavelength at other emission angles. In this particular embodiment, the optically variable structure comprises an optical interference structure comprising a number of layers 885*a* to 885*g* in which adjacent layers have different refractive indices. Thus, for example layers 885*a*, 885*c*, 885*e* and 885*g* may have a relatively high refractive index and layers 885*b*, 885*d* and 885*f* may have a relatively low refractive index (or vice versa).

In this example, the optically variable structure is arranged to have a relatively high transmittance for luminescent radiation of the first wavelength at an emission angle $\alpha_1$ of 90°, for example, to the major surface of the optically variable structure, and a relatively high reflectance at an oblique angle, $\alpha_2$, to the major surface of the optically variable structure.

When exposed to stimulating radiation, the luminescent material 875 generates luminescent radiation of the first wavelength. Part of the luminescent radiation will be directed towards the first side 887 of the luminescent layer and part will be directed towards the second side 889 of the luminescent layer. At the first emission or observation angle $\alpha_1$, luminescent radiation of the first wavelength directed towards the first side 887 will be emitted from the first side. Luminescent radiation of the first wavelength directed towards the opposite side will be emitted from that side and transmitted through the optically variable structure, as indicated by the ray 881'. If the transmittance of the optically variable structure for luminescent radiation of the first wavelength at the first angle is the same as the transmittance of the medium (e.g. air) to the left of the first side 887 of the luminescent layer 875, substantially equal amounts of luminescent radiation will be emitted from either side of the security device at the first emission angle.

At the second emission or observation angle $\alpha_2$, luminescent radiation produced within the luminescent material which is directed towards the first side 887 of the luminescent layer will be emitted therefrom. Luminescent radiation which is produced within the luminescent layer and directed at the second angle $\alpha_2$ towards the second side 889 of the luminescent layer will be reflected back by the optically variable structure and also emitted from the luminescent layer at the second emission angle. Thus, the intensity of the luminescent emission at the second emission or observation angle will be greater than that for the first emission or observation angle, $\alpha_1$. This effect is illustrated in FIGS. 25B and 25C. In this example, the luminescent material has the form of a "H". FIG. 25B shows the observed luminescent feature at a first (e.g. normal) viewing angle, $\alpha_1$ and FIG. 25C shows the observed luminescent feature at the second observation angle, $\alpha_2$. The intensity of the luminescent emission is greater at the second observation angle $\alpha_2$, as shown in FIG. 25C (by the darker shading), than the luminescence intensity at the first (e.g. normal) viewing angle, as shown in FIG. 25B. Therefore the luminescent feature appears brighter in FIG. 25C. The change in intensity with emission or observation angle may be used to authenticate the security feature.

In other embodiments, the luminescent material may be adapted to emit, in addition to luminescent radiation of a first wavelength, luminescent radiation of a second wavelength, different to the first wavelength. The optically variable structure may be adapted so that its reflectance for the second wavelength also varies with emission/observation angle. In one embodiment, the reflectance of the optically variable structure for luminescent radiation of the second wavelength may be relatively high for a particular emission or observation angle or range of emission or observation angles and relatively low for other emission/observation angles. In some embodiments, the angle or range of angles of relatively high reflectance for the second wavelength of luminescent radiation may be different to the angle or range of angles of relatively high reflectance of the optically variable structure for luminescent radiation of the first wavelength. In this embodiment, luminescence of the first wavelength or colour will appear brighter at one angle, and luminescence of the second wavelength or colour will appear brighter at another angle, thereby producing an angle-dependent colour shift. In some embodiments, the luminescent material producing the first wavelength or colour may have a different shape or size to that of the luminescent material which produces the second wavelength or colour. One or both luminescent materials may be shaped as a symbol, for example.

The security device 901 may be mounted on a suitable substrate 921 which may be adapted to enable luminescent radiation of the first wavelength and/or second wavelength to pass therethrough. For example, the substrate may include an aperture 923 with the security device mounted over the aperture, or the portion of the substrate on which the security device is mounted may be transparent or translucent. In order for the angle dependent intensity of the luminescent emission to be observed, it is important not to place a diffuse medium between the observer and the external side 917 of the luminescent layer.

Although some embodiments have been described with reference to certain luminescent emission angles, the emission angles are disclosed for illustrative purposes only, and are in no way limiting of the invention. Embodiments may be practiced using any desired or required luminescence emission angles.

Figure 26A:
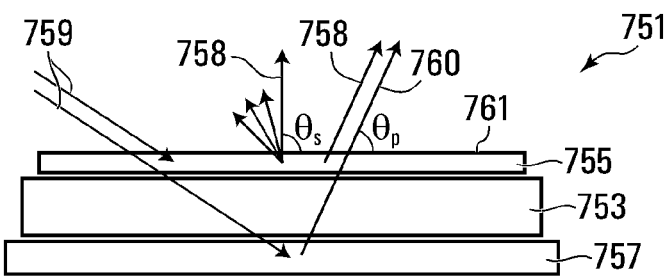
FIG. 26A shows a cross-sectional view of an optical security device according to another embodiment of the present invention.
Figure 26B:
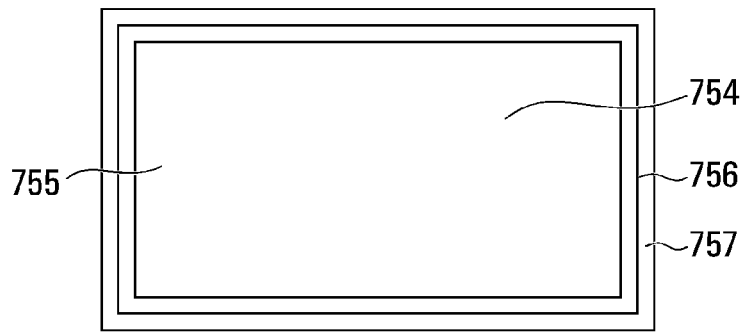
FIG. 26B shows a plan or top view of the optical security device of FIG. 26A.

FIGS. 26A and 26B show another embodiment of an optical security device. The security device 751 comprises an optically variable structure 753, a first layer 755 of luminescent material above the optically variable structure and a second layer 757 of luminescent material disposed below the optically variable structure. The optically variable structure has an area 754 defined by an edge or boundary 756, and both the first and second layers overlap the area 754. The first luminescent layer is adapted to emit, when stimulated by stimulating radiation 759, luminescent radiation of a first wavelength or colour from within the area 754. The second luminescent layer 757 is adapted to emit, when stimulated by stimulating radiation 759, luminescent radiation of a second wavelength or colour, different to the first wavelength or colour, from within the area 754. In this arrangement, the optically variable structure 753 is adapted to control the emissivity of the security device for luminescent radiation of the second wavelength or colour from the second layer 757, with emission angle, but is not arranged to control the emissivity of the security device for luminescent emission of the first wavelength or colour from the first layer 755 with emission angle. Accordingly, the intensity of luminescent emission from the first layer 755 is independent of any angular control imposed by the optically variable structure on luminescent emission from the second layer.

When stimulated with stimulating radiation 759, the first layer 755 may emit luminescent radiation of the first wavelength or colour over a relatively wide range of angles from the upper surface 761 of the security device. In this particular embodiment, when the second layer 759 is stimulated with stimulating radiation 759, the optically variable structure controls transmission of the luminescent radiation therethrough so that the intensity of luminescent emission of the second wavelength from the optical security device varies with emission angle. Thus, as the emission angle is changed, the contribution of luminescent emission from the first layer may be relatively constant, whereas the contribution of luminescent emission from the second layer varies, resulting in an angle-dependent colour shift. For example, by way of illustration only, at a first emission angle $\theta_s$, the transmissivity of the optically variable structure for luminescent radiation of the second wavelength or colour may be relatively low, in which case, at this angle, the first wavelength or colour may dominate. For a second, different emission angle, $\theta_p$, the transmissivity of the optically variable structure 753 for luminescent emission of the second wavelength may be relatively high resulting in a stronger contribution of the second wavelength or colour in the luminescence emission at this angle in comparison to the first angle, $\theta_s$. The observed colour will be the effect of additive mixing of the first and second wavelengths or colours.

The optically variable structure 753 may comprise any structure which is capable of controlling luminescent emission from the second layer 757 therethrough as a function of angle, and may, for example, comprise an optical interference structure, a holographic structure, a liquid crystal structure, a micro electronic mechanical system, for example, based on those described above, or any other suitable structure.

Figure 27A:
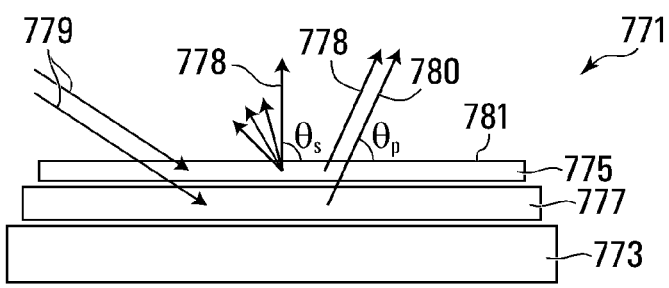
FIG. 27A shows a cross-sectional view of an optical security device according to another embodiment of the present invention.
Figure 27B:
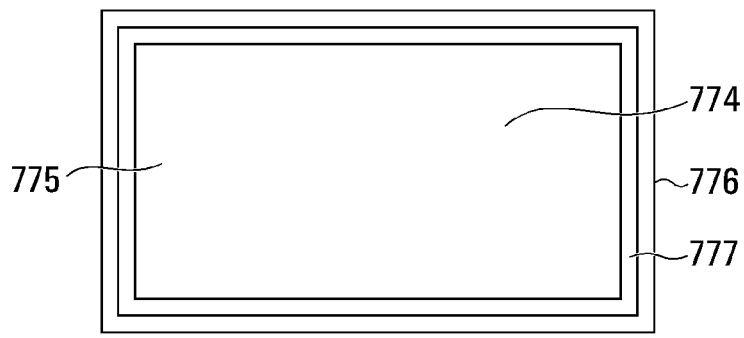
FIG. 27B shows a plan or top view of the optical security device shown in FIG. 27A.

FIGS. 27A and 27B show another embodiment of an optical security device. The optical security device 771 comprises an optically variable structure 773, a first layer 775 of luminescent material and a second layer or arrangement 777 of luminescent material between the first layer 775 and the optically variable structure 773. The optically variable structure 773 has an area 774 defined by a peripheral edge or boundary 776, and both the first and second layers (or arrangement) overlap the area 774. The first luminescent layer 775 is adapted to emit, from within the area 774, luminescent radiation of a first wavelength or colour when stimulated with stimulating radiation 779. The second luminescent layer 777 is adapted to emit, from within the area 774, luminescent radiation of a second wavelength or colour when stimulated with stimulating radiation 779.

The first luminescent layer 775 is adapted such that the emissivity of the optically variable structure for luminescent radiation of the first wavelength as a function of angle is not controlled by the optically variable structure 773, and is in effect decoupled therefrom. The second layer or arrangement of luminescent material 777 is arranged so that the emissivity of the optical security device for luminescent radiation of the second wavelength or colour as a function of angle is controlled by the optically variable structure 773, and is in effect coupled thereto for this purpose.

The emissivity of the security device for luminescent radiation of the first wavelength, may be relatively independent of emission angle. The optically variable structure 773 may control the emissivity of luminescent radiation of the second wavelength or colour from the optical security device so that the emissivity varies as a function of emission angle. Thus, the luminescent emission emitted from within the area 774 of the optically variable structure will exhibit an angle dependent colour. Thus for example at a first angle $\theta_s$, the emissivity of the optically variable structure 773 for luminescent radiation of the second wavelength or colour may be relatively low, so that the luminescent emission from the surface 781 of the security device at this angle is dominated by the first wavelength or colour. At a second emission angle $\theta_p$, the emissivity of the optically variable structure 773 for luminescent emission of the second wavelength may be relatively high, and therefore at this angle, the luminescent emission will include a stronger component of the second wavelength or colour than at the first emission angle, the resulting colour being the effect of additive mixing of the first and second wavelengths or colours.

The optically variable structure 773 may comprise any structure that is capable of controlling luminescent emission from the second material as a function of angle. For example, the structure may comprise a surface structure to produce the desired effect, examples of which are described above with reference to FIGS. 20A to 23B.

In other embodiments of FIGS. 26 and 27, the first and second luminescent layers may both emit the same wavelength or colour, when stimulated. In this case, an angle dependent change in intensity of the emitted colour will be observed.

The security device of any aspect or embodiment of the invention may be applied to or incorporated in any item or object to provide a means of authentication, non-limiting examples of which include currency e.g. bank notes, other financial transaction instruments, such as credit and debit cards, any documents or any goods.

Other aspects and embodiments of the present invention may comprise any feature disclosed herein in combination with any one or more other features disclosed herein.

In any aspects or embodiments of the invention, any one or more features may be omitted altogether or replaced by another feature which may or may not be an equivalent or variant thereof.

Numerous modifications to the embodiments described above will be apparent to those skilled in the art.

While examples of embodiments of the invention have been illustrated and described in the drawings and foregoing description, the same is to be considered as illustrative and not restrictive in character, it being understood that all changes and modifications that come within the spirit of the invention are desired to be protected.

The invention claimed is:

1. A luminescent security device, the device comprising:
an ultraviolet (UV) responsive luminescent layer having a luminescent area comprising a mixture of two or more luminescent materials, each of which absorbs electromagnetic radiation only in the ultraviolet (UV) region of the electromagnetic spectrum, each of which, when stimulated by UV radiation, luminesces to produce luminescent radiation of a wavelength in the visible spectrum of the electromagnetic spectrum that is different from luminescent radiation produced by the other luminescent material(s) present in the mixture, the luminescent radiation emitted from the luminescent area at least including first and second wavelengths in the visible spectrum, the second wavelength being different from the first wavelength; and
an optical interference structure distinct from the luminescent layer, and comprising a plurality of adjacent layers of electromagnetic radiation transmissive materials with different refractive indices that receive from the luminescent area the luminescent radiation of the first and second wavelengths in the visible spectrum, to control emission of the received luminescent radiation of at least one of the first and second wavelengths, such that the relative intensities of the luminescent radiation of the first and second wavelengths changes with an emission angle from the device, resulting in an angle-dependent colour-shift in the luminescent radiation from the luminescent area, when transmitted through the optical interference structure and emitted from the device;
the optical interference structure including an area from within which emission of the luminescent radiation from the device occurs, the luminescent radiation of the first wavelength transmitted at a first angle of emission, and the luminescent radiation of the second wavelength transmitted at one or both of (1) the first angle of emission and (2) a second angle of emission different from the first angle of emission,
said optical interference structure arranged to cause, from the optical interference structure area, the emissivity of the device for luminescent radiation of the first or second wavelengths to change relative to the emissivity of the device for luminescent radiation of the other of the first or second wavelengths with a change in emission angle of luminescent radiation from the device from the first emission angle to the second emission angle.

2. The device as claimed in claim 1, wherein said optical interference structure is arranged to control emission of the luminescent radiation of both the first and second wavelengths from the device, and to cause emission of the luminescent radiation of the first wavelength from the device at the first angle, and to cause emission of the luminescent radiation of the second wavelength at one or both of the first and second angles.

3. A method of authenticating the security device of claim 1, the method comprising exposing the security device to UV stimulating radiation to stimulate the UV-responsive luminescent layer to emit luminescent radiation of the first and second wavelengths from the luminescent area, and observing or detecting, in the luminescent radiation in the visible spectrum transmitted by the optical interference structure and emitted from the security device, a change in intensity of the emitted luminescent radiation of the first or second wavelengths relative to the intensity of the emitted luminescent radiation of the other of the first or second wavelengths with at least one or both of (1) a change in emission angle from the security device and (2) a change in direction or angle of the UV stimulating radiation incident upon the security device for stimulating the luminescent layer.

4. A luminescent security device, the device comprising:
an ultraviolet (UV) responsive luminescent layer having a luminescent area comprising a mixture of two or more luminescent materials, each of which absorbs electromagnetic radiation only in the ultraviolet (UV) region of the electromagnetic spectrum, each of which, when stimulated by UV radiation, luminesces to emit luminescent radiation of a wavelength in the visible spectrum of the electromagnetic spectrum that is different from that produced by the other luminescent material(s) present in the mixture, the luminescent radiation emitted from the luminescent area at least including first and second wavelengths, the second wavelength being different to the first wavelength; and
an optical interference structure distinct from the luminescent layer, and comprising adjacent layers of electromagnetic radiation transmissive materials with different refractive indices, that receive from the luminescent area the luminescent radiation of the first and second wavelengths in the visible spectrum, to control the intensity of emission of the received luminescent radiation with an angle of emission of the luminescent radiation from the device, based on the wavelength of said luminescent radiation, such that relative intensities of the luminescent radiation of the first and second wavelengths changes with emission angle, resulting in an angle-dependent colour shift in the luminescent radiation from the luminescent area, when transmitted by the optical interference structure and emitted from the device.

5. The luminescent security device as claimed in claim 4, wherein the luminescent radiation of the first wavelength is emitted from the device at a first emission angle and the intensity of the luminescent radiation of the first wavelength changes with a change in emission angle from the first angle.

6. A method of authenticating the security device of claim 4, the method comprising exposing the security device to stimulating UV radiation to stimulate the luminescent layer to emit luminescent radiation in the visible spectrum, and observing a colour shift in the luminescent radiation transmitted by the optical interference structure and emitted from the security device, with at least one of (1) a change in emission angle from the security device and (2) a change in the direction or angle of incidence of the UV stimulating radiation upon the security device for stimulating the luminescent layer.

7. A bank note comprising a substrate and the luminescent security device as claimed in any one of claims 1, 2, 4, or 5, adhered, affixed or attached to the substrate.

8. A luminescent security device, the device comprising:
an ultraviolet (UV) responsive luminescent layer having a luminescent area comprising a mixture of two or more luminescent materials, each of which absorbs electromagnetic radiation only in the ultraviolet (UV) region of the electromagnetic spectrum, each of which when stimulated by UV radiation, luminesces to produce luminescent radiation of a wavelength in the visible spectrum that is different from that produced by other luminescent materials present in the mixture, the luminescent radiation emitted from the luminescent area at least including first and second wavelengths, the second wavelength being different to the first wavelength; and
an optical interference structure distinct from the luminescent layer, and comprising adjacent layers of electromagnetic radiation transmissive materials with different refractive indices, the optical interference structure including an optical interference structure area for receiving and controlling emission from the device of the luminescent radiation of at least one of the first and second wavelengths in the visible spectrum emitted from the luminescent area, the device being arranged to permit, from within the optical interference structure area, emission of the luminescent radiation of the first and second wavelengths from the device, wherein the optical interference structure is arranged to cause, from said optical interference structure area, the relative emissivity of the device for the luminescent radiation of the first and second wavelengths to change with at least one or both of (1) a change in emission angle of luminescent radiation from the device and (2) a change in the direction or angle of incidence of UV stimulating radiation on the device for stimulating the luminescent layer.

9. A bank note comprising a substrate and the luminescent security device as claimed in claim 8, adhered, affixed or attached to the substrate.

10. A method of authenticating the security device of claim 8, the method comprising: exposing the security device to UV stimulating radiation to stimulate the luminescent layer to emit luminescent radiation in the visible spectrum of the first and second wavelengths from the luminescent area, and observing or detecting in the luminescent radiation transmitted by the optical interference structure and emitted from the security device a change in intensity of the emitted luminescent radiation of the first or second wavelengths relative to the intensity of the emitted luminescent radiation of the other of the first or second wavelengths with at least one or both of (1) a change in emission angle from the security device and (2) a change in direction or angle of UV stimulating radiation incidence upon the security device for stimulating the luminescent layer.

* * * * *